US009716736B2

(12) United States Patent
Harrison

(10) Patent No.: US 9,716,736 B2
(45) Date of Patent: Jul. 25, 2017

(54) SYSTEM AND METHOD OF DISCOVERY AND LAUNCH ASSOCIATED WITH A NETWORKED MEDIA DEVICE

(71) Applicant: David Harrison, San Francisco, CA (US)

(72) Inventor: David Harrison, San Francisco, CA (US)

(73) Assignee: FREE STREAM MEDIA CORP., San Francisco, CA (US)

( * ) Notice: Subject to any disclaimer, the term of this patent is extended or adjusted under 35 U.S.C. 154(b) by 0 days.

(21) Appl. No.: 14/834,458

(22) Filed: Aug. 25, 2015

(65) Prior Publication Data

US 2015/0365456 A1  Dec. 17, 2015

Related U.S. Application Data

(63) Continuation of application No. 14/053,620, filed on Oct. 15, 2013, now Pat. No. 9,167,419, and a
(Continued)

(51) Int. Cl.
*H04L 29/06* (2006.01)
*H04L 29/08* (2006.01)
(Continued)

(52) U.S. Cl.
CPC .............. *H04L 65/60* (2013.01); *G06F 15/16* (2013.01); *G06F 21/123* (2013.01); *G06F 21/34* (2013.01);
(Continued)

(58) Field of Classification Search
CPC ....................................................... H04L 65/60
(Continued)

(56) References Cited

U.S. PATENT DOCUMENTS 3,849,760 A  11/1974  Endou et al.
3,919,479 A  11/1975  Moon et al.
(Continued)

FOREIGN PATENT DOCUMENTS

CA  2553159 A1  10/1998
CA  2413944 A1  6/2003
(Continued)

OTHER PUBLICATIONS

"Secure Browsing with Ceedo", Ceedo Flexible computing (pp. 2).
(Continued)

*Primary Examiner* — Ondrej Vostal
(74) *Attorney, Agent, or Firm* — Raj Abhyanker, P.C.

(57) ABSTRACT

A method, apparatus and/or system related to discovery and launch system and method. In one embodiment, a method of a mobile device includes accessing a multicast capability of an operating system through an application of the mobile device, determining if there is a similar application locally stored on a networked media device to the application on the mobile device when a multicast message is broadcast to the networked media device communicatively coupled to the mobile device through a local area network, and either populating a table of the operating system of the client device with a list of applications and/or presenting identifiers to the client device to enable a user thereof to select an identifier therethrough.

20 Claims, 12 Drawing Sheets

Related U.S. Application Data continuation of application No. 13/736,031, filed on Jan. 7, 2013, now Pat. No. 9,154,942, and a continuation of application No. 13/470,814, filed on May 14, 2012, now Pat. No. 8,539,072, and a continuation of application No. 12/592,377, filed on Nov. 23, 2009, now Pat. No. 8,180,891.

(60) Provisional application No. 61/696,711, filed on Sep. 4, 2012, provisional application No. 61/584,168, filed on Jan. 6, 2012, provisional application No. 61/118,286, filed on Nov. 26, 2008.

(51) Int. Cl.
| | | |
|---|---|---|
| *H04L 12/18* | (2006.01) | |
| *G06F 15/16* | (2006.01) | |
| *G06F 21/12* | (2013.01) | |
| *G06F 21/34* | (2013.01) | |
| *H04L 12/927* | (2013.01) | |
| *H04L 12/931* | (2013.01) | |
| *H04W 8/24* | (2009.01) | |
| *G06F 21/53* | (2013.01) | |

(52) U.S. Cl.
CPC ............ *G06F 21/53* (2013.01); *H04L 12/189* (2013.01); *H04L 29/06455* (2013.01); *H04L 47/806* (2013.01); *H04L 49/201* (2013.01); *H04L 63/10* (2013.01); *H04L 67/02* (2013.01); *H04L 67/10* (2013.01); *H04L 67/125* (2013.01); *H04L 67/141* (2013.01); *H04W 8/24* (2013.01)

(58) Field of Classification Search
USPC ........................................................ 709/219
See application file for complete search history.

(56) References Cited

U.S. PATENT DOCUMENTS

| | | |
|---|---|---|
| 4,025,851 A | 5/1977 | Haselwood et al. |
| 4,230,990 A | 10/1980 | Lert, Jr. et al. |
| 4,258,386 A | 3/1981 | Cheung |
| 4,420,769 A | 12/1983 | Novak |
| 4,450,531 A | 5/1984 | Kenyon et al. |
| 4,574,304 A | 3/1986 | Watanabe et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,833,449 A | 5/1989 | Gaffigan |
| 4,843,562 A | 6/1989 | Kenyon et al. |
| 4,888,638 A | 12/1989 | Bohn |
| 4,918,730 A | 4/1990 | Schulze |
| 4,955,070 A | 9/1990 | Welsh et al. |
| 4,967,273 A | 10/1990 | Greenberg |
| 4,993,059 A | 2/1991 | Smith et al. |
| 5,014,125 A | 5/1991 | Pocock et al. |
| 5,019,899 A | 5/1991 | Boles et al. |
| 5,105,184 A | 4/1992 | Pirani et al. |
| 5,155,591 A | 10/1992 | Wachob |
| 5,223,924 A | 6/1993 | Strubbe |
| 5,319,453 A | 6/1994 | Copriviza et al. |
| 5,321,750 A | 6/1994 | Nadan |
| 5,436,653 A | 7/1995 | Ellis et al. |
| 5,481,294 A | 1/1996 | Thomas et al. |
| 5,522,077 A | 5/1996 | Cuthbert et al. |
| 5,539,658 A | 7/1996 | McCullough |
| 5,557,334 A | 9/1996 | Legate |
| 5,572,246 A | 11/1996 | Ellis et al. |
| 5,612,729 A | 3/1997 | Ellis et al. |
| 5,636,346 A | 6/1997 | Saxe |
| 5,724,521 A | 3/1998 | Dedrick |
| 5,732,219 A | 3/1998 | Blumer et al. |
| 5,742,768 A | 4/1998 | Gennaro et al. |
| 5,745,884 A | 4/1998 | Carnegie et al. |
| 5,761,601 A | 6/1998 | Nemirofsky et al. |
| 5,761,648 A | 6/1998 | Golden et al. |
| 5,761,655 A | 6/1998 | Hoffman |
| 5,774,170 A | 6/1998 | Hite et al. |
| 5,774,673 A | 6/1998 | Beuk et al. |
| 5,805,974 A | 9/1998 | Hite et al. |
| 5,815,665 A | 9/1998 | Teper et al. |
| 5,822,525 A | 10/1998 | Tafoya et al. |
| 5,838,301 A | 11/1998 | Okamoto et al. |
| 5,838,317 A | 11/1998 | Bolnick et al. |
| 5,848,396 A | 12/1998 | Gerace |
| 5,850,517 A | 12/1998 | Verkler et al. |
| 5,892,900 A | 4/1999 | Ginter et al. |
| 5,903,729 A | 5/1999 | Reber et al. |
| 5,905,942 A | 5/1999 | Stoel et al. |
| 5,907,279 A | 5/1999 | Bruins et al. |
| 5,940,073 A | 8/1999 | Klosterman et al. |
| 5,948,061 A | 9/1999 | Merriman et al. |
| 5,966,705 A | 10/1999 | Koneru et al. |
| 5,977,962 A | 11/1999 | Chapman et al. |
| 5,978,835 A | 11/1999 | Ludwig et al. |
| 6,002,393 A | 12/1999 | Hite et al. |
| 6,002,443 A | 12/1999 | Iggulden |
| 6,009,409 A | 12/1999 | Adler et al. |
| 6,009,410 A | 12/1999 | LeMole et al. |
| 6,026,368 A | 2/2000 | Brown et al. |
| 6,026,369 A | 2/2000 | Capek |
| 6,032,181 A | 2/2000 | Bedgedjian et al. |
| 6,043,817 A | 3/2000 | Bolnick et al. |
| 6,055,510 A | 4/2000 | Henrick et al. |
| 6,064,980 A | 5/2000 | Jacobi et al. |
| 6,084,628 A | 7/2000 | Sawyer |
| 6,105,122 A | 8/2000 | Muller et al. |
| 6,112,181 A | 8/2000 | Shear et al. |
| 6,118,864 A | 9/2000 | Chang et al. |
| 6,119,098 A | 9/2000 | Guyot et al. |
| 6,137,892 A | 10/2000 | Powell et al. |
| 6,141,010 A | 10/2000 | Hoyle |
| 6,157,941 A | 12/2000 | Verkler et al. |
| 6,167,427 A | 12/2000 | Rabinovich et al. |
| 6,169,542 B1 | 1/2001 | Hooks et al. |
| 6,188,398 B1 | 2/2001 | Collins-Rector et al. |
| 6,192,476 B1 | 2/2001 | Gong |
| 6,195,696 B1 | 2/2001 | Baber et al. |
| 6,216,141 B1 | 4/2001 | Straub et al. |
| 6,219,696 B1 | 4/2001 | Wynblatt et al. |
| 6,247,077 B1 | 6/2001 | Muller et al. |
| 6,286,104 B1 | 9/2001 | Buhle et al. |
| 6,304,523 B1 | 10/2001 | Jones et al. |
| 6,304,852 B1 | 10/2001 | Loncteaux |
| 6,308,327 B1 | 10/2001 | Liu et al. |
| 6,310,889 B1 | 10/2001 | Parsons et al. |
| 6,332,127 B1 | 12/2001 | Bandera et al. |
| 6,349,289 B1 | 2/2002 | Peterson et al. |
| 6,351,467 B1 | 2/2002 | Dillon |
| 6,360,254 B1 | 3/2002 | Linden et al. |
| 6,381,362 B1 | 4/2002 | Deshpande et al. |
| 6,400,265 B1 | 6/2002 | Saylor et al. |
| 6,400,996 B1 | 6/2002 | Hoffberg et al. |
| 6,438,594 B1 | 8/2002 | Bowman-Amuah |
| 6,463,585 B1 | 10/2002 | Hendricks et al. |
| 6,469,749 B1 | 10/2002 | Dimitrova et al. |
| 6,481,010 B2 | 11/2002 | Nishikawa et al. |
| 6,484,148 B1 | 11/2002 | Boyd |
| 6,505,169 B1 | 1/2003 | Bhagavath et al. |
| 6,526,491 B2 | 2/2003 | Suzuoki et al. |
| 6,530,082 B1 | 3/2003 | Del Sesto et al. |
| 6,532,218 B1 | 3/2003 | Shaffer et al. |
| 6,536,041 B1 | 3/2003 | Knudson et al. |
| 6,546,554 B1 | 4/2003 | Schmidt et al. |
| 6,564,260 B1 | 5/2003 | Baber et al. |
| 6,564,263 B1 | 5/2003 | Bergman et al. |
| 6,574,793 B1 | 6/2003 | Ngo et al. |
| 6,577,346 B1 | 6/2003 | Perlman |
| 6,597,405 B1 | 7/2003 | Iggulden |
| 6,622,171 B2 | 9/2003 | Gupta et al. |
| 6,628,801 B2 | 9/2003 | Powell et al. |
| 6,631,523 B1 | 10/2003 | Matthews, III et al. |

(56) References Cited

U.S. PATENT DOCUMENTS

| | | |
|---|---|---|
| 6,651,251 B1 | 11/2003 | Shoff et al. |
| 6,718,551 B1 | 4/2004 | Swix et al. |
| 6,728,784 B1 | 4/2004 | Mattaway |
| 6,738,978 B1 | 5/2004 | Hendricks et al. |
| 6,757,685 B2 | 6/2004 | Raffaele et al. |
| 6,769,009 B1 | 7/2004 | Reisman |
| 6,771,316 B1 | 8/2004 | Iggulden |
| 6,799,196 B1 | 9/2004 | Smith |
| 6,804,659 B1 | 10/2004 | Graham et al. |
| 6,832,239 B1 | 12/2004 | Kraft et al. |
| 6,834,308 B1 | 12/2004 | Ikezoye et al. |
| 6,836,888 B1 | 12/2004 | Basu et al. |
| 6,845,452 B1 | 1/2005 | Roddy et al. |
| 6,907,458 B2 | 6/2005 | Tomassetti et al. |
| 6,946,715 B2 | 9/2005 | Hong |
| 6,959,288 B1 | 10/2005 | Medina et al. |
| 6,959,320 B2 | 10/2005 | Shah et al. |
| 6,978,470 B2 | 12/2005 | Swix et al. |
| 6,981,022 B2 | 12/2005 | Boundy |
| 6,983,478 B1 | 1/2006 | Grauch et al. |
| 6,983,481 B2 | 1/2006 | Fellenstein et al. |
| 6,990,453 B2 | 1/2006 | Wang et al. |
| 6,993,326 B2 | 1/2006 | Link, II et al. |
| 7,020,304 B2 | 3/2006 | Alattar et al. |
| 7,028,033 B2 | 4/2006 | Bright et al. |
| 7,028,327 B1 | 4/2006 | Dougherty et al. |
| 7,043,524 B2 | 5/2006 | Shah et al. |
| 7,047,287 B2* | 5/2006 | Sim .................. G06F 17/30194 707/E17.01 |
| 7,051,351 B2 | 5/2006 | Goldman et al. |
| 7,064,796 B2 | 6/2006 | Roy et al. |
| 7,076,561 B1* | 7/2006 | Rosenberg ........ G06F 17/30752 709/231 |
| 7,080,400 B1 | 7/2006 | Navar |
| 7,088,687 B2 | 8/2006 | Ayyagari et al. |
| 7,089,575 B2 | 8/2006 | Agnihotri et al. |
| 7,089,585 B1 | 8/2006 | Dharmarajan |
| 7,100,183 B2 | 8/2006 | Kunkel et al. |
| 7,111,230 B2 | 9/2006 | Euchner et al. |
| 7,113,090 B1 | 9/2006 | Saylor et al. |
| 7,116,661 B2 | 10/2006 | Patton |
| 7,117,439 B2 | 10/2006 | Barrett et al. |
| 7,136,875 B2 | 11/2006 | Anderson et al. |
| 7,139,882 B2 | 11/2006 | Suzuoki et al. |
| 7,146,627 B1 | 12/2006 | Ismail et al. |
| 7,158,666 B2 | 1/2007 | Deshpande et al. |
| 7,162,539 B2 | 1/2007 | Garcie-Luna-Aceves |
| 7,167,857 B2 | 1/2007 | Roberts |
| 7,181,415 B2 | 2/2007 | Blaser et al. |
| 7,185,353 B2 | 2/2007 | Schlack |
| 7,194,421 B2 | 3/2007 | Conkwright et al. |
| 7,210,157 B2 | 4/2007 | Devara |
| 7,228,280 B1 | 6/2007 | Scherf et al. |
| 7,243,362 B2 | 7/2007 | Swix et al. |
| 7,243,364 B2 | 7/2007 | Dunn et al. |
| 7,296,091 B1 | 11/2007 | Dutta et al. |
| 7,299,195 B1 | 11/2007 | Tawakol et al. |
| 7,308,489 B2 | 12/2007 | Weast |
| 7,328,448 B2 | 2/2008 | Eldering et al. |
| 7,330,875 B1 | 2/2008 | Parasnis et al. |
| 7,346,606 B2 | 3/2008 | Bharat |
| 7,346,649 B1 | 3/2008 | Wong |
| 7,349,967 B2 | 3/2008 | Wang |
| 7,349,980 B1 | 3/2008 | Darugar et al. |
| 7,359,889 B2 | 4/2008 | Wang et al. |
| 7,360,173 B2 | 4/2008 | Tuli |
| 7,366,975 B1 | 4/2008 | Lipton |
| 7,373,381 B2 | 5/2008 | Rust |
| 7,380,258 B2 | 5/2008 | Durden et al. |
| 7,383,243 B2 | 6/2008 | Conkwright et al. |
| 7,421,723 B2 | 9/2008 | Harkness et al. |
| 7,437,301 B2 | 10/2008 | Kageyama et al. |
| 7,444,658 B1 | 10/2008 | Matz et al. |
| 7,444,660 B2 | 10/2008 | Dudkiewicz |
| 7,444,666 B2 | 10/2008 | Edwards et al. |
| 7,454,515 B2 | 11/2008 | Lamkin et al. |
| 7,472,398 B2 | 12/2008 | Corell et al. |
| 7,486,827 B2 | 2/2009 | Kim |
| 7,500,007 B2 | 3/2009 | Ikezoye et al. |
| 7,509,371 B1* | 3/2009 | Monday .................. G06F 9/5055 709/202 |
| 7,509,402 B2 | 3/2009 | Moorer et al. |
| 7,516,074 B2 | 4/2009 | Bilobrov |
| 7,516,213 B2 | 4/2009 | Cunningham et al. |
| 7,525,955 B2 | 4/2009 | Velez-Rivera et al. |
| 7,529,659 B2 | 5/2009 | Wold |
| 7,545,940 B2 | 6/2009 | Alessi et al. |
| 7,546,619 B2 | 6/2009 | Anderson et al. |
| 7,552,228 B2 | 6/2009 | Parasnis et al. |
| 7,555,165 B2 | 6/2009 | Luo et al. |
| 7,559,017 B2 | 7/2009 | Datar et al. |
| 7,565,158 B1 | 7/2009 | Aholainen |
| 7,574,723 B2 | 8/2009 | Putterman et al. |
| 7,584,491 B2 | 9/2009 | Bruckner et al. |
| 7,590,998 B2 | 9/2009 | Hanley |
| 7,593,988 B2 | 9/2009 | Oreizy et al. |
| 7,596,620 B1 | 9/2009 | Colton et al. |
| 7,602,748 B2 | 10/2009 | Sinnreich et al. |
| 7,623,823 B2 | 11/2009 | Zito et al. |
| 7,624,142 B2 | 11/2009 | Jungck |
| 7,631,325 B2 | 12/2009 | Rys et al. |
| 7,634,533 B2 | 12/2009 | Rudolph et al. |
| 7,639,387 B2 | 12/2009 | Hull et al. |
| 7,650,616 B2 | 1/2010 | Lee |
| 7,653,008 B2 | 1/2010 | Patrick et al. |
| 7,664,081 B2 | 2/2010 | Luoma et al. |
| 7,665,082 B2 | 2/2010 | Wyatt et al. |
| 7,672,003 B2 | 3/2010 | Dowling et al. |
| 7,689,920 B2 | 3/2010 | Robbin et al. |
| 7,690,006 B2 | 3/2010 | Birnbaum et al. |
| 7,694,319 B1 | 4/2010 | Hassell et al. |
| 7,698,165 B1 | 4/2010 | Tawakol et al. |
| 7,701,882 B2 | 4/2010 | Jones et al. |
| 7,711,748 B2 | 5/2010 | Bright et al. |
| 7,711,838 B1 | 5/2010 | Boulter et al. |
| 7,716,161 B2 | 5/2010 | Dean et al. |
| 7,720,914 B2 | 5/2010 | Goodman et al. |
| 7,729,366 B2 | 6/2010 | Mok et al. |
| 7,734,624 B2 | 6/2010 | Anderson et al. |
| 7,739,140 B2 | 6/2010 | Vinson et al. |
| 7,769,756 B2 | 8/2010 | Krikorian et al. |
| 7,774,348 B2 | 8/2010 | Delli Santi et al. |
| 7,774,715 B1 | 8/2010 | Evans |
| 7,789,757 B2 | 9/2010 | Gemelos et al. |
| 7,793,318 B2 | 9/2010 | Deng |
| 7,797,433 B2 | 9/2010 | Kennedy et al. |
| 7,805,740 B2 | 9/2010 | Gilboa et al. |
| 7,822,809 B2 | 10/2010 | Dhupelia et al. |
| 7,831,426 B2 | 11/2010 | Bennett |
| 7,856,485 B2* | 12/2010 | Prager .................. H04L 65/602 709/219 |
| 7,856,644 B2 | 12/2010 | Nicholson et al. |
| 7,861,260 B2 | 12/2010 | Shkedi |
| 7,870,592 B2 | 1/2011 | Hudson et al. |
| 7,870,596 B2 | 1/2011 | Schackow et al. |
| 7,873,716 B2 | 1/2011 | Maes |
| 7,877,461 B1 | 1/2011 | Rimmer |
| 7,877,774 B1 | 1/2011 | Basso et al. |
| 7,890,957 B2 | 2/2011 | Campbell |
| 7,904,503 B2 | 3/2011 | Van De Sluis |
| 7,904,925 B2 | 3/2011 | Jiang |
| 7,907,211 B2 | 3/2011 | Oostveen et al. |
| 7,908,273 B2 | 3/2011 | DiMaria et al. |
| 7,908,618 B2 | 3/2011 | Bruckner et al. |
| 7,912,822 B2 | 3/2011 | Bethlehem et al. |
| 7,921,037 B2 | 4/2011 | Hertling et al. |
| 7,929,551 B2 | 4/2011 | Dietrich et al. |
| 7,930,207 B2 | 4/2011 | Merriman et al. |
| 7,930,546 B2 | 4/2011 | Rhoads et al. |
| 7,933,451 B2 | 4/2011 | Kloer |
| 7,937,405 B2 | 5/2011 | Anderson et al. |
| 7,941,197 B2 | 5/2011 | Jain et al. |
| 7,941,816 B2 | 5/2011 | Harkness et al. |
| 7,950,055 B2 | 5/2011 | Blinn et al. |

(56) References Cited

U.S. PATENT DOCUMENTS

| | | |
|---|---|---|
| 7,962,007 B2 | 6/2011 | Abe et al. |
| 7,966,309 B2 | 6/2011 | Shacham et al. |
| 7,978,876 B2 | 7/2011 | Powell et al. |
| 7,979,570 B2 | 7/2011 | Chapweske et al. |
| 7,995,503 B2 | 8/2011 | Yu |
| 8,001,124 B2 | 8/2011 | Svendsen |
| 8,020,000 B2 | 9/2011 | Oostveen et al. |
| 8,035,656 B2 | 10/2011 | Blanchard et al. |
| 8,041,643 B2 | 10/2011 | Mukerji et al. |
| 8,046,839 B2 | 10/2011 | Lo |
| 8,055,784 B2 | 11/2011 | Kalama et al. |
| 8,060,399 B2 | 11/2011 | Ullah |
| 8,060,912 B2 | 11/2011 | Sato |
| 8,065,700 B2 | 11/2011 | Lee |
| 8,069,247 B2 * | 11/2011 | Ruiz-Velasco .......... G06F 9/445 709/217 |
| 8,069,348 B2 | 11/2011 | Bacon |
| 8,071,869 B2 | 12/2011 | Chen et al. |
| 8,079,045 B2 | 12/2011 | Krapf et al. |
| 8,087,047 B2 | 12/2011 | Olague et al. |
| 8,090,706 B2 | 1/2012 | Bharat |
| 8,091,031 B2 | 1/2012 | Evans |
| 8,122,484 B2 | 2/2012 | Karjoth et al. |
| 8,126,963 B1 | 2/2012 | Rimmer |
| 8,131,585 B2 | 3/2012 | Nicholas et al. |
| 8,131,705 B2 | 3/2012 | Chevalier et al. |
| 8,131,734 B2 | 3/2012 | Austin et al. |
| 8,140,965 B2 | 3/2012 | Dean et al. |
| 8,141,111 B2 | 3/2012 | Gilley et al. |
| 8,145,645 B2 | 3/2012 | Delli Santi et al. |
| 8,145,705 B1 | 3/2012 | Rust |
| 8,150,729 B2 | 4/2012 | Wilhelm |
| 8,150,985 B2 | 4/2012 | Nakamura |
| 8,155,696 B2 | 4/2012 | Swanburg et al. |
| 8,161,511 B2 | 4/2012 | Kwak et al. |
| 8,171,030 B2 | 5/2012 | Pereira et al. |
| 8,171,510 B2 | 5/2012 | Kamen et al. |
| 8,175,413 B1 | 5/2012 | Ioffe et al. |
| 8,180,708 B2 | 5/2012 | Hurtado et al. |
| 8,180,891 B1 | 5/2012 | Harrison |
| 8,189,945 B2 | 5/2012 | Stojancic et al. |
| 8,191,091 B1 | 5/2012 | Harvey et al. |
| 8,195,689 B2 | 6/2012 | Ramanathan et al. |
| 8,195,692 B2 | 6/2012 | Baek et al. |
| 8,201,080 B2 | 6/2012 | Basson et al. |
| 8,209,397 B2 | 6/2012 | Ahn et al. |
| 8,209,404 B2 | 6/2012 | Wu |
| 8,214,256 B2 | 7/2012 | Riedl et al. |
| 8,219,411 B2 | 7/2012 | Matz et al. |
| 8,225,347 B1 | 7/2012 | Flickinger et al. |
| 8,229,227 B2 | 7/2012 | Stojancic et al. |
| 8,229,751 B2 | 7/2012 | Cheung |
| 8,239,340 B2 | 8/2012 | Hanson |
| 8,244,707 B2 | 8/2012 | Lin et al. |
| 8,245,270 B2 | 8/2012 | Cooperstein et al. |
| 8,255,949 B1 | 8/2012 | Bayer et al. |
| 8,260,665 B2 | 9/2012 | Foladare et al. |
| 8,261,341 B2 | 9/2012 | Stirbu |
| 8,271,649 B2 | 9/2012 | Kalofonos et al. |
| 8,275,791 B2 | 9/2012 | Raffaele et al. |
| 8,281,288 B1 | 10/2012 | Spencer |
| 8,285,880 B2 | 10/2012 | Ye et al. |
| 8,290,351 B2 | 10/2012 | Plotnick et al. |
| 8,296,763 B1 | 10/2012 | Peercy et al. |
| 8,301,596 B2 | 10/2012 | Lin et al. |
| 8,301,732 B2 | 10/2012 | Chapweske et al. |
| 8,302,170 B2 | 10/2012 | Kramer et al. |
| 8,307,093 B2 * | 11/2012 | Klemets .............. H04L 12/2818 370/254 |
| 8,316,450 B2 | 11/2012 | Robinson et al. |
| 8,326,872 B2 | 12/2012 | Zwilling et al. |
| 8,332,885 B2 | 12/2012 | Williamson et al. |
| 8,335,786 B2 | 12/2012 | Pereira et al. |
| 8,339,991 B2 | 12/2012 | Biswas et al. |
| 8,341,242 B2 | 12/2012 | Dillon et al. |
| 8,352,980 B2 | 1/2013 | Howcroft |
| 8,355,711 B2 | 1/2013 | Heins et al. |
| 8,358,966 B2 | 1/2013 | Zito et al. |
| 8,364,541 B2 | 1/2013 | Roth |
| 8,364,703 B2 | 1/2013 | Ramanathan et al. |
| 8,364,959 B2 | 1/2013 | Bhanoo et al. |
| 8,365,217 B2 | 1/2013 | Legrand |
| 8,375,131 B2 | 2/2013 | Rogers et al. |
| 8,381,026 B2 | 2/2013 | Talla et al. |
| 8,385,644 B2 | 2/2013 | Stojancic |
| 8,406,607 B2 | 3/2013 | Nesvadba et al. |
| 8,407,240 B2 | 3/2013 | Denton |
| 8,418,191 B2 | 4/2013 | Honishi et al. |
| 8,433,306 B2 | 4/2013 | Rodriguez |
| 8,433,574 B2 | 4/2013 | Jablokov et al. |
| 8,443,420 B2 | 5/2013 | Brown et al. |
| 8,451,762 B2 | 5/2013 | Liu et al. |
| 8,452,864 B1 | 5/2013 | Vendrow |
| 8,463,100 B2 | 6/2013 | Tse et al. |
| 8,468,357 B2 | 6/2013 | Roberts et al. |
| 8,472,289 B2 | 6/2013 | Scherf et al. |
| 8,473,575 B2 | 6/2013 | Marchwicki et al. |
| 8,479,246 B2 | 7/2013 | Hudson et al. |
| 8,488,838 B2 | 7/2013 | Sharma |
| 8,489,701 B2 | 7/2013 | Manion et al. |
| 8,494,907 B2 | 7/2013 | Lerman et al. |
| 8,495,611 B2 | 7/2013 | McCarthy et al. |
| 8,495,675 B1 | 7/2013 | Philpott et al. |
| 8,495,746 B2 | 7/2013 | Fissel et al. |
| 8,504,551 B2 | 8/2013 | Anderson et al. |
| 8,510,317 B2 | 8/2013 | Boetje et al. |
| 8,510,661 B2 | 8/2013 | Dharmaji et al. |
| 8,510,779 B2 | 8/2013 | Slothouber et al. |
| 8,516,533 B2 | 8/2013 | Davis et al. |
| 8,520,909 B2 | 8/2013 | Leung et al. |
| 8,527,594 B2 | 9/2013 | Lahaix |
| 8,533,192 B2 | 9/2013 | Moganti et al. |
| 8,537,157 B2 | 9/2013 | Adimatyam et al. |
| 8,539,025 B2 | 9/2013 | Husain et al. |
| 8,539,072 B1 | 9/2013 | Harrison |
| 8,539,523 B2 | 9/2013 | Philpott et al. |
| 8,548,820 B2 | 10/2013 | Matz et al. |
| 8,549,052 B2 | 10/2013 | Miles |
| 8,549,066 B1 | 10/2013 | Donahue et al. |
| 8,549,110 B2 | 10/2013 | Jerbi et al. |
| 8,549,550 B2 | 10/2013 | Lopatecki et al. |
| 8,566,154 B2 | 10/2013 | Merriman et al. |
| 8,566,158 B2 | 10/2013 | Cansler et al. |
| 8,566,867 B1 | 10/2013 | Yang et al. |
| 8,577,996 B2 | 11/2013 | Hughes et al. |
| 8,595,781 B2 | 11/2013 | Neumeier et al. |
| 8,607,267 B2 | 12/2013 | Shkedi |
| 8,611,701 B2 | 12/2013 | Zhang |
| 8,613,045 B1 * | 12/2013 | Shigapov ................ H04L 63/08 718/100 |
| 8,621,585 B2 | 12/2013 | Danieli et al. |
| 8,635,106 B2 | 1/2014 | Sarukkai et al. |
| 8,635,316 B2 | 1/2014 | Barnhill, Jr. |
| 8,639,826 B2 | 1/2014 | Slothouber et al. |
| 8,645,209 B2 | 2/2014 | Mandyam et al. |
| 8,645,992 B2 | 2/2014 | Russell et al. |
| 8,645,994 B2 | 2/2014 | Vemparala et al. |
| 8,646,063 B2 | 2/2014 | Dowlatkhah |
| 8,655,716 B1 | 2/2014 | Barnes et al. |
| 8,656,422 B2 | 2/2014 | Kumar et al. |
| 8,661,010 B2 | 2/2014 | Lin et al. |
| 8,666,168 B2 | 3/2014 | Stojancic et al. |
| 8,667,142 B2 | 3/2014 | Takei et al. |
| 8,677,253 B2 | 3/2014 | Duquene et al. |
| 8,694,656 B2 | 4/2014 | Douillet et al. |
| 8,695,032 B2 | 4/2014 | Shkedi |
| 8,700,699 B2 | 4/2014 | Shen et al. |
| 8,700,795 B2 | 4/2014 | Boulter et al. |
| 8,701,134 B2 | 4/2014 | Whinmill et al. |
| 8,707,351 B2 | 4/2014 | Dharmaji |
| 8,712,833 B2 | 4/2014 | Quach et al. |
| 8,719,396 B2 | 5/2014 | Brindley et al. |
| 8,719,870 B1 | 5/2014 | Davies et al. |
| 8,732,182 B2 | 5/2014 | Bethlehem et al. |

(56) References Cited

U.S. PATENT DOCUMENTS

| | | | |
|---|---|---|---|
| 8,736,764 | B2 | 5/2014 | Amundsen |
| 8,738,779 | B2 | 5/2014 | Binding et al. |
| 8,739,208 | B2 | 5/2014 | Davis et al. |
| 8,745,272 | B2 | 6/2014 | Casalaina et al. |
| 8,751,942 | B2 | 6/2014 | Lopez et al. |
| 8,756,686 | B2 | 6/2014 | Plattner et al. |
| 8,763,033 | B2 | 6/2014 | Dittus |
| 8,763,097 | B2 | 6/2014 | Bhatnagar et al. |
| 8,769,584 | B2 | 7/2014 | Neumeier et al. |
| 8,775,391 | B2 | 7/2014 | Kalavade |
| 8,776,112 | B2 | 7/2014 | Roberts et al. |
| 8,776,154 | B2 * | 7/2014 | Kim ................... H04N 21/47 709/217 |
| 8,776,244 | B2 | 7/2014 | Kroeger et al. |
| 8,793,730 | B2 | 7/2014 | Mowrey et al. |
| 8,799,357 | B2 | 8/2014 | Clift et al. |
| 8,804,039 | B2 | 8/2014 | Kim et al. |
| 8,804,721 | B2 | 8/2014 | He et al. |
| 8,805,657 | B2 | 8/2014 | Wells et al. |
| 8,805,854 | B2 | 8/2014 | Chen et al. |
| 8,812,451 | B2 | 8/2014 | Shukla et al. |
| 8,813,232 | B2 | 8/2014 | Sreedharan et al. |
| 8,817,757 | B2 | 8/2014 | Luo |
| 8,819,249 | B2 | 8/2014 | Harrison |
| 8,819,255 | B1 | 8/2014 | Harrison |
| 8,825,526 | B2 | 9/2014 | Peters et al. |
| 8,826,327 | B2 | 9/2014 | Adimatyam et al. |
| 8,832,729 | B2 | 9/2014 | Nussel et al. |
| 8,838,149 | B2 | 9/2014 | Hasek |
| 8,838,556 | B1 | 9/2014 | Reiner et al. |
| 8,838,808 | B2 | 9/2014 | Addala et al. |
| 8,843,584 | B2 | 9/2014 | Arini et al. |
| 8,847,994 | B2 * | 9/2014 | Choi ................... G06F 3/0346 345/660 |
| 8,849,821 | B2 | 9/2014 | Schloter |
| 8,855,796 | B2 | 10/2014 | Otsuka et al. |
| 8,855,798 | B2 | 10/2014 | DiMaria et al. |
| 8,856,028 | B2 | 10/2014 | Yang et al. |
| 8,856,087 | B2 | 10/2014 | Greene et al. |
| 8,856,874 | B2 | 10/2014 | Pieczul et al. |
| 8,863,165 | B2 | 10/2014 | Gordon |
| 8,863,168 | B2 * | 10/2014 | Craner ............... H04N 7/17318 725/23 |
| 8,863,174 | B2 | 10/2014 | Neil et al. |
| 8,875,178 | B2 | 10/2014 | Cansler et al. |
| 8,898,714 | B2 | 11/2014 | Neumeier et al. |
| 8,904,021 | B2 | 12/2014 | Harrison |
| 8,910,199 | B2 | 12/2014 | Slaney et al. |
| 8,930,980 | B2 | 1/2015 | Neumeier et al. |
| 8,949,872 | B2 | 2/2015 | Slaney et al. |
| 8,966,525 | B2 | 2/2015 | Mehta et al. |
| 8,972,485 | B1 * | 3/2015 | French .................. G06F 9/5044 709/203 |
| 8,996,538 | B1 | 3/2015 | Cremer et al. |
| 8,997,164 | B2 | 3/2015 | Gordon et al. |
| 9,009,066 | B2 | 4/2015 | Long et al. |
| 9,015,741 | B2 | 4/2015 | Gordon |
| 9,026,668 | B2 | 5/2015 | Harrison |
| 9,032,451 | B2 | 5/2015 | Cansino et al. |
| 9,036,083 | B1 | 5/2015 | Zhu et al. |
| 9,043,712 | B2 | 5/2015 | Santoro et al. |
| 9,049,496 | B2 | 6/2015 | Raesig et al. |
| 9,055,309 | B2 | 6/2015 | Neumeier et al. |
| 9,106,804 | B2 | 8/2015 | Roberts et al. |
| 9,113,107 | B2 | 8/2015 | Jolna et al. |
| 9,118,945 | B2 | 8/2015 | Rudman et al. |
| 9,131,279 | B2 | 9/2015 | Raveendran et al. |
| 9,143,718 | B2 | 9/2015 | Nagorski et al. |
| 9,146,990 | B2 | 9/2015 | Scherf et al. |
| 9,152,727 | B1 | 10/2015 | Balducci et al. |
| 9,154,942 | B2 | 10/2015 | Harrison et al. |
| 9,160,837 | B2 | 10/2015 | Jeffrey et al. |
| 9,167,419 | B2 | 10/2015 | Harrison |
| 9,183,560 | B2 | 11/2015 | Abelow |
| 9,185,462 | B2 | 11/2015 | Das et al. |
| 9,204,275 | B2 | 12/2015 | Johnson et al. |
| 9,213,747 | B2 | 12/2015 | Cremer et al. |
| 9,215,217 | B2 | 12/2015 | Abu-Hakima et al. |
| 9,232,279 | B2 | 1/2016 | Beeson et al. |
| 9,258,383 | B2 | 2/2016 | Harrison |
| 9,271,052 | B2 | 2/2016 | Holden |
| 9,286,902 | B2 | 3/2016 | Han et al. |
| 9,300,996 | B2 * | 3/2016 | Jeong .................. H04N 21/252 |
| 9,323,840 | B2 | 4/2016 | Harron et al. |
| 9,356,914 | B2 | 5/2016 | Jeffrey et al. |
| 9,361,606 | B2 | 6/2016 | Hertel et al. |
| 9,372,531 | B2 | 6/2016 | Benson et al. |
| 9,378,512 | B2 | 6/2016 | Singh et al. |
| 9,380,383 | B2 | 6/2016 | Brenner et al. |
| 9,386,356 | B2 | 7/2016 | Harrison |
| 9,398,262 | B2 * | 7/2016 | Li ..................... H04N 21/4223 |
| 9,465,995 | B2 | 10/2016 | Harron et al. |
| 9,495,451 | B2 | 11/2016 | Harron |
| 9,501,568 | B2 | 11/2016 | Rafii |
| 9,510,044 | B1 | 11/2016 | Pereira et al. |
| 9,510,057 | B2 | 11/2016 | Harron et al. |
| 2001/0001160 | A1 | 5/2001 | Shoff et al. |
| 2001/0011226 | A1 | 8/2001 | Greer et al. |
| 2001/0016501 | A1 | 8/2001 | King |
| 2001/0016947 | A1 | 8/2001 | Nishikawa et al. |
| 2001/0029583 | A1 | 10/2001 | Palatov et al. |
| 2001/0036224 | A1 | 11/2001 | Demelloet et al. |
| 2001/0039658 | A1 | 11/2001 | Walton |
| 2001/0049620 | A1 | 12/2001 | Blasko |
| 2001/0054155 | A1 | 12/2001 | Hagan et al. |
| 2002/0012347 | A1 | 1/2002 | Fitzpatrick |
| 2002/0015105 | A1 | 2/2002 | Abe et al. |
| 2002/0019769 | A1 | 2/2002 | Barritz et al. |
| 2002/0026635 | A1 | 2/2002 | Wheeler et al. |
| 2002/0032906 | A1 | 3/2002 | Grossman |
| 2002/0042914 | A1 | 4/2002 | Walker et al. |
| 2002/0044659 | A1 | 4/2002 | Ohta |
| 2002/0044683 | A1 | 4/2002 | Deshpande et al. |
| 2002/0052965 | A1 | 5/2002 | Dowling |
| 2002/0059633 | A1 | 5/2002 | Harkness et al. |
| 2002/0066100 | A1 | 5/2002 | Hoang |
| 2002/0069100 | A1 | 6/2002 | Arberman |
| 2002/0072966 | A1 | 6/2002 | Eldering et al. |
| 2002/0072982 | A1 | 6/2002 | Barton et al. |
| 2002/0078456 | A1 | 6/2002 | Hudson et al. |
| 2002/0083435 | A1 | 6/2002 | Blasko et al. |
| 2002/0083441 | A1 | 6/2002 | Flickinger et al. |
| 2002/0083443 | A1 | 6/2002 | Eldering et al. |
| 2002/0087401 | A1 | 7/2002 | Leapman et al. |
| 2002/0087545 | A1 | 7/2002 | Bright et al. |
| 2002/0087975 | A1 | 7/2002 | Schlack |
| 2002/0087976 | A1 | 7/2002 | Kaplan et al. |
| 2002/0087978 | A1 | 7/2002 | Nicholson et al. |
| 2002/0091763 | A1 | 7/2002 | Shah et al. |
| 2002/0104083 | A1 | 8/2002 | Hendricks et al. |
| 2002/0116195 | A1 | 8/2002 | Pitman et al. |
| 2002/0116549 | A1 | 8/2002 | Raffaele et al. |
| 2002/0120498 | A1 | 8/2002 | Gordon et al. |
| 2002/0120925 | A1 | 8/2002 | Logan |
| 2002/0123928 | A1 | 9/2002 | Eldering et al. |
| 2002/0133490 | A1 | 9/2002 | Conkwright et al. |
| 2002/0133534 | A1 | 9/2002 | Forslow |
| 2002/0138842 | A1 | 9/2002 | Chong et al. |
| 2002/0143782 | A1 | 10/2002 | Headings et al. |
| 2002/0144262 | A1 | 10/2002 | Plotnick et al. |
| 2002/0147611 | A1 | 10/2002 | Greene et al. |
| 2002/0151992 | A1 | 10/2002 | Hoffberg et al. |
| 2002/0152474 | A1 | 10/2002 | Dudkiewicz |
| 2002/0161741 | A1 | 10/2002 | Wang et al. |
| 2002/0162117 | A1 | 10/2002 | Pearson et al. |
| 2002/0162118 | A1 | 10/2002 | Levy et al. |
| 2002/0174197 | A1 | 11/2002 | Schimke et al. |
| 2002/0178447 | A1 | 11/2002 | Plotnick et al. |
| 2002/0196789 | A1 | 12/2002 | Patton |
| 2003/0001883 | A1 * | 1/2003 | Wang .................. G06F 3/0481 715/736 |
| 2003/0009538 | A1 | 1/2003 | Shah et al. |
| 2003/0023489 | A1 | 1/2003 | McGuire et al. |
| 2003/0028433 | A1 | 2/2003 | Merriman et al. |

(56) References Cited

U.S. PATENT DOCUMENTS

| | | |
|---|---|---|
| 2003/0030752 A1 | 2/2003 | Begeja et al. |
| 2003/0031176 A1 | 2/2003 | Sim |
| 2003/0036949 A1 | 2/2003 | Kaddeche et al. |
| 2003/0070167 A1 | 4/2003 | Holtz et al. |
| 2003/0079226 A1 | 4/2003 | Barrett |
| 2003/0097426 A1 | 5/2003 | Parry |
| 2003/0097657 A1 | 5/2003 | Zhou et al. |
| 2003/0101451 A1 | 5/2003 | Bentolila et al. |
| 2003/0101454 A1 | 5/2003 | Ozer et al. |
| 2003/0121037 A1 | 6/2003 | Swix et al. |
| 2003/0121046 A1 | 6/2003 | Roy et al. |
| 2003/0135513 A1 | 7/2003 | Quinn et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0154475 A1 | 8/2003 | Rodriguez et al. |
| 2003/0163583 A1 | 8/2003 | Tarr |
| 2003/0163828 A1 | 8/2003 | Agnihotri et al. |
| 2003/0172374 A1 | 9/2003 | Vinson et al. |
| 2003/0188318 A1 | 10/2003 | Liew et al. |
| 2003/0188321 A1 | 10/2003 | Shoff et al. |
| 2003/0226141 A1 | 12/2003 | Krasnow et al. |
| 2003/0229765 A1 | 12/2003 | Suzuoki et al. |
| 2004/0006693 A1 | 1/2004 | Vasnani et al. |
| 2004/0006706 A1 | 1/2004 | Erlingsson |
| 2004/0025034 A1 | 2/2004 | Alessi et al. |
| 2004/0025174 A1 | 2/2004 | Cerrato |
| 2004/0031052 A1 | 2/2004 | Wannamaker et al. |
| 2004/0045020 A1 | 3/2004 | Witt et al. |
| 2004/0059708 A1 | 3/2004 | Dean et al. |
| 2004/0078809 A1 | 4/2004 | Drazin |
| 2004/0088348 A1 | 5/2004 | Yeager et al. |
| 2004/0143349 A1 | 7/2004 | Roberts et al. |
| 2004/0148625 A1 | 7/2004 | Eldering et al. |
| 2004/0158858 A1 | 8/2004 | Paxton et al. |
| 2004/0163101 A1 | 8/2004 | Swix et al. |
| 2004/0207719 A1 | 10/2004 | Tervo et al. |
| 2004/0210630 A1 | 10/2004 | Simonnet et al. |
| 2004/0215509 A1 | 10/2004 | Perry |
| 2004/0215515 A1 | 10/2004 | Perry |
| 2004/0216171 A1 | 10/2004 | Barone et al. |
| 2004/0225686 A1 | 11/2004 | Li et al. |
| 2004/0226035 A1 | 11/2004 | Hauser |
| 2004/0237102 A1 | 11/2004 | Konig et al. |
| 2004/0240562 A1 | 12/2004 | Bargeron et al. |
| 2004/0260791 A1 | 12/2004 | Jerbi et al. |
| 2004/0267723 A1 | 12/2004 | Bharat |
| 2005/0002640 A1 | 1/2005 | Putterman et al. |
| 2005/0015795 A1 | 1/2005 | Iggulden |
| 2005/0015796 A1 | 1/2005 | Bruckner et al. |
| 2005/0021670 A1 | 1/2005 | Maes |
| 2005/0028200 A1 | 2/2005 | Sardera |
| 2005/0028201 A1 | 2/2005 | Klosterman et al. |
| 2005/0028206 A1 | 2/2005 | Cameron et al. |
| 2005/0071224 A1 | 3/2005 | Fikes et al. |
| 2005/0080876 A1 | 4/2005 | Peiffer et al. |
| 2005/0080878 A1 | 4/2005 | Cunningham et al. |
| 2005/0091301 A1* | 4/2005 | Oreizy .................. H04L 12/581 709/200 |
| 2005/0108213 A1 | 5/2005 | Riise et al. |
| 2005/0108745 A1 | 5/2005 | Linzer |
| 2005/0120391 A1 | 6/2005 | Haynie et al. |
| 2005/0165696 A1 | 7/2005 | Jakobsson et al. |
| 2005/0183143 A1 | 8/2005 | Anderholm et al. |
| 2005/0204381 A1 | 9/2005 | Ludvig et al. |
| 2005/0210502 A1 | 9/2005 | Flickinger et al. |
| 2005/0232411 A1 | 10/2005 | Srinivasan et al. |
| 2005/0235318 A1 | 10/2005 | Grauch et al. |
| 2005/0235491 A1 | 11/2005 | Medina et al. |
| 2005/0251577 A1 | 11/2005 | Guo et al. |
| 2005/0251820 A1 | 11/2005 | Stefanik et al. |
| 2005/0259819 A1 | 11/2005 | Oomen et al. |
| 2005/0267896 A1 | 12/2005 | Goodman et al. |
| 2005/0283796 A1 | 12/2005 | Flickinger |
| 2006/0029368 A1 | 2/2006 | Harville |
| 2006/0031381 A1 | 2/2006 | Van Luijt et al. |
| 2006/0064299 A1 | 3/2006 | Uhle et al. |
| 2006/0064583 A1 | 3/2006 | Birnbaum et al. |
| 2006/0072144 A1 | 4/2006 | Dowling et al. |
| 2006/0072542 A1 | 4/2006 | Sinnreich et al. |
| 2006/0085383 A1 | 4/2006 | Mantle et al. |
| 2006/0085642 A1 | 4/2006 | Multerer et al. |
| 2006/0092834 A1 | 5/2006 | Honishi et al. |
| 2006/0133414 A1 | 6/2006 | Luoma et al. |
| 2006/0136964 A1 | 6/2006 | Diez et al. |
| 2006/0143188 A1 | 6/2006 | Bright et al. |
| 2006/0149624 A1 | 7/2006 | Baluja et al. |
| 2006/0153296 A1 | 7/2006 | Deng |
| 2006/0156362 A1 | 7/2006 | Perrot |
| 2006/0168291 A1 | 7/2006 | van Zoest et al. |
| 2006/0168616 A1 | 7/2006 | Candelore |
| 2006/0195860 A1 | 8/2006 | Eldering et al. |
| 2006/0212908 A1 | 9/2006 | Hunter et al. |
| 2006/0218617 A1 | 9/2006 | Bradstreet et al. |
| 2006/0230130 A1 | 10/2006 | Cho et al. |
| 2006/0245724 A1 | 11/2006 | Hwang et al. |
| 2006/0247011 A1 | 11/2006 | Gagner |
| 2006/0247937 A1 | 11/2006 | Binding et al. |
| 2006/0248558 A1 | 11/2006 | Barton et al. |
| 2006/0253330 A1 | 11/2006 | Maggio et al. |
| 2006/0265493 A1 | 11/2006 | Brindley et al. |
| 2006/0287912 A1 | 12/2006 | Raghuvamshi |
| 2007/0047781 A1 | 3/2007 | Hull et al. |
| 2007/0050832 A1 | 3/2007 | Wright et al. |
| 2007/0050854 A1 | 3/2007 | Cooperstein et al. |
| 2007/0056008 A1 | 3/2007 | Nagamoto et al. |
| 2007/0061724 A1 | 3/2007 | Slothouber et al. |
| 2007/0061831 A1 | 3/2007 | Savoor et al. |
| 2007/0072676 A1 | 3/2007 | Baluja |
| 2007/0073581 A1 | 3/2007 | Kempe et al. |
| 2007/0078706 A1 | 4/2007 | Datta et al. |
| 2007/0083908 A1 | 4/2007 | McCarthy et al. |
| 2007/0088801 A1 | 4/2007 | Levkovitz et al. |
| 2007/0088852 A1 | 4/2007 | Levkovitz |
| 2007/0089158 A1 | 4/2007 | Clark |
| 2007/0100690 A1 | 5/2007 | Hopkins |
| 2007/0106405 A1 | 5/2007 | Cook et al. |
| 2007/0106721 A1 | 5/2007 | Schloter |
| 2007/0108721 A1 | 5/2007 | Bayne et al. |
| 2007/0109449 A1 | 5/2007 | Cheung |
| 2007/0113243 A1 | 5/2007 | Brey |
| 2007/0113263 A1 | 5/2007 | Chatani |
| 2007/0116365 A1 | 5/2007 | Kloer |
| 2007/0124756 A1 | 5/2007 | Covell et al. |
| 2007/0129108 A1* | 6/2007 | Swanburg ......... H04M 1/72522 455/556.1 |
| 2007/0143796 A1 | 6/2007 | Malik |
| 2007/0156726 A1 | 7/2007 | Levy |
| 2007/0157231 A1 | 7/2007 | Eldering et al. |
| 2007/0168389 A1 | 7/2007 | Lipscomb |
| 2007/0174059 A1 | 7/2007 | Rhoads et al. |
| 2007/0180459 A1 | 8/2007 | Smithpeters et al. |
| 2007/0186240 A1 | 8/2007 | Ward et al. |
| 2007/0192450 A1 | 8/2007 | Lewis |
| 2007/0198339 A1 | 8/2007 | Shen et al. |
| 2007/0208619 A1 | 9/2007 | Branam et al. |
| 2007/0208711 A1 | 9/2007 | Rhoads et al. |
| 2007/0220024 A1 | 9/2007 | Putterman et al. |
| 2007/0220575 A1 | 9/2007 | Cooper et al. |
| 2007/0234382 A1 | 10/2007 | Swix et al. |
| 2007/0244750 A1 | 10/2007 | Grannan et al. |
| 2007/0250590 A1 | 10/2007 | Flannery et al. |
| 2007/0250716 A1 | 10/2007 | Brunk et al. |
| 2007/0253594 A1 | 11/2007 | Lu et al. |
| 2007/0260520 A1 | 11/2007 | Jha et al. |
| 2007/0266403 A1 | 11/2007 | Ou et al. |
| 2007/0271300 A1 | 11/2007 | Ramaswamy |
| 2007/0274537 A1 | 11/2007 | Srinivasan |
| 2007/0283384 A1 | 12/2007 | Haeuser et al. |
| 2007/0283402 A1 | 12/2007 | Yu |
| 2007/0288985 A1 | 12/2007 | Candelore et al. |
| 2007/0291747 A1 | 12/2007 | Stern et al. |
| 2007/0291761 A1 | 12/2007 | Kauniskangas et al. |
| 2007/0300264 A1 | 12/2007 | Turner |

(56) References Cited

U.S. PATENT DOCUMENTS

| | | |
|---|---|---|
| 2007/0300273 A1 | 12/2007 | Turner |
| 2007/0300280 A1 | 12/2007 | Turner et al. |
| 2008/0004957 A1 | 1/2008 | Hildreth et al. |
| 2008/0010133 A1 | 1/2008 | Pyhalammi et al. |
| 2008/0040666 A1 | 2/2008 | Wang et al. |
| 2008/0040767 A1 | 2/2008 | McCarthy et al. |
| 2008/0046945 A1 | 2/2008 | Hanley |
| 2008/0052195 A1 | 2/2008 | Roth et al. |
| 2008/0059285 A1 | 3/2008 | Hamoui |
| 2008/0060002 A1 | 3/2008 | Noll et al. |
| 2008/0066080 A1 | 3/2008 | Campbell |
| 2008/0066098 A1 | 3/2008 | Witteman et al. |
| 2008/0089551 A1 | 4/2008 | Heather et al. |
| 2008/0109376 A1 | 5/2008 | Walsh et al. |
| 2008/0109844 A1 | 5/2008 | Baldeschwieler et al. |
| 2008/0109888 A1 | 5/2008 | Ullah |
| 2008/0127263 A1 | 5/2008 | Klosterman et al. |
| 2008/0140476 A1 | 6/2008 | Anand et al. |
| 2008/0154678 A1 | 6/2008 | Botelho |
| 2008/0155588 A1 | 6/2008 | Roberts et al. |
| 2008/0155591 A1 | 6/2008 | Mahajan et al. |
| 2008/0155627 A1 | 6/2008 | O'Connor et al. |
| 2008/0172243 A1 | 7/2008 | Kelly |
| 2008/0172747 A1 | 7/2008 | Hurtado et al. |
| 2008/0174570 A1 | 7/2008 | Jobs et al. |
| 2008/0181225 A1 | 7/2008 | Zampiello |
| 2008/0186933 A1 | 8/2008 | Willman et al. |
| 2008/0189757 A1 | 8/2008 | Schackow et al. |
| 2008/0195457 A1 | 8/2008 | Sherman et al. |
| 2008/0195749 A1* | 8/2008 | Krig ............ H04L 67/14 709/232 |
| 2008/0201222 A1 | 8/2008 | Lahaix |
| 2008/0201734 A1 | 8/2008 | Lyon et al. |
| 2008/0221987 A1 | 9/2008 | Sundaresan et al. |
| 2008/0222045 A1 | 9/2008 | Mukerji et al. |
| 2008/0222711 A1 | 9/2008 | Michaelis |
| 2008/0228581 A1 | 9/2008 | Yonezaki et al. |
| 2008/0229335 A1 | 9/2008 | Robbin et al. |
| 2008/0243535 A1 | 10/2008 | Binding et al. |
| 2008/0244418 A1 | 10/2008 | Manolescu et al. |
| 2008/0263600 A1 | 10/2008 | Olague et al. |
| 2008/0268828 A1* | 10/2008 | Nagaraja ............ G06F 9/505 455/419 |
| 2008/0276265 A1 | 11/2008 | Topchy et al. |
| 2008/0276266 A1 | 11/2008 | Huchital et al. |
| 2008/0276270 A1 | 11/2008 | Kotaru et al. |
| 2008/0288631 A1 | 11/2008 | Faisal et al. |
| 2008/0300011 A1 | 12/2008 | Rhoads et al. |
| 2008/0306820 A1 | 12/2008 | Passmore |
| 2008/0307460 A1 | 12/2008 | Knudson et al. |
| 2008/0310731 A1 | 12/2008 | Stojancic et al. |
| 2008/0313140 A1 | 12/2008 | Pereira et al. |
| 2008/0313648 A1 | 12/2008 | Wang et al. |
| 2008/0317278 A1 | 12/2008 | Lefebvre et al. |
| 2009/0006207 A1 | 1/2009 | Datar et al. |
| 2009/0011744 A1 | 1/2009 | Daley et al. |
| 2009/0044223 A1 | 2/2009 | Jiang et al. |
| 2009/0049384 A1* | 2/2009 | Yau ............ G06F 3/04817 715/716 |
| 2009/0052784 A1 | 2/2009 | Covell et al. |
| 2009/0055537 A1 | 2/2009 | Takei et al. |
| 2009/0061841 A1 | 3/2009 | Chaudhri et al. |
| 2009/0063691 A1 | 3/2009 | Kalofonos et al. |
| 2009/0070473 A1 | 3/2009 | Baum et al. |
| 2009/0076821 A1 | 3/2009 | Brenner et al. |
| 2009/0077580 A1 | 3/2009 | Konig et al. |
| 2009/0083417 A1 | 3/2009 | Hughes et al. |
| 2009/0088878 A1 | 4/2009 | Otsuka et al. |
| 2009/0089251 A1 | 4/2009 | Johnston et al. |
| 2009/0094093 A1 | 4/2009 | Phan |
| 2009/0100361 A1 | 4/2009 | Abello et al. |
| 2009/0119576 A1 | 5/2009 | Pepper et al. |
| 2009/0147718 A1 | 6/2009 | Liu et al. |
| 2009/0153289 A1 | 6/2009 | Hope et al. |
| 2009/0163227 A1 | 6/2009 | Collins |
| 2009/0164483 A1 | 6/2009 | Miles |
| 2009/0164641 A1 | 6/2009 | Rogers et al. |
| 2009/0164904 A1 | 6/2009 | Horowitz et al. |
| 2009/0165140 A1 | 6/2009 | Robinson et al. |
| 2009/0172728 A1 | 7/2009 | Shkedi et al. |
| 2009/0172746 A1 | 7/2009 | Aldrey et al. |
| 2009/0185723 A1 | 7/2009 | Kurtz et al. |
| 2009/0197524 A1 | 8/2009 | Haff et al. |
| 2009/0199236 A1 | 8/2009 | Barrett et al. |
| 2009/0199283 A1 | 8/2009 | Jain |
| 2009/0210899 A1 | 8/2009 | Lawrence-Apfelbaum et al. |
| 2009/0210902 A1 | 8/2009 | Slaney et al. |
| 2009/0216768 A1 | 8/2009 | Zwilling et al. |
| 2009/0231485 A1 | 9/2009 | Steinke |
| 2009/0232305 A1 | 9/2009 | Alessi et al. |
| 2009/0234738 A1 | 9/2009 | Britton et al. |
| 2009/0235312 A1 | 9/2009 | Morad et al. |
| 2009/0240821 A1 | 9/2009 | Juncker et al. |
| 2009/0248736 A1 | 10/2009 | Adelman et al. |
| 2009/0254554 A1 | 10/2009 | Hicken |
| 2009/0254572 A1 | 10/2009 | Redlich et al. |
| 2009/0259612 A1 | 10/2009 | Hanson |
| 2009/0271398 A1 | 10/2009 | Scherf et al. |
| 2009/0276313 A1 | 11/2009 | Wilhelm |
| 2009/0292610 A1 | 11/2009 | Quach et al. |
| 2009/0298480 A1 | 12/2009 | Khambete et al. |
| 2009/0299817 A1 | 12/2009 | Fok et al. |
| 2009/0299843 A1 | 12/2009 | Shkedi |
| 2009/0300109 A1 | 12/2009 | Porter |
| 2009/0307048 A1 | 12/2009 | Grossman |
| 2009/0327076 A1 | 12/2009 | Sinyagin et al. |
| 2009/0327496 A1 | 12/2009 | Klemets et al. |
| 2010/0007797 A1 | 1/2010 | Stojancic |
| 2010/0022231 A1 | 1/2010 | Heins et al. |
| 2010/0023392 A1 | 1/2010 | Merriman et al. |
| 2010/0023499 A1 | 1/2010 | Johnson et al. |
| 2010/0023582 A1 | 1/2010 | Pedersen et al. |
| 2010/0049711 A1 | 2/2010 | Singh et al. |
| 2010/0050220 A1 | 2/2010 | Rys et al. |
| 2010/0058380 A1 | 3/2010 | Yu et al. |
| 2010/0063970 A1 | 3/2010 | Kim |
| 2010/0071070 A1 | 3/2010 | Jawa et al. |
| 2010/0083303 A1 | 4/2010 | Redei et al. |
| 2010/0094897 A1 | 4/2010 | Sumrall et al. |
| 2010/0099359 A1 | 4/2010 | Lee et al. |
| 2010/0107189 A1 | 4/2010 | Steelberg et al. |
| 2010/0119208 A1 | 5/2010 | Davis et al. |
| 2010/0121891 A1 | 5/2010 | Zampiello |
| 2010/0131973 A1 | 5/2010 | Dillon et al. |
| 2010/0145938 A1 | 6/2010 | Boetje et al. |
| 2010/0146552 A1 | 6/2010 | Hassell et al. |
| 2010/0158391 A1 | 6/2010 | Cunningham et al. |
| 2010/0161424 A1 | 6/2010 | Sylvain |
| 2010/0174605 A1 | 7/2010 | Dean et al. |
| 2010/0175078 A1 | 7/2010 | Knudson et al. |
| 2010/0180216 A1 | 7/2010 | Bates et al. |
| 2010/0185513 A1 | 7/2010 | Anderson et al. |
| 2010/0199188 A1 | 8/2010 | Abu-Hakima et al. |
| 2010/0205166 A1 | 8/2010 | Boulter et al. |
| 2010/0205562 A1 | 8/2010 | de Heer |
| 2010/0205628 A1 | 8/2010 | Davis et al. |
| 2010/0226532 A1 | 9/2010 | Luo et al. |
| 2010/0228611 A1 | 9/2010 | Shenfield |
| 2010/0228625 A1 | 9/2010 | Priyadarshan et al. |
| 2010/0251278 A1 | 9/2010 | Agarwal et al. |
| 2010/0251289 A1 | 9/2010 | Agarwal et al. |
| 2010/0257052 A1 | 10/2010 | Zito et al. |
| 2010/0269138 A1 | 10/2010 | Krikorian et al. |
| 2010/0287026 A1 | 11/2010 | Smith |
| 2010/0287049 A1 | 11/2010 | Rousso et al. |
| 2010/0306193 A1 | 12/2010 | Pereira et al. |
| 2010/0306773 A1 | 12/2010 | Lee et al. |
| 2010/0306805 A1 | 12/2010 | Neumeier et al. |
| 2010/0306808 A1 | 12/2010 | Neumeier et al. |
| 2010/0311345 A1 | 12/2010 | Santori et al. |
| 2010/0318628 A1 | 12/2010 | Pacella et al. |
| 2010/0318917 A1 | 12/2010 | Holladay et al. |
| 2010/0319062 A1 | 12/2010 | Danieli et al. |
| 2010/0324992 A1 | 12/2010 | Birch |

(56) References Cited

U.S. PATENT DOCUMENTS

| | | |
|---|---|---|
| 2010/0325495 A1 | 12/2010 | Talla et al. |
| 2010/0325552 A1 | 12/2010 | Sloo et al. |
| 2011/0010737 A1 | 1/2011 | Bouazizi et al. |
| 2011/0029555 A1 | 2/2011 | Gao et al. |
| 2011/0029666 A1 | 2/2011 | Lopatecki et al. |
| 2011/0032334 A1 | 2/2011 | Raveendran et al. |
| 2011/0043652 A1 | 2/2011 | King et al. |
| 2011/0061073 A1 | 3/2011 | Nicholson et al. |
| 2011/0078753 A1 | 3/2011 | Christianson et al. |
| 2011/0082939 A1 | 4/2011 | Montemurro et al. |
| 2011/0082940 A1 | 4/2011 | Montemurro et al. |
| 2011/0088075 A1 | 4/2011 | Eyer |
| 2011/0099065 A1 | 4/2011 | Georgis et al. |
| 2011/0099609 A1 | 4/2011 | Malhotra et al. |
| 2011/0107385 A1 | 5/2011 | Hudson et al. |
| 2011/0119139 A1 | 5/2011 | Dean et al. |
| 2011/0122836 A1 | 5/2011 | Kim |
| 2011/0125586 A1 | 5/2011 | Evans |
| 2011/0131597 A1 | 6/2011 | Cera et al. |
| 2011/0136539 A1 | 6/2011 | Jain et al. |
| 2011/0138059 A1 | 6/2011 | Schleifer et al. |
| 2011/0145926 A1 | 6/2011 | Dalcher et al. |
| 2011/0154498 A1 | 6/2011 | Fissel et al. |
| 2011/0179010 A1 | 7/2011 | Lin et al. |
| 2011/0179447 A1 | 7/2011 | Harkness et al. |
| 2011/0191178 A1 | 8/2011 | Newberg et al. |
| 2011/0191352 A1 | 8/2011 | Jones et al. |
| 2011/0213881 A1 | 9/2011 | Stavenow et al. |
| 2011/0219322 A1 | 9/2011 | Ramamurthy et al. |
| 2011/0238379 A1 | 9/2011 | Misra et al. |
| 2011/0247044 A1 | 10/2011 | Jacoby |
| 2011/0251987 A1 | 10/2011 | Buchheit |
| 2011/0251992 A1 | 10/2011 | Bethlehem et al. |
| 2011/0265114 A1 | 10/2011 | Legrand |
| 2011/0265116 A1 | 10/2011 | Stern et al. |
| 2011/0270672 A1 | 11/2011 | Hillard et al. |
| 2011/0273625 A1 | 11/2011 | McMahon et al. |
| 2011/0274179 A1 | 11/2011 | Holden |
| 2011/0279445 A1 | 11/2011 | Murphy et al. |
| 2011/0283322 A1 | 11/2011 | Hamano |
| 2011/0289114 A1 | 11/2011 | Yu et al. |
| 2011/0289524 A1 | 11/2011 | Toner et al. |
| 2011/0289532 A1 | 11/2011 | Yu et al. |
| 2011/0289544 A1 | 11/2011 | Goosen et al. |
| 2011/0296303 A1 | 12/2011 | Duquene et al. |
| 2011/0304771 A1 | 12/2011 | Blanchard et al. |
| 2011/0310100 A1 | 12/2011 | Adimatyam et al. |
| 2011/0314051 A1 | 12/2011 | Cavet et al. |
| 2011/0317885 A1 | 12/2011 | Leung et al. |
| 2011/0320610 A1* | 12/2011 | Ragunathan ....... G06Q 10/0633 709/227 |
| 2011/0321003 A1 | 12/2011 | Doig et al. |
| 2011/0321109 A1 | 12/2011 | Hudson et al. |
| 2012/0011541 A1 | 1/2012 | McCarthy |
| 2012/0017240 A1 | 1/2012 | Shkedi |
| 2012/0023522 A1 | 1/2012 | Anderson et al. |
| 2012/0047277 A1 | 2/2012 | Keidar et al. |
| 2012/0054300 A1 | 3/2012 | Marchwicki et al. |
| 2012/0054440 A1 | 3/2012 | Doig et al. |
| 2012/0069131 A1 | 3/2012 | Abelow |
| 2012/0072291 A1 | 3/2012 | Bharat |
| 2012/0072420 A1 | 3/2012 | Moganti et al. |
| 2012/0076049 A1 | 3/2012 | Rudolf et al. |
| 2012/0084814 A1 | 4/2012 | Olague et al. |
| 2012/0086857 A1 | 4/2012 | Kim et al. |
| 2012/0089700 A1 | 4/2012 | Safruti et al. |
| 2012/0101907 A1 | 4/2012 | Dodda |
| 2012/0102515 A1 | 4/2012 | Ramaswamy |
| 2012/0109755 A1 | 5/2012 | Birch et al. |
| 2012/0124498 A1 | 5/2012 | Santoro et al. |
| 2012/0130822 A1 | 5/2012 | Patwa et al. |
| 2012/0130825 A1 | 5/2012 | Evans |
| 2012/0131095 A1 | 5/2012 | Luna et al. |
| 2012/0144416 A1 | 6/2012 | Wetzer et al. |
| 2012/0150944 A1 | 6/2012 | Steelberg et al. |
| 2012/0151015 A1 | 6/2012 | Plastina et al. |
| 2012/0151521 A1 | 6/2012 | Gilley et al. |
| 2012/0159542 A1 | 6/2012 | Minwalla |
| 2012/0163770 A1 | 6/2012 | Kaiser et al. |
| 2012/0163776 A1 | 6/2012 | Hassell et al. |
| 2012/0167001 A1 | 6/2012 | Ortiz et al. |
| 2012/0167132 A1 | 6/2012 | Mathews et al. |
| 2012/0174155 A1 | 7/2012 | Mowrey et al. |
| 2012/0191716 A1 | 7/2012 | Omoigui |
| 2012/0207402 A1 | 8/2012 | Stojancic et al. |
| 2012/0209706 A1 | 8/2012 | Ramer et al. |
| 2012/0209726 A1 | 8/2012 | Dean et al. |
| 2012/0210224 A1 | 8/2012 | Wong et al. |
| 2012/0215622 A1 | 8/2012 | Ramer et al. |
| 2012/0233163 A1 | 9/2012 | Kirkpatrick |
| 2012/0240151 A1 | 9/2012 | Tapper |
| 2012/0245722 A1 | 9/2012 | Yamamura |
| 2012/0257110 A1 | 10/2012 | Amundsen |
| 2012/0260184 A1 | 10/2012 | Dawes et al. |
| 2012/0265616 A1 | 10/2012 | Cao et al. |
| 2012/0272134 A1 | 10/2012 | Steelberg et al. |
| 2012/0278825 A1 | 11/2012 | Tran et al. |
| 2012/0280908 A1 | 11/2012 | Rhoads et al. |
| 2012/0284746 A1 | 11/2012 | Evans et al. |
| 2012/0284757 A1 | 11/2012 | Rajapakse |
| 2012/0297406 A1 | 11/2012 | Bartholomay et al. |
| 2012/0303710 A1 | 11/2012 | Roberts et al. |
| 2012/0311074 A1 | 12/2012 | Arini et al. |
| 2012/0311629 A1 | 12/2012 | Zaslavsky et al. |
| 2012/0311702 A1 | 12/2012 | Krstic et al. |
| 2012/0315014 A1 | 12/2012 | Shuster |
| 2012/0317175 A1 | 12/2012 | Husain et al. |
| 2012/0317178 A1 | 12/2012 | Husain et al. |
| 2012/0317181 A1 | 12/2012 | Husain et al. |
| 2012/0324495 A1 | 12/2012 | Matthews et al. |
| 2012/0324566 A1 | 12/2012 | Baum et al. |
| 2013/0013665 A1 | 1/2013 | Sng et al. |
| 2013/0019262 A1 | 1/2013 | Bhatia et al. |
| 2013/0019268 A1 | 1/2013 | Fitzsimmons et al. |
| 2013/0031215 A1* | 1/2013 | Macrae ............... H04L 12/1868 709/219 |
| 2013/0036434 A1 | 2/2013 | Shkedi et al. |
| 2013/0041664 A1 | 2/2013 | McKoen et al. |
| 2013/0042262 A1 | 2/2013 | Riethmueller |
| 2013/0045681 A1 | 2/2013 | Dua |
| 2013/0051300 A1* | 2/2013 | He ....................... H04L 12/189 370/312 |
| 2013/0055309 A1 | 2/2013 | Dittus |
| 2013/0060905 A1 | 3/2013 | Mickens et al. |
| 2013/0061259 A1 | 3/2013 | Raman et al. |
| 2013/0061267 A1 | 3/2013 | Cansino et al. |
| 2013/0078946 A1 | 3/2013 | Pecen et al. |
| 2013/0080242 A1 | 3/2013 | Alhadeff et al. |
| 2013/0085865 A1 | 4/2013 | Zhou et al. |
| 2013/0094423 A1 | 4/2013 | Wengrovitz et al. |
| 2013/0104160 A1 | 4/2013 | Beeson et al. |
| 2013/0104232 A1 | 4/2013 | Johnson et al. |
| 2013/0117782 A1 | 5/2013 | Mehta et al. |
| 2013/0139209 A1 | 5/2013 | Urrabazo et al. |
| 2013/0139210 A1 | 5/2013 | Huang et al. |
| 2013/0151728 A1 | 6/2013 | Currier |
| 2013/0185153 A1 | 7/2013 | Howcroft |
| 2013/0185422 A1 | 7/2013 | Rogers et al. |
| 2013/0202150 A1 | 8/2013 | Sinha et al. |
| 2013/0205317 A1 | 8/2013 | Sinha et al. |
| 2013/0205319 A1 | 8/2013 | Sinha et al. |
| 2013/0205348 A1 | 8/2013 | Hudson et al. |
| 2013/0238702 A1 | 9/2013 | Sheth et al. |
| 2013/0254884 A1 | 9/2013 | Dalcher et al. |
| 2013/0263166 A1 | 10/2013 | Fleischman |
| 2013/0290502 A1 | 10/2013 | Bilobrov et al. |
| 2013/0297727 A1 | 11/2013 | Levy |
| 2013/0311168 A1 | 11/2013 | Li |
| 2013/0318157 A1 | 11/2013 | Harrison |
| 2013/0326554 A1 | 12/2013 | Shkedi |
| 2013/0340011 A1 | 12/2013 | Rodriguez |
| 2013/0340050 A1 | 12/2013 | Harrison |
| 2014/0002247 A1 | 1/2014 | Harrison et al. |
| 2014/0007155 A1 | 1/2014 | Vemparala et al. |

(56) References Cited

U.S. PATENT DOCUMENTS

| | | |
|---|---|---|
| 2014/0007156 A1 | 1/2014 | Harrison et al. |
| 2014/0007157 A1 | 1/2014 | Harrison et al. |
| 2014/0007162 A1 | 1/2014 | Harrison |
| 2014/0007187 A1 | 1/2014 | Harrison |
| 2014/0007262 A1 | 1/2014 | Metsäpelto et al. |
| 2014/0029847 A1 | 1/2014 | Frye et al. |
| 2014/0032286 A1 | 1/2014 | Lansford et al. |
| 2014/0040027 A1 | 2/2014 | Darrell Anderson et al. |
| 2014/0040443 A1 | 2/2014 | Sheng-Jie Syu et al. |
| 2014/0047480 A1 | 2/2014 | Knudson et al. |
| 2014/0074621 A1 | 3/2014 | Chai et al. |
| 2014/0074839 A1 | 3/2014 | Popp et al. |
| 2014/0082663 A1 | 3/2014 | Neumeier et al. |
| 2014/0090008 A1 | 3/2014 | Li et al. |
| 2014/0130076 A1 | 5/2014 | Moore et al. |
| 2014/0141714 A1 | 5/2014 | Ghosh et al. |
| 2014/0143043 A1 | 5/2014 | Wickramasuriya et al. |
| 2014/0150006 A1 | 5/2014 | Vemparala et al. |
| 2014/0181856 A1 | 6/2014 | Lewis |
| 2014/0184827 A1 | 7/2014 | Chartrand |
| 2014/0195584 A1 | 7/2014 | Harrison |
| 2014/0195620 A1 | 7/2014 | Srinivasan et al. |
| 2014/0195649 A1 | 7/2014 | Harrison |
| 2014/0195690 A1 | 7/2014 | Harrison et al. |
| 2014/0195934 A1 | 7/2014 | Harrison |
| 2014/0196085 A1 | 7/2014 | Dunker et al. |
| 2014/0201645 A1 | 7/2014 | Mo et al. |
| 2014/0201769 A1 | 7/2014 | Neumeier et al. |
| 2014/0201772 A1 | 7/2014 | Neumeier et al. |
| 2014/0201773 A1 | 7/2014 | Neumeier et al. |
| 2014/0201774 A1 | 7/2014 | Neumeier et al. |
| 2014/0201787 A1 | 7/2014 | Neumeier et al. |
| 2014/0218620 A1 | 8/2014 | Griffin et al. |
| 2014/0229271 A1 | 8/2014 | Clapp et al. |
| 2014/0237496 A1 | 8/2014 | Julian |
| 2014/0244351 A1 | 8/2014 | Symons |
| 2014/0244863 A1 | 8/2014 | Bradley et al. |
| 2014/0280304 A1 | 9/2014 | Scherf et al. |
| 2014/0282673 A1 | 9/2014 | Neumeier et al. |
| 2014/0282735 A1 | 9/2014 | Davis et al. |
| 2014/0289315 A1 | 9/2014 | Harrison |
| 2015/0003799 A1 | 1/2015 | Oostveen et al. |
| 2015/0074526 A1 | 3/2015 | Brenner et al. |
| 2015/0074703 A1 | 3/2015 | Cremer et al. |
| 2015/0082331 A1 | 3/2015 | Neumeier et al. |
| 2015/0089526 A1 | 3/2015 | Gordon |
| 2015/0095972 A1 | 4/2015 | Sharma et al. |
| 2015/0178280 A1 | 6/2015 | DiMaria et al. |
| 2015/0181263 A1 | 6/2015 | Gordon |
| 2015/0181268 A1 | 6/2015 | Navin et al. |
| 2015/0181311 A1 | 6/2015 | Navin et al. |
| 2015/0194151 A1 | 7/2015 | Jeyachandran et al. |
| 2015/0195597 A1 | 7/2015 | Gordon |
| 2015/0228306 A1 | 8/2015 | Roberts et al. |
| 2015/0229690 A1 | 8/2015 | Raesig et al. |
| 2015/0245090 A1 | 8/2015 | Davis et al. |
| 2015/0262229 A1 | 9/2015 | Brenner et al. |
| 2015/0302086 A1 | 10/2015 | Roberts et al. |
| 2015/0331660 A1 | 11/2015 | Kalampoukas et al. |
| 2015/0331661 A1 | 11/2015 | Kalampoukas et al. |
| 2015/0331938 A1 | 11/2015 | Kalampoukas et al. |
| 2015/0332669 A1 | 11/2015 | Kalampoukas et al. |
| 2015/0332687 A1 | 11/2015 | Kalampoukas et al. |
| 2015/0350725 A1 | 12/2015 | Zhu et al. |
| 2015/0356178 A1 | 12/2015 | Scherf et al. |
| 2015/0365456 A1 | 12/2015 | Harrison |
| 2016/0007083 A1 | 1/2016 | Gurha |
| 2016/0019598 A1 | 1/2016 | Harrison |
| 2016/0019876 A1 | 1/2016 | Jeffrey et al. |
| 2016/0110537 A1 | 4/2016 | Harrison |
| 2016/0112770 A1 | 4/2016 | Harrison |
| 2016/0124953 A1 | 5/2016 | Cremer et al. |
| 2016/0139756 A1 | 5/2016 | Benson et al. |
| 2016/0140122 A1 | 5/2016 | Harrison |
| 2016/0182971 A1 | 6/2016 | Ortiz et al. |
| 2016/0196105 A1 | 7/2016 | Vartakavi et al. |
| 2016/0196270 A1 | 7/2016 | DiMaria et al. |
| 2016/0196344 A1 | 7/2016 | Cremer et al. |
| 2016/0217799 A1 | 7/2016 | Han et al. |
| 2016/0241540 A1 | 8/2016 | Jeffrey et al. |
| 2016/0267180 A1 | 9/2016 | Harron et al. |
| 2016/0323533 A1 | 11/2016 | Nagorski et al. |
| 2016/0373197 A1 | 12/2016 | Brenner et al. |

FOREIGN PATENT DOCUMENTS

| | | |
|---|---|---|
| CA | 2884534 A1 | 3/2014 |
| CN | 1726489 A | 1/2006 |
| CN | 101147378 A | 3/2008 |
| CN | 101622599 A | 1/2010 |
| CN | 101909201 B | 6/2013 |
| DE | 69815695 T2 | 6/2004 |
| DE | 602004008936 T2 | 6/2008 |
| EP | 1010098 A2 | 6/2000 |
| EP | 1010098 B1 | 6/2003 |
| EP | 1324567 A2 | 7/2003 |
| EP | 1324567 A3 | 8/2003 |
| EP | 1347661 A1 | 9/2003 |
| EP | 1410380 A2 | 4/2004 |
| EP | 1421521 A2 | 5/2004 |
| EP | 1573462 A3 | 10/2005 |
| EP | 1592198 A1 | 11/2005 |
| EP | 1605416 A1 | 12/2005 |
| EP | 1779659 A1 | 5/2007 |
| EP | 1803270 A1 | 7/2007 |
| EP | 1934828 A2 | 6/2008 |
| EP | 1362485 B1 | 8/2008 |
| EP | 1934828 A4 | 10/2008 |
| EP | 2001583 A2 | 12/2008 |
| EP | 1550297 B1 | 3/2009 |
| EP | 2100216 A2 | 9/2009 |
| EP | 1314110 B1 | 10/2009 |
| EP | 2100216 A4 | 12/2009 |
| EP | 2136306 A1 | 12/2009 |
| EP | 1324567 B1 | 1/2010 |
| EP | 2145411 A2 | 1/2010 |
| EP | 2169854 A1 | 3/2010 |
| EP | 1410380 B1 | 4/2010 |
| EP | 1797552 B1 | 4/2010 |
| EP | 2206114 A1 | 7/2010 |
| EP | 2001583 A4 | 9/2010 |
| EP | 2226757 A1 | 9/2010 |
| EP | 2206114 A4 | 7/2012 |
| EP | 1887754 B1 | 12/2012 |
| EP | 2541961 A2 | 1/2013 |
| EP | 2136306 B1 | 3/2013 |
| EP | 2541961 A3 | 4/2013 |
| EP | 1969810 B2 | 8/2013 |
| EP | 2520084 A4 | 11/2013 |
| EP | 2285066 B1 | 5/2014 |
| EP | 2747370 A1 | 6/2014 |
| EP | 2200258 B1 | 11/2014 |
| EP | 2895971 A2 | 7/2015 |
| EP | 2944051 A1 | 11/2015 |
| EP | 2895971 A4 | 5/2016 |
| EP | 3084646 A1 | 10/2016 |
| EP | 2944051 A4 | 11/2016 |
| EP | 3090330 A1 | 11/2016 |
| EP | 3090429 A1 | 11/2016 |
| EP | 3117390 A1 | 1/2017 |
| GB | 2457694 A | 8/2009 |
| JP | 2007220137 A | 8/2007 |
| JP | 2007257820 A | 10/2007 |
| JP | 2007280382 A | 10/2007 |
| JP | 2009075603 A | 4/2009 |
| JP | 2013013092 A | 1/2013 |
| KR | 20030005279 A | 1/2003 |
| KR | 20040021684 A | 3/2004 |
| KR | 20040024870 A | 3/2004 |
| KR | 20040029452 A | 4/2004 |
| KR | 20040086350 A | 10/2004 |
| KR | 20050046815 A | 5/2005 |
| KR | 20050061566 A | 6/2005 |
| KR | 20050061594 A | 6/2005 |

(56) References Cited

FOREIGN PATENT DOCUMENTS

| | | |
|---|---|---|
| KR | 20050086470 A | 8/2005 |
| KR | 20050113614 A | 12/2005 |
| KR | 20050117558 A | 12/2005 |
| KR | 20070095282 A | 9/2007 |
| KR | 20080043358 A | 5/2008 |
| KR | 100961461 B1 | 6/2010 |
| KR | 20150054861 A | 5/2015 |
| KR | 20150106904 A | 9/2015 |
| KR | 1020160101979 A | 8/2016 |
| KR | 20160135751 A | 11/2016 |
| WO | 9512278 A1 | 5/1995 |
| WO | 0052929 A1 | 9/2000 |
| WO | 0054504 A1 | 9/2000 |
| WO | 0144992 A1 | 6/2001 |
| WO | 0182625 A1 | 11/2001 |
| WO | 0189213 A1 | 11/2001 |
| WO | 0189217 A1 | 11/2001 |
| WO | 0231742 A2 | 4/2002 |
| WO | 03009277 A2 | 1/2003 |
| WO | 03012695 A2 | 2/2003 |
| WO | 03019560 A2 | 3/2003 |
| WO | 03025762 A1 | 3/2003 |
| WO | 03009277 A3 | 9/2003 |
| WO | 03019560 A3 | 1/2004 |
| WO | 2003012695 A3 | 3/2004 |
| WO | 2004040416 A2 | 5/2004 |
| WO | 2004044820 A1 | 5/2004 |
| WO | 2005041455 A1 | 5/2005 |
| WO | 2005050620 A1 | 6/2005 |
| WO | 2004040416 A3 | 8/2005 |
| WO | 2005125198 A2 | 12/2005 |
| WO | 2006018790 A1 | 2/2006 |
| WO | 2006041928 A1 | 4/2006 |
| WO | 2007022533 A2 | 2/2007 |
| WO | 2007022533 A3 | 6/2007 |
| WO | 2007103583 A2 | 9/2007 |
| WO | 2007114796 A1 | 10/2007 |
| WO | 2008029188 A1 | 3/2008 |
| WO | 2007103583 A3 | 5/2008 |
| WO | 2008052205 A2 | 5/2008 |
| WO | 2008086104 A2 | 7/2008 |
| WO | 2008086104 A3 | 8/2008 |
| WO | 2008112858 A1 | 9/2008 |
| WO | 2008131247 A1 | 10/2008 |
| WO | 2008137756 A1 | 11/2008 |
| WO | 2009023647 A1 | 2/2009 |
| WO | 2009042858 A1 | 4/2009 |
| WO | 2009091338 A1 | 7/2009 |
| WO | 2009114622 A2 | 9/2009 |
| WO | 2009131861 A2 | 10/2009 |
| WO | 2009132084 A1 | 10/2009 |
| WO | 2008137756 A3 | 12/2009 |
| WO | 2009150425 A2 | 12/2009 |
| WO | 2010046123 A1 | 4/2010 |
| WO | 2010072986 A2 | 7/2010 |
| WO | 2010129693 A1 | 11/2010 |
| WO | 2010151421 A1 | 12/2010 |
| WO | 2011011002 A1 | 1/2011 |
| WO | 2011030231 A1 | 3/2011 |
| WO | 2011090540 A2 | 7/2011 |
| WO | 2011090541 A2 | 7/2011 |
| WO | 2012005994 A1 | 1/2012 |
| WO | 2012013893 A1 | 2/2012 |
| WO | 2012021538 A1 | 2/2012 |
| WO | 2012028976 A1 | 3/2012 |
| WO | 2012051115 A1 | 4/2012 |
| WO | 2012109666 A1 | 8/2012 |
| WO | 2012120253 A1 | 9/2012 |
| WO | 2012154541 A1 | 11/2012 |
| WO | 2013028899 A1 | 2/2013 |
| WO | 2013032787 A1 | 3/2013 |
| WO | 2013068619 A1 | 5/2013 |
| WO | 2013089674 A1 | 6/2013 |
| WO | 2013147587 A1 | 10/2013 |
| WO | 2014042826 A2 | 3/2014 |
| WO | 2014052015 A1 | 4/2014 |
| WO | 2014042826 A3 | 5/2014 |
| WO | 2014107311 A1 | 7/2014 |
| WO | 2014142758 A1 | 9/2014 |
| WO | 2014145929 A1 | 9/2014 |
| WO | 2014145938 A1 | 9/2014 |
| WO | 2014145947 A1 | 9/2014 |
| WO | 2015094558 A1 | 6/2015 |
| WO | 2015102921 A1 | 7/2015 |
| WO | 2015103384 A1 | 7/2015 |
| WO | 2015138601 A1 | 9/2015 |
| WO | 2015167901 A1 | 11/2015 |
| WO | 2015183914 A1 | 12/2015 |
| WO | 2016018472 A2 | 2/2016 |
| WO | 2016018472 A3 | 3/2016 |
| WO | 2016109500 A1 | 7/2016 |
| WO | 2016109553 A2 | 7/2016 |
| WO | 2016109682 A2 | 7/2016 |
| WO | 2016109553 A3 | 8/2016 |
| WO | 2016109682 A3 | 9/2016 |

OTHER PUBLICATIONS

"Sandboxes and Silver Bullets: Vendors Promote New/Old Detection Techniques to Stop Zero-Day Threats", IT Current Analysis Connection Blogs, Mar. 29, 2013 by Paula Musich (p. 1) http://itcblogs.currentanalysis.com/2013/03/29/sandboxes-and-silver-bullets-vendors-promote-newold-detection-techniques-to-stop-zero-day-threats/.

"Introduction to security" (pp. 8) http://help.adobe.com/en_US/flex/using/WS2db454920e96a9e51e63e3d11cObf6167e-7fff. html#WS2db454920e96a9e51e63e3d11c0bf6167e-7ff9.

"Screenshot of Wikipedia page of Samba TV", Jan. 5, 2015 (pp. 2) http://en.wikipedia.org/wiki/Samba_TV.

"Screenshot of Wikipedia page of Smart TV", Jan. 5, 2015 (pp. 4) http://en.wikipedia.org/wiki/Smart_TV.

"Screenshot of Wikipedia page of Interactive television", From Wikipedia, Jan. 5, 2015 (pp. 8) http://en.wikipedia.org/wiki/Interactive_television.

"Screenshot of Wikipedia page of Social television", From Wikipedia, Jan. 5, 2015 (pp. 3) http://en.wikipedia.org/wiki/Social_television.

"Screenshot of Wikipedia page of Enhanced TV", From Wikipedia, Jan. 5, 2015 (p. 1) http://en.wikipedia.org/wiki/Enhanced_TV.

"Screenshot of Wikipedia page of Digital video fingerprinting", From Wikipedia, Jan. 5, 2015 (pp. 4) http://en.wikipedia.org/wiki/Digital_video_fingerprinting.

"Screenshot of Wikipedia page of Second screen", From Wikipedia, Jan. 5, 2015 (pp. 3) http://en.wikipedia.org/wiki/Second_screen.

Reverse Sandboxing with SafeCentral, SafeCentral (pp. 3) http://www.safecentral.com/pdfs/ReverseSandboxing.pdf.

"Collect, Manage, and Analyze everything occurring on your network", RSA Security Analytics, Detect & Investigate Threats. (pp. 5) http://www.emc.com/collateral/data-sheet/security-analytics-infrastructure-ds.pdf.

"Metazen—metadata capture for metagenomes", Standards in Genomic Sciences, by Jared Bischof et al. (pp. 6) http://www.standardsingenomics.com/content/pdf/1944-3277-9-18.pdf.

"Semantic Annotation of Images and Videos for Multimedia Analysis", by Stephan Bloehdorn et al. (pp. 15) http://image.ntua.gr/papers/345.pdf.

"Architecture for Interoperability of Services between an ACAP Receiver and Home Networked Devices", Jan. 15, 2006, by Yu-Seok Bae et al. (pp. 6).

"Smart SoftPhone Device for Networked AudioVisual QoS/QoE Discovery & Measurement", Digital Media Laboratory, Information and Communications University,Republic of Korea, by Jinsul Kim, (pp. 23) http://cdn.intechopen.com/pdfs-wm/5446.pdf.

"Market Potential for Interactive Audio-visual Media", IEEE Xplore, by Andra Leurdijk et al., (p. 1) http://ieeexplore.ieee.org/xpl/login.jsp?tp=&arnumber=1592082& url=http%3A%2F%2Fieeexplore.ieee.org%2Fxpls%2Fabs_all. jsp%3Farnumber%3D1592082.

(56) References Cited

OTHER PUBLICATIONS

"Design of a multi-sender 3D videoconferencing application over an end system multicast protocol", '03 Proceedings of the eleventh ACM international conference on Multimedia, New York, NY, USA, 2003 by Mojtaba Hosseini et al., (p. 1) http://dl.acm.org/citation.cfm?id=957119.

"Cisco Medianet Data Sheet", Cisco 3900 Series Integrated Services Routers, (pp. 8) http://www.cisco.com/c/en/us/products/collateral/routers/3900-series-integrated-services-routers-isr/data_sheet_c78-612429.html.

"Delivery of Personalized and Adaptive Content to Mobile Devices: A Framework and Enabling Technology", Communications of the Association for Information Systems (vol. 12, 2003)183-202, by D. Zhang, (pp. 22) http://aisel.aisnet.org/cgi/viewcontent.cgi?article=3178&context=cais.

"Single Sign-On for Java Web Start Applications Using MyProxy", by Terry Fleury et al. (pp. 7) http://grid.ncsa.illinois.edu/papers/sws-myproxy-jws.pdf.

"MonALISA : A Distributed Monitoring Service Architecture", CHEP03, La Jolla, California, Mar. 24-28, 2003 by H.B. Newman et al. (pp. 8) http://monalisa.caltech.edu/documentation/MOET001.pdf.

"Exploratory geospatial analysis using GeoVISTA Studio: from a desktop to the Web", IEEE Xplore, Dec. 3-6, 2001, by M. Takatsuka et al. (p. 1) http://ieeexplore.ieee.org/xpl/login.jsp?tp=&arnumber=996715&url=http%3A%2F%2Fieeexplore.ieee.org%2Fxpls%2Fabs_all.jsp%3Farnumber%3D996715.

"Comprehensive Multi-platform Collaboration", Department of Computer Science, Columbia University, by kundan Singh et al. (pp. 36) http://www.cs.columbia.edu/~library/TR-repository/reports/reports-2003/cucs-027-03.pdf.

"Privacy-Preserving Remote Diagnostics", The University of Texas at Austin, by Justin Brickell et al. (pp. 10) https://www.cs.utexas.edu/~shmat/shmat_ccs07.pdf.

"Supporting Dynamic Ad hoc Collaboration Capabilities", LBNL, Berkeley, CA 94720, USA, by D. Agarwal et al. (pp. 6) http://arxiv.org/ftp/cs/papers/0307/0307037.pdf.

"A Framework for Classifying Peer-to-Peer Technologies", IEEE Xplore, May 21-24, 2002, by K. Kant et al. (p. 1) http://ieeexplore.ieee.org/xpl/login.jsp?tp=&arnumber=1540491&url=http%3A%2F%2Fieeexplore.ieee.org%2Fiel5%2F10335%2F32898%2F01540491.pdf%3Farnumber%3D1540491.

"Flingo is about to make your smart TV even smarter", Jul. 7, 2011, by Ryan Lawler (pp. 6) https://gigaom.com/2011/07/07/flingo-launch/.

"The TV That Watches You", Aug. 19, 2011, by Tom Simonite (pp. 5) https://www.technologyreview.com/s/425081/the-tv-that-watches-you/.

"Security in the Large: Is Java's Sandbox Scalable?", HP Hewlett Packard Apr. 1998, by Qun Zhong et al.(pp. 9) http://www.hpl.hp.com/techreports/98/HPL-98-79.pdf.

"For Developers", Flingo Article, Oct. 2010, by Flingo https://web.archive.org/web/20101028221214/flingo.org/developers.html.

"Anomaly Detection in Dynamic Execution Environments", NSPW 2002, by Hajime Inoue et al. (pp. 9). http://www.nspw.org/papers/2002/nspw2002-inoue.pdf.

"IPhone Security Analysis", Department of Computer Science San Jose State University, May 2008, by Vaibhav Pandya. (pp. 44) http://www.cs.sjsu.edu/faculty/stamp/students/pandya_vaibhav.pdf.

"I, Me and My Phone: Identity and Personalization using Mobile Devices", HP Invest, Nov. 2007 by Riddhiman Ghosh et al. (pp. 14) http://www.hpl.hp.com/techreports/2007/HPL-2007-184.pdf.

"Extending the web to support personal network services", SAC '13, Mar. 2013, by John Lyle et al. (pp. 6) https://www.cs.ox.ac.uk/files/5273/sac2013.pdf.

"Java and Java Virtual Machine Security Vulnerabilities and their Exploitation Techniques", Black Hat Briefings, Singapore, Oct. 2002, by Delirium. (pp. 91) http://www.blackhat.com/presentations/bh-asia-02/LSD/bh-asia-02-lsd.pdf.

"Shazam Announces Application for iPhone", by Shazam, Jul. 2008. http://news.shazam.com/pressreleases/shazam-announces-application-for-iphone-890432.

"Shazam Launches Android Application Integrated with MySpace and Amazon MP3", by Shazam, Oct. 2008. http://news.shazam.com/pressreleases/shazam-launches-android-application-integrated-with-myspace-and-amazon-mp3-890456.

"The Shazam music recognition service",Communications of the ACM—Music information retrieval, Aug. 2006, by Shazam. https://www.researchgate.net/publication/220423945_The_Shazam_music_recognition_service.

"An Industrial-Strength Audio Search Algorithm", International Conference on Music Information Retrieval, 2003, by Avery Wang. https://www.ee.columbia.edu/~dpwe/papers/Wang03-shazam.pdf.

"It Just Works: UPnP in the Digital Home", The Journal of Spontaneous Networking, Oct. 2004, by Michael Jeronimo. http://www.artirna.com/spontaneous/upnp_digihome.html.

"Data-Confined HTML5 Applications", European Symposium on Research in Computer Security, London Mar. 2013, by Devdatta Akhawe (pp. 18) http://devd.me/papers/dcs-esorics.pdf.

"A Component-based Software Infrastructure for Ubiquitous Computing", Parallel and Distributed Computing, 2005, by Areski Flissi et al. (pp. 22) http://www.lifl.fr/ispdc2005/presentations/flissi_ispdc_slides.pdf.

"A robust image fingerprinting system using the Radon transform", Signal Processing: Image Communication 19 (2004) 325-339, May 2004, by Jin Seo et al. http://www.123seminarsonly.com/Seminar-Reports/027/60224236-Finger-Printing.pdf.

"An Authentication and Authorization Architecture for Jini Services", CiteSeer, by Oct. 2000, by Thomas Schoch et al. http://www.vs.inf.ethz.ch/publ/papers/da-schoch.pdf.

"Analysis and Prediction of Set-Top-Box Reliability in Multi-Application Environments using Artificial Intelligence Techniques"; Spring Technical Forum, 2004,Louis Slothouber et al. (pp. 9) file:///C:/Users/User/Downloads/2004-analysis-and-prediction-of-set-top-box-reliability-in-multi-application-environments-using-artificial-intelligence-techniques%20(1).pdf.

"Artificial Intelligence in Cable TV Applications", Advancing Technology's Agends, Louis Slothouber et al., 2003, (pp. 8) file:///C/Users/User/Downloads/2003-artifcial-intelligence-in-cable-tv-applications%20(2).pdf.

"Exploiting Cross Context Scripting Vulnerabilities in Firefox", Security-Assessment.com Addendum, Apr. 2010, by Nick Freeman et al. (pp. 8) http://www.security-assessment.com/files/whitepapers/Exploiting_Cross_Context_Scripting_vulnerabilities_in_Firefox.pdf.

"Design and Implementation of Fingerprinting-based Broadcasting Content Identification System", Creative Content Research Laboratory, ETRI(Electronics and Telecommunications Research Institute), Feb. 2014, by Jihyun Park et al. http://www.icact.org/upload/2014/0249/20140249_biography.pdf.

"Efficient Software-Based Fault Isolation", SOSP '93 Proceedings of the fourteenth ACM symposium on Operating systems principles, Dec. 1993, by Robert Wahbe et al. (pp. 14) https://crypto.stanford.edu/cs155/papers/sfi.pdf.

"Java and .NET Security",Secure Computer Systems, Oct. 2005 by Martin Russold et al. (pp. 6) https://www.it.uu.se/edu/course/homepage/sakdat/ht05/assignments/pm/programme/Java_and_NET.pdf.

"JAVA™ Web Start Overview", White Paper, May 2005, by Sun Microsystems, Inc. (pp. 14) http://www.oracle.com/technetwork/java/javase/jws-white-paper-150004.pdf.

"Programming the Grid with gLite", Enabling Grids for E-Science, Mar. 2006, by Laure et al. (pp. 18) http://cds.cern.ch/record/936685/files/egee-tr-2006-001.pdf.

"Shazam Turns Up the Volume on Mobile Music", Nov. 2007, by Shazam. http://news.shazam.com/pressreleases/shazam-turns-up-the-volume-on-mobile-music-890300.

(56) References Cited

OTHER PUBLICATIONS

"The Evolution of the Java Security Model", International Conference on Computer Systems and Technologies—CompSysTech' 2005, by Nikolaj Cholakov et al. (pp. 6) http://ecet.ecs.uni-ruse.bg/cst05/Docs/cp/SIII/IIIB.12.pdf.

"The iPhone Developer's Cookbook—Building Applications with the iPhone SDK", Developer's Library, 2008, by Erica Sadun. (pp. 380) http://www.ebooksbucket.com/uploads/itprogramming/iosappdevelopment/The_iPhone_Developers_Cookbook.pdf.

"Towards Distributed Service Discovery in Pervasive Computing Environments", IEEE Transactions on Mobile Computing, vol. 5, No. , pp. 97-112, Feb. 2006, by Dipanjan Chakraborty. https://www.computer.org/csdl/trans/tm/2006/02/h0097-abs.html.

"Twisted Python and Bonjour", Indelible.org, Jan. 2009, by Parise. http://www.indelible.org/ink/twisted-bonjour/.

"UPnP in Digital Home Networking", QuEST, by Quest Global Services, 2015. (pp. 7) https://www.quest-global.com/wp-content/uploads/2015/08/UPnP-in_Digital_Home_Networking.pdf.

"Cross Context Scripting with Firefox", Security-Assessment.com White Paper, Apr. 2010, by Roberto Liverani. (pp. 24) http://www.security-assessment.com/files/documents/whitepapers/Cross_Context_Scripting_with_Firefox.pdf.

"Vulnerabilities and Threats to Mobile Device Security From a Practitioner's Point of View", Issues in Information Systems, vol. XII, No. 2, pp. 181-193, 2011, by Joseph Laverty et al. (pp. 13) http://iacis.org/iis/2011/181-193_AL2011_1693.pdf "Android (operating system)", Sep. 2008, by Spice. (pp. 9) "http://www.si2imobility.com/spicemobiles/pdf/Support-%20FAQs/Android.pdf".

"TV Retargeting", Market View, wywy—Maximizing TV Advertising ROI, Dec. 31, 2015 (pp. 2) http://wywy.com/market-view/tv-retargeting/.

"The New Age of Second Screen: Enabling Interaction", admonsters webpage, Jun. 5, 2013, Joshua R. Weaver (pp. 3) https://www.admonsters.com/blog/second-screen-enabling-interaction.

"Complaint for Patent Infringement", Case 2:15-cv-01725-RWS Document 1, Nov. 6, 2015 (pp. 7).

"Cognitive Radio Technology", from The Guest Editor in IEEE Signal Processing Magazine on Nov. 2008 by Maria Gabriella di Benedetto et al. (p. 1) http://ieeexplore.ieee.org/stamp/stamp.jsp?arnumber=4644050.

"Automated Content Recognition creating content aware ecosystems", in CSI Magazine in Sep. 2012 (pp. 16) http://www.csimagazine.com/csi/whitepapers/ACR%20Creating%20%20content-aware%20ecosysteme%20-Civolution%20White%20Paper%20-%20Sept%202012.pdf.

"A Confidence Based Recognition System for TV Commercial Extraction", in 2008 by Yijun Li et al. (pp. 8) http://crpit.com/confpapaers/CRPITV75Li.pdf.

"OpenX Ad Server: Beginner's Guide", Packt Publishing by Murat Yilmaz (pp. 26) https://www.packtpub.com/sites/default/files/0202_OpenX%20Ad%20Server%20Beginner's%20Guide_SampleChapter.pdf.

"HTML & CSS: The Complete Reference", The McGraw-Hill Companies, 2010 by Thomas A. Powell (pp. 857) http://www.pdfiles.com/pdf/files/English/Web_Apps_Programming_&_Internet/HTML_&_CSS_The_Complete_Reference.pdf.

"Web Services Essentials", O'Reilly, Feb. 2002 by Ethan Cerami (pp. 286) http://spurrier.gatorglory.com/PDFs/O'Reilly%20-%20Web%20Services%20Essentials.pdf.

"UPnP Device Architecture 1.0", UPnP Forum, Oct. 15, 2008 (pp. 81) http://upnp.org/specs/arch/UPnP-arch-DeviceArchitecture-v1.0.pdf.

"Mac OS X Snow Leopard: The Missing Manual", O'Reilly Media, Inc., 2009 by David Pogue (pp. 903) http://crypto.cs.mcgill.ca/~simonpie/webdav/ipad/EBook/MacOSX/Mac%20OS%20X%20Snow%20Leopard%20The%20Missing%20Manual.pdf.

"The Common Object Request Broker. Architecture and Specification Revision 2.0", Feb. 1997 (pp. 634) http://www.omg.org/spec/CORBA/2.0/PDF.

"Internet: The Complete Reference", Tata McGraw-Hill Education Pvt. Ltd., 2002 by Margaret Levine Young http://www.abebooks.com/Internet-Complete-Reference-Second-Edition-Margaret/5122896620/bd.

"HTML 4.0 Sourcebook", John Wiley & Sons, Apr. 1998 by Ian S. Graham (pp. 656) http://www.wiley.com/WileyCDA/WileyTitle/productCd-0471257249.html.

"Zero Configuration Networking: The Definitive Guide", O'Reilly Media, Dec. 2005 by Daniel H Steinberg et al. (pp. 254) http://shop.oreilly.com/product/9780596101008.do#tab_04_2.

https://web.archive.org/web/20110722022038/http://www.flingo.tv/.

https://web.archive.org/web/20120616002448/http://www.flingo.tv/.

https://web.archive.org/web/20130423033122/http://flingo.tv/.

https://web.archive.org/web/20101015033305/http://flingo.org/.

https://web.archive.org/web/20110609062427/http://www.flingo.org/.

"WAP Architecture" by Wireless Application Protocol Forum; Published on Jul. 12, 2001 (pp. 24) http://www.openmobilealliance.org/tech/affiliates/wap/wap-210-waparch-20010712-a.pdf.

"EFI Framework" by wireless Application Protocol Forum, Published on Dec. 17, 2001 (pp. 50) http://www.openmobilealliance.org/tech/affiliates/wap/wap-231-efi-20011217-a.pdf.

"Push OTA Protocol" by Wireless Application Protocol Forum, Published on Apr. 25, 2001 (pp. 44) http://www.openmobilealliance.org/tech/affiliates/wap/wap-235-pushota-20010425-a.pdf.

"Pandora on the iPhone" uploaded on YouTube on Jul. 14, 2008 by Radopandora, found online on May 24, 2017 (pp. 28) https://www.youtube.com/watch?v=tNIV1SntXtPc0.

"Pioneer Brings Pandora into Your Car" uploaded on YouTube on Aug. 4, 2010 by Pioneerelectronics, found online on May 24, 2017 (pp. 16) https://www.youtube.com/watch?v=HdyOKPhBoi4.

"iDA-X305S: Control Pandora from your dash" uploaded on YouTube on Mar. 26, 2010 by AlpineTV, found online on May 24, 2017 (pp. 14) https://www.youtube.com/watch?v=8TkWl_iLVzU.

"Sync + Retarget, Extend your TV campaign to all screen in real-time" by Samba TV, found online on May 24, 2017 (pp. 4) https://samba.tv/advertising/sync-retarget/.

"Pandora system everywhere", by Pandora, found online on May 24, 2017 (pp. 9) https://www.pandora.com/everywhere.

Title: Content Interaction Methods and Systems Employing Portable Devices, U.S. Appl. No. 61/112,573, Name of inventor: Bruce L. Davis, Filing Date: Nov. 7, 2008.

Title: Second Screen Methods and Arrangements, U.S. Appl. No. 61/152,226, Name of inventor: Bruce L. Davis, Filing Date: Feb. 12, 2009.

Title: Second Screen Methods and Arrangements, U.S. Appl. No. 61/160,660, Name of inventor: Bruce L. Davis, Filing Date: Mar. 16, 2009.

Title: Second Screen Methods and Arrangements, U.S. Appl. No. 61/167,828, Name of inventor: Bruce L. Davis, Filing Date: Apr. 8, 2009.

U.S. Appl. No. 61/112,573, Content Interaction Methods and Systems Employing Portable Devices, filed Nov. 7, 2008.

U.S. Appl. No. 61/152,226, Second Screen Methods and Arrangements, filed Feb. 12, 2009.

U.S. Appl. No. 61/160,660, Second Screen Methods and Arrangements, filed Mar. 16, 2009.

U.S. Appl. No. 61/167,828, Second Screen Methods and Arrangements, filed Apr. 8, 2009.

\* cited by examiner

| GLOBAL UNIQUE ID 208 | ALPHANUMERIC NAME 210 | NETWORK 600 | SERVICE 601 | NAT 602 | PORT NUMBER 604 | IP ADDRESS 606 |
|---|---|---|---|---|---|---|
| {25892e17-80f6-415f-9c65-7395632f0223} | COMPANY X 36" TV | UNIVERSITY | CONTENT IDENTIFICATION | NO | 80 | 10.0.0.0 |
| {a53e98e4-0197-4513-be6d-49836e406aaa} | LIVING ROOM TV | HOME | CONTENT IDENTIFICATION | YES | 80 | 192.168.0.0 |
| {e33898de-6302-4756-8f0c-5f6c5218e02e} | PRINTER | OFFICE | PRINT | NO | 81 | 172.16.0.0 |
| ... | ... | ... | ... | ... | ... | ... |

TABLE 650 OF DATABASE 422

FIGURE 6

SYSTEM AND METHOD OF DISCOVERY AND LAUNCH ASSOCIATED WITH A NETWORKED MEDIA DEVICE

CLAIM OF PRIORITY

This application is the Continuation application of and claims priority to, and incorporates herein by reference the entire specification of the U.S. utility application Ser. No. 14/053,620 titled, DISCOVERY AND LAUNCH SYSTEM AND METHOD filed on Oct. 15, 2013. The U.S. utility application Ser. No. 14/053,620 further claims the priority to the applications:

U.S. Provisional Patent application No. 61/118,286 filed Nov. 26, 2008 and titled DISCOVERY, ACCESS CONTROL, AND COMMUNICATION WITH NETWORKED SERVICES FROM WITHIN A SECURITY SANDBOX.

U.S. Continuation application Ser. No. 13/470,814 filed May 14, 2012 and titled DISCOVERY, ACCESS CONTROL, AND COMMUNICATION WITH NETWORKED SERVICES FROM WITHIN A SECURITY SANDBOX.

U.S. Provisional Patent application No. 61/584,168 filed Jan. 6, 2012 and titled CAPTURING CONTENT FOR DISPLAY ON A TELEVISION.

U.S. Provisional Patent application No. 61/696,711 filed Sep. 4, 2012 and titled SYSTEMS AND METHODS FOR RECOGNIZING CONTENT.

U.S. Utility patent application Ser. No. 13/736,031 filed Jan. 7, 2013 and titled ZERO CONFIGURATION COMMUNICATION BETWEEN A BROWSER AND A NETWORKED MEDIA DEVICE.

FIELD OF TECHNOLOGY

This disclosure relates generally to the technical field of networking, and in one example embodiment, this disclosure relates to a method, apparatus and/or system related to discovery and launch system and method.

BACKGROUND

A user may watch an audio-visual data (e.g., a movie, a television show, an advertisement, etc.) accessed through an online media streaming service (e.g., Amazon® Instant Video, NetFlix®, Google YouTube®, Apple iTunes® etc.) using a mobile device (e.g., a client device such as an Apple iPhone®, Google Nexus®, an AppleiPad®, a Samsung Galaxy phone, etc.). The user may also utilize an application (e.g., a website, a drawing program) on the mobile device.

However, a display size of the mobile device may be smaller than a media device (e.g., a television, a projection device, a multi-dimensional visual emersion system, a console) in close proximity to the user. For example, a student (e.g., the user) may be watching a movie on NetFlix® (e.g., the online media streaming service) on their Apple iPad® tablet (e.g., the client device) while sitting on a couch in front of a television (e.g., the media device). The user may not have an efficient way to seamlessly launch the audio-visual content (or the application) presently being viewed on the mobile device to the media device. In addition, the media device may be unaware that the user is currently watching the audio-visual data (or utilizing the application). As such, the user may be limited in their ability to use the media device. Therefore, the user may not be able to take advantage of enhanced capabilities of the media device (e.g., larger screen, better audio, better resolution, etc.).

SUMMARY

A method, apparatus and/or system related to discovery and launch system and method.

In one aspect, a method of a mobile device includes accessing a multicast capability of an operating system of a client device. The client device is associated with a user. The method also includes discovering, through the client device, at least one other data processing device in an active state of reception of data from the client device through a local area network (LAN) based on the multicast capability accessed in the client device. A request is wirelessly transmitted, through the client device, to the at least one other data processing device discovered to be in the active state of reception of the data from the client device through the LAN. The at least one other data processing device is communicatively coupled to the client device through the LAN, and the request is related to identifying an application residing on the at least one other data processing device. The method determines, through the client device, that the application residing on the at least one other data processing device is similar to an application residing on the client device configured to render an audio/visual data stream thereon based on a response to the request. The method also includes either populating a table of the operating system of the client device with a list of applications residing on the at least one other data processing device similar to the application residing on the client device, the applications within the list having identifiers associated therewith and/or presenting the identifiers to the client device to enable a user thereof select an identifier therethrough.

The method may wirelessly launch, through the client device, the audio/visual data stream on the at least one other data processing device through the similar application residing thereon across the LAN based on the determination of the similarity of the application, the wireless launching enabling the same user associated with the client device view the audio/visual data stream on the at least one other data processing device. The audio/visual data stream may be wirelessly launched on the similar application residing on the at least one other data processing device based on the populated table of the operating system of the client device comprising the identifier of the similar application residing on the at least one other data processing device.

The method may include bookmarking the audio/visual data stream through the application residing on the client device. The method may store data related to the bookmarking in the client device and/or a central server communicatively coupled to the client device through the LAN and/or another computer network, the central server being configured to serve the audio/visual data stream to the client device. The stored date related to the bookmarking may be leveraged to launch the audio/visual data stream on the similar application residing on the at least one other data processing device.

It may be determined whether the audio/visual data stream is being rendered on the application residing on the client device. The method may store data related to a currency of the rendering on the client device on the client device and/or a central server communicatively coupled to the client device through the LAN and/or another computer network, the central server being configured to host content related to the audio/visual data stream being rendered on the client device. The method include leveraging the stored data related to the currency of the rendering to launch the audio/visual data stream on the similar application residing on the at least one other data processing device.

The method may communicate either a Uniform Resource Locator (URL) and/or an interpretable content identifier to the application residing on the client device such that the wireless launching of the audio/visual data stream on the similar application of the at least one other data processing device is initiated based on data communicated through a corresponding destination Internet Protocol (IP) address associated with the URL and/or information associated with the interpretable content identifier.

The determination of the similarity between the application residing on the client device and the application residing on the at least one other data processing device may compare the application residing on the at least one other data processing device across a registry database residing on the client device and/or a server external thereto to associate the application residing on the at least one other data processing device with the application residing on the client device.

In another aspect, a system includes a LAN, a client device, a client device comprising a processor communicatively coupled to a memory, the client device being associated with a user, and at least one other data processing device communicatively coupled to the client device through the LAN. The processor of the client device is configured to execute instructions to access a multicast capability of an operating system of the client device, discover that the at least one other data processing device is in an active state of reception of data from the client device through the LAN based on the access of the multicast capability in the client device, wirelessly transmit a request related to identifying an application residing on the at least one other data processing device discovered to be in the active state of reception of the data from the client device thereto, determine that the application residing on the at least one other data processing device is similar to an application residing on the client device configured to render an audio/visual data stream thereon based on a response to the request, and either populate a table of the operating system of the client device with a list of applications residing on the at least one other data processing device similar to the application residing on the client device, the applications within the list having identifiers associated therewith, and/or present the identifiers to the client device to enable a user thereof select an identifier therethrough.

In yet another aspect, a non-transitory medium, readable through a client device associated with a user and comprising instructions embodied therein that are executable through the client device, includes instructions to access a multicast capability of an operating system of the client device, instructions to discover, through the client device, at least one other data processing device in an active state of reception of data from the client device through a LAN based on the multicast capability accessed in the client device, instructions to wirelessly transmit, through the client device, a request to the at least one other data processing device discovered to be in the active state of reception of the data from the client device through the LAN, the at least one other data processing device being communicatively coupled to the client device through the LAN, and the request being related to identifying an application residing on the at least one other data processing device, instructions to determine, through the client device, that the application residing on the at least one other data processing device is similar to an application residing on the client device configured to render an audio/visual data stream thereon based on a response to the request, and instructions to populate a table of the operating system of the client device with a list of applications residing on the at least one other data processing device similar to the application residing on the client device, the applications within the list having identifiers associated therewith, and/or present the identifiers to the client device to enable a user thereof select an identifier therethrough.

The methods, system, and/or apparatuses disclosed herein may be implemented in any means for achieving various aspects, and may be executed in a form of machine readable medium embodying a set of instruction that, when executed by a machine, causes the machine to perform any of the operations disclosed herein. Other features will be apparent from the accompanying drawing and from the detailed description that follows.

BRIEF DESCRIPTION OF DRAWINGS

Example embodiments are illustrated by way of example and not limitation in the figures of the accompanying drawing, in which like references indicate similar elements and in which:

FIG. 6 is a table of example network information stored in a database 422 of a pairing server 200, according to one embodiment.

Figure 1:
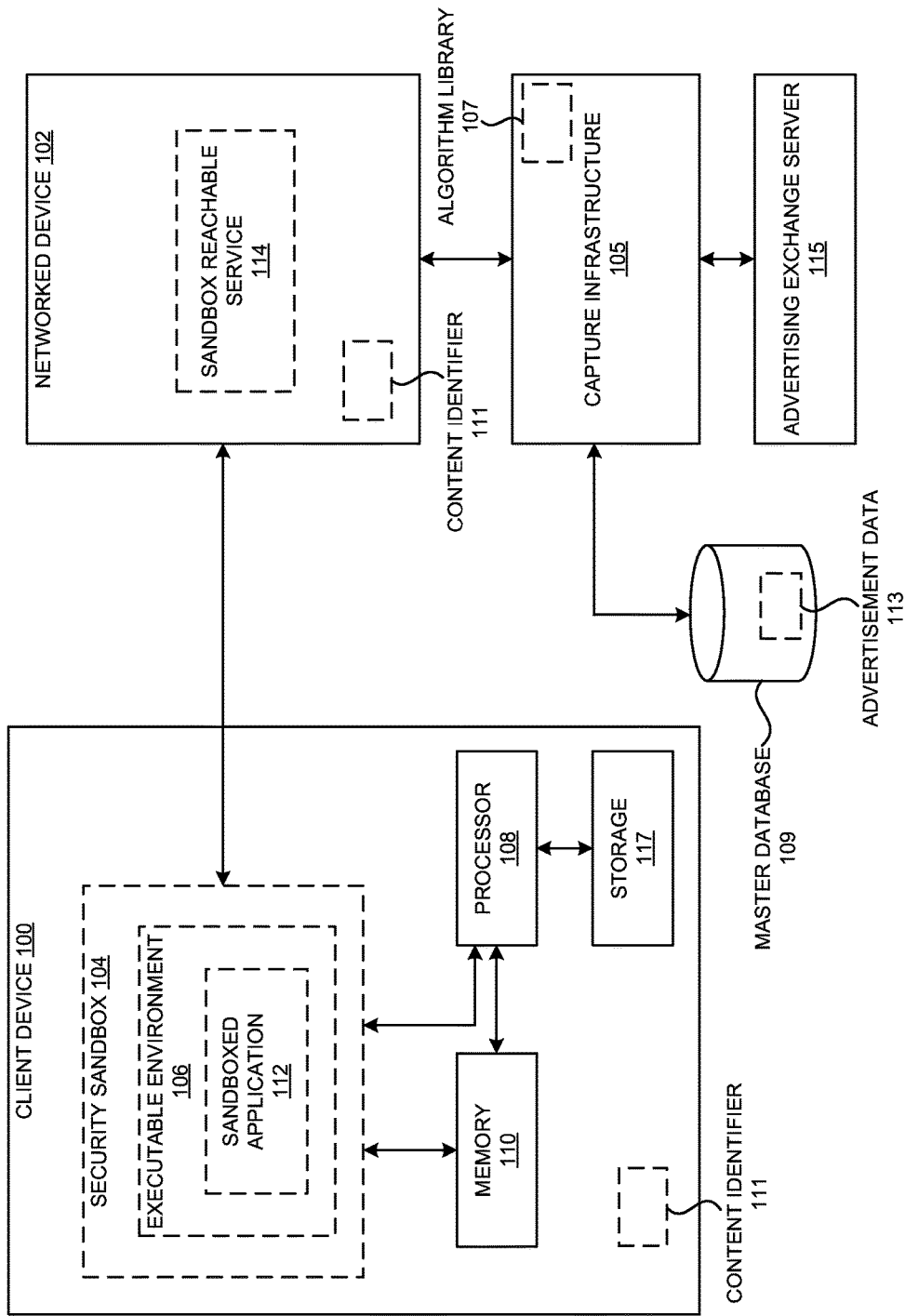
FIG. 1 is a block diagram of a system of automatic bidirectional communication between multiple devices sharing a common network, according to one embodiment.

Other features of the present embodiments will be apparent from the accompanying drawings and from the detailed description that follows.

DETAILED DESCRIPTION

A method, apparatus and/or system related to discovery and launch system and method.

In one embodiment, a method of a mobile device 900 includes accessing a multicast capability of an operating system 918 through an application 914 of the mobile device 900, determining if there is a similar application 914 locally stored on a networked media device 902 to the application 914 on the mobile device 900 when a multicast message (e.g., using the multicast algorithm 920) is broadcast to the networked media device 902 communicatively coupled to the mobile device 900 through a local area network 904, and automatically launching the similar application 914 on the networked media device 902 based on a communication of the multicast message (e.g., using the multicast algorithm 920) from the mobile device 900 to the networked media device 902.

The multicast message (e.g., using the multicast algorithm 920) may be delivered through a multicast algorithm of the operating system 918 that communicates a name-announce request to any networked media device 902 communicatively coupled to the mobile device 900 through the local area network 904. The multicast message (e.g., using the multicast algorithm 920) may be communicated wirelessly through the local area network 904. The multicast message (e.g., using the multicast algorithm 920) may be communicated as a broadcast to all available networked media device 902s communicatively coupled to the mobile device 900 through the local area network 904.

It may be determined which network media devices in the local area network 904 may be listening for the multicast message (e.g., using the multicast algorithm 920). It may be determined if the similar application 914 meets a criteria. A name of the similar application 914 received in response to the name-announce request may be processed. A table of the application 914 that lists the name and/or other names of other similar application 914s associated with networked media device 902s in the local area network 904 may be processed. The name of the application 914 may be presented to a user. A launch sequence may be communicated to the similar application 914 responsive to a selection of the name by the user. It may be determined that the similar application 914 has launched based on the launch sequence. A communication session between the application 914 and/or the similar application 914 may be established.

A current state data and/or a bookmark data of an audio-visual data executing on the application 914 on the mobile device 900 may be communicated to the similar application 914 on the networked media device 902 through the mobile device 900 and/or a central server through which the audio-visual data is streamed to the mobile device 900. The audio-visual data may be streamed from the central server to the similar application 914 on the networked media device 902 based on the current state data and/or the bookmark data. The mobile device 900 may be unaware of how many networked media device 902s are presently communicatively coupled with the mobile device 900 through the local area network 904.

The nodes of the local area network 904 may replicate packets associated with the multicast message (e.g., using the multicast algorithm 920) having the name-announce request to reach multiple ones of the networked media device 902s when necessary. The launch sequence may be communicated in a form of a Uniform Resource Locator (URL) code to the similar application 914, so that the networked media device 902 is instructed to launch the similar application 914 based on data communicated through a destination internet protocol (IP) address associated with the URL. The name of the similar application 914 may be compared with a registry of names in a registry database of any one of the central server and/or the mobile device 900 to determine whether the similar application 914 of the networked media device 902 is associatable with the application 914 of the mobile device 900.

In another embodiment, a method of a mobile device 900 includes accessing a multicast capability of an operating system 918 through an application 914 of the mobile device 900, determining if there is a similar application 914 locally stored on a networked media device 902 to the application 914 on the mobile device 900 when a multicast message (e.g., using the multicast algorithm 920) is broadcast to the networked media device 902 communicatively coupled to the mobile device 900 through a local area network 904, automatically launching the similar application 914 on the networked media device 902 based on a communication of the multicast message (e.g., using the multicast algorithm 920) from the mobile device 900 to the networked media device 902, and delivering the multicast message (e.g., using the multicast algorithm 920) through a multicast algorithm of the operating system 918 that communicates a name-announce request to any networked media device 902 communicatively coupled to the mobile device 900 through the local area network 904.

In yet another embodiment, a system includes a mobile device 900 to access a multicast capability of an operating system 918 through an application 914 of the mobile device 900, a local area network 904, and a networked media device 902 communicatively coupled with the mobile device 900 through the local area network 904. The mobile device 900 determines if there is a similar application 914 locally stored on the networked media device 902 to the application 914 on the mobile device 900 when a multicast message (e.g., using the multicast algorithm 920) is broadcast to the networked media device 902 communicatively coupled to the mobile device 900 through a local area network 904. The networked media device 902 automatically launches the similar application 914 on the networked media device 902 based on a communication of the multicast message (e.g., using the multicast algorithm 920) from the mobile device 900 to the networked media device 902.

In a further embodiment, a method of a client device 100 includes determining that a networked device 102 sharing a local area network (e.g., the shared network 202) common with the client device 100 has automatically detected an audio-visual data and/or an application currently being accessed by a user of the client device 100. The client device 100 automatically communicates a present state of the audio-visual data and/or the application currently being accessed by the user of the client device 100 to the networked device 102. Then, the client device 100 detects that the audio-visual data and/or the application currently being accessed by the user of the client device 100 has been launched on the networked device 102. Optionally, a haptic gesture (e.g., slide of a hand on a display of a mobile device, a tapping of a display, etc.) may be applied on the client device 100 by the user to transport the audio-visual data and/or the application from the client device 100 to the networked device 102. The application may serve a control point when the present state of the audio-visual data and/or the application currently being accessed by the user of the client device 100 is communicated to the networked device 102. In addition, an automatic content recognition algorithm in the client device 100 and/or the networked device 102 may generate a meta-data associated with content in the present state of the audio-visual data.

In yet an even further embodiment, a method of a networked device includes automatically detecting that an audio-visual data and/or an application currently being accessed by a user of a client device 100 is sharing a local area network (e.g., the shared network 202) common with the networked device. The networked device determines a present state of the audio-visual data and/or the application currently being accessed by the user of the client device 100. Then, the networked device automatically launches the audio-visual data and/or the application currently being accessed by the user of the client device 100 on the networked device 102.

In a separate embodiment, a system includes a networked device to launch an audio-visual data and/or an application currently being accessed in a local area network (e.g., the shared network 202) in which the networked device is affiliated, and a client device 100 sharing the local area network (e.g., the shared network 202) with the networked device to automatically communicate a present state of the audio-visual data and/or the application currently being accessed to the networked media. device.

A communication may be established between a client device (e.g., a laptop, a tablet device, a data processing) and a media device (e.g., a television, a projection device, a multi-dimensional visual emersion system, a console). For example, a user of the client device may need to read a manual to understand a protocol to configure the media device into a networked media device (the media device registered in a communication network). The user may not understand the protocol. As such, the user may consume significant customer support time in configuring the media device. Alternatively, the user may need to expend financial resources to request assistance from a network administrator to assist the user in configuring the media device. This may be cost prohibitive for the user.

Furthermore, the user may need to associate the media device with the client device. The user may need a code that uniquely identifies the media device. The user may be unable to locate the code that uniquely identifies the media device. Even still, the user may need to create an account to register a communication session between the client device and the media device. This may be time consuming and difficult. As a result, the user may give up and not associate the client device and the media device. Therefore, a revenue opportunity may be missed because an interested party (e.g., a distribution carrier, a set top box operator, a search engine, an advertiser, the user etc.) may be unable to access behavioral data associated with use of the media. In addition, the user may be inconvenienced when a programming on the media device and the client device remain independent of each other.

FIG. 1 is a block diagram of a system of automatic bidirectional communication (e.g., sending and receiving information in both directions without prior configuration by a human) between multiple devices sharing a common network, according to one embodiment. FIG. 1 shows a client device 100, a networked device 102, a security sandbox 104, an executable environment 106, a processor 108, a storage 117 a memory 110, a sandboxed application 112, and a sandbox reachable service 114. The client device 100 communicates bidirectionally with the networked device 102 of FIG. 1.

According to one embodiment, a client device 100 may be a computer, a smartphone, and/or any other hardware with a program that initiates contact with a server to make use of a resource. A client device 100 may constrain an executable environment 106 in a security sandbox 104, execute a sandboxed application 112 in a security sandbox 104 using a processor 108 and a memory 110, and automatically instantiate (e.g., manifest) a connection (e.g., a complete path between two terminals over which two-way communications may be provided) between a sandboxed application 112 and a sandbox reachable service 114 of the networked device 102.

According to one embodiment, a networked device 102 may be a television, stereo, game console, another computer, and/or any other hardware connected by communications channels that allow sharing of resources and information. A networked device 102 may comprise a number of sandbox reachable applications. A networked device 102 may announce a sandbox reachable service 114 using a processor 108 and a memory 110. According to one embodiment, a processor 108 may be a central processing unit (CPU), a microprocessor, and/or any other hardware within a computer system which carries out the instructions of a program by performing the basic arithmetical, logical, and input/output operations of the system. According to one embodiment, a memory 110 may be a random access memory (RAM), a read only memory (ROM), a flash memory, and/or any other physical devices used to store programs or data for use in a digital electronic device.

The security sandbox 104, the processor 108, the storage 117, and the memory 110 each exist within the client device 100 of FIG. 1, and they communicate bidirectionally with each other. According to one embodiment, a security sandbox 104 may be an operating system on which the sandboxed application 112 is hosted, a browser application of the operating system, and/or any other mechanism for separating running programs to execute untested code and/or untrusted programs from unverified third-parties, suppliers, untrusted users, and untrusted websites. According to one embodiment, a storage 117 may be a technology consisting of computer components and recording media used to retain digital data.

The executable environment 106 exists within the security sandbox 104 of FIG. 1. According to one embodiment, an executable environment 106 may be a virtual machine, a jail, a scripting language interpreter, a scratch space on disk and memory, and/or any other tightly controlled set of resources in which to run guest programs.

The sandboxed application 112 exists within the executable environment 106 of FIG. 1. According to one embodiment, a sandboxed application 112 may be an untested code, an untrusted program (e.g., from an untrusted web page), and/or any other software that can be executed with the appropriate runtime environment of the security sandbox 104.

The sandbox reachable service 114 exists within the networked device 102 of FIG. 1. According to one embodiment, a sandbox reachable service 114 may be a smart television application, a set-top box application, an audio device application, a game console application, a computer application, and/or any other service that can be discovered and communicated with from within the sandboxed application 112. FIG. 1 may encompass constraining a sandbox reachable service 114 in a security sandbox 104 where it is described sandbox reachable service 114, according to one embodiment. A security sandbox 104 may not allow a sandbox reachable service 114 that is constrained in the security sandbox 104 to open a server socket and receive inbound connections. However, a sandbox reachable service 114 that is constrained in the security sandbox 104 may still announce and be discovered, but all communications between a client device 100 and a networked device 102 may need to traverse through a relay in a pairing server 200.

Figure 2:
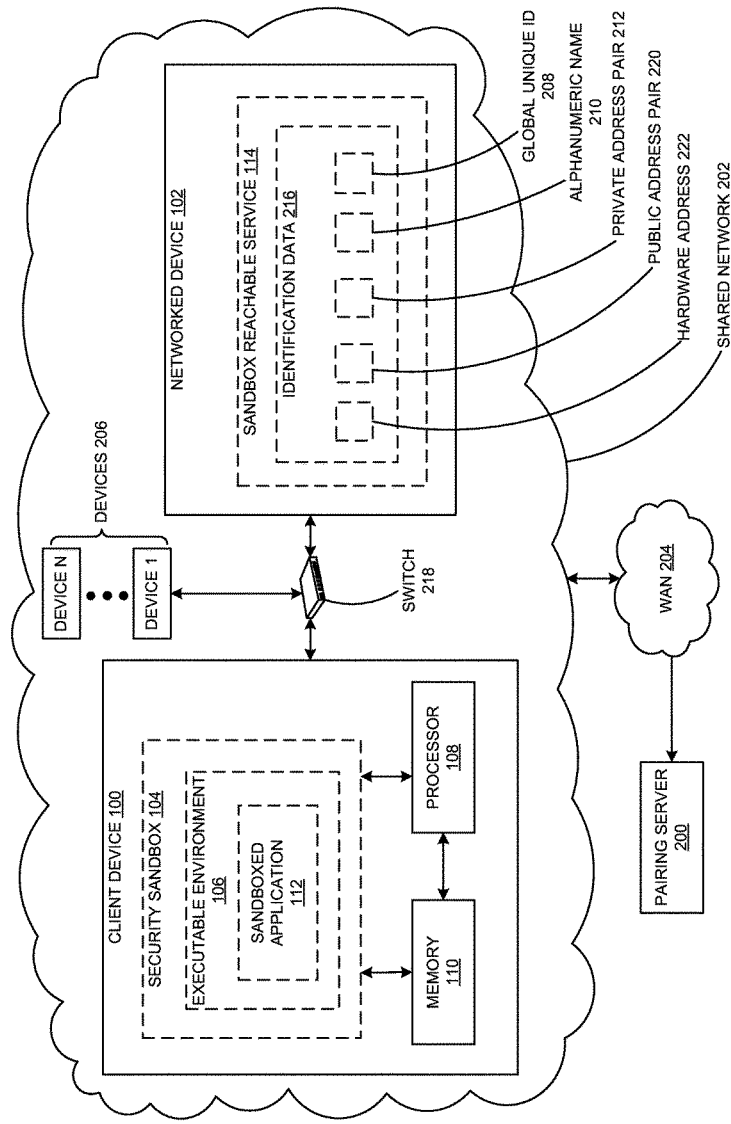
FIG. 2 is a block diagram of a system of automatic bidirectional communication between a client device 100 and a networked device 102 using a server, according to one embodiment.

FIG. 2 is a block diagram of a system of automatic bidirectional communication between a client device 100 and a networked device 102 using a server, according to one embodiment. FIG. 2 shows a client device 100, a networked device 102, a security sandbox 104, an executable environment 106, a processor 108, a memory 110, a sandboxed application 112, a pairing server 200, a shared network 202, a Wide Area Network (WAN) 204, a devices 206, a global unique identifier (GUID) 208, an alphanumeric name 210, a private address pair 212, a sandbox reachable service 114, an identification data 216, a switch 218, a public address pair 220, and a hardware address 222.

The client device 100, the networked device 102, and the devices 206 communicate bidirectionally with each other through the switch 218 in the shared network 202. According to one embodiment, a devices 206 may be a television, a projection screen, a multimedia display, a touchscreen display, an audio device, a weather measurement device, a traffic monitoring device, a status update device, a global positioning device, a geospatial estimation device, a tracking device, a bidirectional communication device, a unicast device, a broadcast device, a multidimensional visual presentation device, and/or any other devices with a network interface. According to one embodiment, a switch 218 may be a telecommunication device (e.g., a broadcast, multicast, and/or anycast forwarding hardware) that receives a message from any device connected to it and then transmits the message only to the device for which the message was meant.

According to one embodiment, a shared network 202 may be a local area network, a multicast network, an anycast network, a multilan network, a private network (e.g., any network with a private IP space), and/or any other collection of hardware interconnected by communication channels that allow sharing of resources and information. When a sandboxed application 112 and a sandbox reachable service 114 communicate in a shared network 202 common to the client device 100 and a networked device 102 when a connection is established, a client device 100 may eliminate a communication through a centralized infrastructure (e.g., a pairing server 200 which may be used only for discovery), minimize latency in the communication session (e.g., by establishing a connection between a client device 100 and a networked device 102 rather than by relaying via a pairing server 200), and improve privacy in the communication session.

FIG. 2 may encompass establishing a shared network 202 based on a bidirectional communication that does not use a relay service where it is described a shared network 202, according to one embodiment. Multiple local area networks (LANs) may share a public IP address. A client device 100 may reside on one LAN, and a sandbox reachable service 114 may reside on another LAN. A client device 100 may discover a sandbox reachable service by matching public Internet Protocol (IP) addresses. However, a sandbox reachable service 114 that is not constrained to a security sandbox 104 may have an unconstrained view (e.g., it may have access to Media Access Control addresses, Address Resolution Protocol, and/or routing tables) of a shared network 202.

A client device 100 may attempt to communicate with a sandbox reachable service 114 (e.g., by opening a Transmission Control Protocol connection and/or by sending a User Datagram Protocol datagram) without using a relay service. A shared network 202 may be established if a connection successfully handshakes, a datagram arrives, and/or the client device 100 and the sandbox reachable service 114 otherwise communicate bidirectionally without using a relay service.

In one embodiment, a method of a client device 100 includes applying an automatic content recognition algorithm (e.g., from the algorithm library 107) to determine a content identifier 111 of an audio-visual data. The client device 100 then associates the content identifier 111 with an advertisement data 113 based on a semantic correlation between a meta-data of the advertisement provided by a content provider and/or the content identifier 111. Advertisement targeting (e.g., how relevant an advertisement is to a user) is improved when a script (e.g., a Javascript code, a cookie) is embedded in the client device 100, a supply-side platform (e.g., a technology platform with the single mission of enabling publishers to manage their ad impression inventory and maximize revenue from digital media), and/or a data provider integrated with the supply side platform.

Arbitrary cross-site scripts are executed in the sandboxed application 112 of the client device 100. The content identifier 111 are obfuscated in a manner that it is relevant to a particular demand-side platform (e.g., a system that allows buyers of digital advertising to manage multiple ad exchange and data exchange accounts through one interface) to eliminate a need to query the provider of the content identifier 111 on a per ad-spot basis. The demand-side platform submits requests to the advertising exchange server 115 based on a constraint type rather than through a bidding methodology on a per advertisement spot basis.

The advertisement data 113 may be generated through an advertising exchange server 115 based on the content identifier 111 of the audio-visual data and/or a public internet-protocol address associated with an application requesting the advertisement data 113. A provider of the content identifier 111 may receive a compensation when the advertisement data 113 is associated with the audio-visual data based on the public internet protocol address associated with the application requesting the advertisement data 113.

The provider of the content may append a set of content identifiers (e.g., the content identifier 111) from associated clients and/or a viewing history from associated clients to a plurality of advertisements and/or resells the advertisement data 113 back to the advertising exchange server 115 based on the appended content identifiers (e.g., content identifier 111). A capture infrastructure 105 may annotate the audio-visual data with a brand name and/or a product name by comparing entries in the master database 109 with a closed captioning data of the audio-visual data and/or through an application of an optical character recognition algorithm (e.g., from the algorithm library 107) in the audio-visual data. A sandboxed application 112 of the client device 100 may request access to a microphone and/or a camera on the client device 100 to capture a raw audio/video data.

The capture infrastructure 105 may process the raw audio/video data with the brand name and/or the product name by comparing entries in the master database 109 with the raw audio/video data and/or through the application of a sensory recognition algorithm (e.g., from the algorithm library 107) of the raw audio/video data.

The sandboxed application 112 may query a MAC address of the sandbox reachable service 114 in a common private network. The sandbox reachable service 114 may optionally verify that the sandboxed application 112 is in the common private network. The sandbox reachable service 114 may communicate a MAC address of the sandboxed application 112 to the sandboxed application 112 when the common private network is shared. The sandboxed application 112 may store the MAC address of the sandboxed application 112 and/or a unique identifier derived from the MAC address of the sandboxed application 112.

The sandboxed application 112 may communicate the MAC address and/or the unique identifier to the pairing server. A script may be automatically regenerated that is embedded in the client device 100, a supply-side platform, and/or a data provider integrated with the supply side platform when the common private network is shared by the sandboxed application 112 and/or sandboxed application 112 based on the MAC address of the sandboxed application 112 and/or the unique identifier communicated to the pairing server.

In another embodiment, a method of a networked device includes applying an automatic content recognition algorithm (e.g., from the algorithm library 107) to determine a content identifier 111 of an audio-visual data and associating the content identifier 111 with an advertisement data 113 based on a semantic correlation between a meta-data of the advertisement provided by a content provider and/or the content identifier 111.

In this another embodiment, advertising targeting (e.g., how relevant an advertisement is to a user) is improved when a script (e.g., a Javascript code, a cookie) is embedded in the client device 100, a supply-side platform (e.g., a technology platform with the single mission of enabling publishers to manage their ad impression inventory and maximize revenue from digital media), and/or a data provider integrated with the supply side platform. Arbitrary cross-site scripts are executed in the sandboxed application 112 of the client device 100. The content identifier 111 are obfuscated in a manner that it is relevant to a particular demand-side platform (e.g., a system that allows buyers of digital advertising to manage multiple ad exchange and data exchange accounts through one interface) to eliminate a need to query the provider of the content identifier 111 on a per ad-spot basis. The demand-side platform submits requests to the advertising exchange server 115 based on a constraint type rather than through a bidding methodology on a per advertisement spot basis.

In yet another embodiment, a system includes a networked device and/or a client device 100 to apply an automatic content recognition algorithm (e.g., from the algorithm library 107) to determine a content identifier 111 of an audio-visual data and/or to associate the content identifier 111 with an advertisement data 113 based on a semantic correlation between a meta-data of the advertisement provided by a content provider and/or the content identifier 111. In addition, the system includes a capture infrastructure 105 to annotate the audio-visual data with a brand name and/or a product name by comparing entries in the master database 109 with a closed captioning data of the audio-visual data and/or through an application of an optical character recognition algorithm (e.g., from the algorithm library 107) in the audio-visual data.

In one embodiment, a method of a client device 100 includes applying an automatic content recognition algorithm (e.g., in the algorithm library 107) to determine a content identifier 111 of an audio-visual data (e.g., a movie, a television show, an advertisement, etc.). The client device 100 then associates the content identifier 111 with an advertisement data 113 based on a semantic correlation between a meta-data of the advertisement (a particular advertisement of the advertisement data 113) provided by a content provider (e.g., an organization providing advertisements) and/or the content identifier 111. A capture infrastructure 105 annotates the audio-visual data with a brand name and/or a product name by comparing entries in the master database 109 with a closed captioning data of the audio-visual data and/or through an application of an optical character recognition algorithm (e.g., in the algorithm library 107) in the audio-visual data. The content identifier 111 may involve a music identification, an object identification, a facial identification, and/or a voice identification. A minimal functionality including accessing a tuner and/or a stream decoder that identifies a channel and/or a content may be found in the networked media device (e.g., the networked device 102). The networked media device (e.g., the networked device 102) may produce an audio fingerprint and/or a video fingerprint that is communicated with the capture infrastructure 105.

The capture infrastructure 105 may compare the audio fingerprint and/or the video fingerprint with a master database 109. The capture infrastructure 105 may further annotate the audio-visual data with a logo name by comparing entries in the master database 109 with a logo data of the audio-visual data identified using a logo detection algorithm (e.g., in the algorithm library 107). The capture infrastructure 105 may automatically divide the audio-visual data into a series of scenes based on a sematic grouping of actions in the audio-visual data. The audio-visual data may be analyzed in advance of a broadcast to determine content identifiers (e.g., the content identifier 111) associated with each commercial in the audio-visual data such that advertisements are pre-inserted into the audio-visual data prior to broadcast.

The capture infrastructure 105 may apply a time-order algorithm (e.g., in the algorithm library 107) to automatically match advertisements to the audio-visual data when a correlation pattern is identified by the capture infrastructure 105 with other audio-visual content previously analyzed. The capture infrastructure 105 may include a buffer that is saved to a persistent storage and/or for which a label is generated to facilitate identification of reoccurring sequences. A post processing operation may be automated through a post-processing algorithm (e.g., in the algorithm library 107) and/or a crowd-sourced operation using a plurality of users in which a turing test is applied to determine a veracity of an input.

A device pairing algorithm (e.g., in the algorithm library 107) may be used in which a cookie data associated with a web page visited by the user stored on a browser on the client device 100 is paired with the networked media device (e.g., the networked device 102) when the client device 100 is communicatively coupled with the networked media device (e.g., the networked device 102). A transitive public IP matching algorithm (e.g., in the algorithm library 107) may be utilized in which the client device 100 and/or the networked media device (e.g., the networked device 102) communicates each public IP address with any paired entity to the capture infrastructure 105. A tag that is unconstrained from a same-origin policy may be used to automatically load the advertisement in the browser, the tag is an image tag, a frame, a iframe, and/or a script tag.

An additional metadata including the content identifier 111 and/or the advertisement based on a video processing algorithm (e.g., in the algorithm library 107) may be referenced. The additional meta data may be a title, a description, a thumbnail, a name of an individual, and/or a historical data. The additional metadata may be determined from a browser history captured from the client device 100 based on a capture policy, and/or correlating a relevance of the browser history with the content identifier 111 and/or the advertisement.

In another embodiment, a method of a networked device includes applying an automatic content recognition algorithm (e.g., in the algorithm library 107) to determine a content identifier 111 of an audio-visual data, and associating the content identifier 111 with an advertisement data 113 based on a semantic correlation between a meta-data of the advertisement provided by a content provider and/or the content identifier 111. In this other aspect, a capture infrastructure 105 annotates the audio-visual data with a brand name and/or a product name by comparing entries in the master database 109 with a closed captioning data of the audio-visual data and/or through an application of an optical character recognition algorithm (e.g., in the algorithm library 107) in the audio-visual data.

In yet another embodiment, a system includes a networked device and/or a client device 100 to apply an automatic content recognition algorithm (e.g., in the algorithm library 107) to determine a content identifier 111 of an audio-visual data and/or to associate the content identifier 111 with an advertisement data 113 based on a semantic correlation between a meta-data of the advertisement provided by a content provider and/or the content identifier 111. The system also includes a capture infrastructure 105 to annotate the audio-visual data with a brand name and/or a product name by comparing entries in the master database 109 with a closed captioning data of the audio-visual data and/or through an application of an optical character recognition algorithm (e.g., in the algorithm library 107) in the audio-visual data.

FIG. 2 may also encompass establishing a shared network 202 based on a determination that a client device 100 and a sandbox reachable service 114 reside on a same LAN where it is described a shared network 202, according to one embodiment. For example, a networked device 102 may broadcast ping (e.g., using Internet Control Message Protocol) and listen for a response from a client device 100.

FIG. 2 may further encompass establishing a shared network 202 by using an address resolution protocol (e.g., ARP) where it is described a shared network 202, according to one embodiment. A sandbox reachable service 114 may determine that a client device 100 resides on a same LAN if the IP address of the client device 100 can be resolved to a LAN address using an IP-to-LAN address resolution protocol (e.g., ARP).

The shared network 202 communicates with the pairing server 200 through the WAN 204. According to one embodiment, a pairing server 200 may be a computer hardware system dedicated to enabling communication between a sandboxed application 112 and a sandbox reachable service 114. According to one embodiment, a WAN 204 may be the Internet and/or any other telecommunications network that links across metropolitan, regional, and/or national boundaries using private and/or public transports. A networked device 102 may announce an availability of a sandbox reachable service 114 across a range of public addresses such that a sandboxed application 112 communicates with the sandbox reachable service 114 in any one of the range of the public addresses. However, a range of public addresses may be known by a pairing server 200 so that the announcement of the availability of a sandbox reachable service 114 across a range of public addresses is unnecessary.

The identification data 216 exists within the sandbox reachable service 114 of FIG. 2. According to one embodiment, an identification data 216 may be a reference information associated with an application sharing a public address with a client device 100, a networked device 102, and/or a devices 206 (e.g., to define a network in which the client device 100, the networked device 102, and/or the devices 206 reside). A client device 100 may access a pairing server 200 when processing an identification data 216 associated with a sandbox reachable service 114 sharing a public address with the client device 100. A pairing server 200 may perform a discovery lookup of any device that has announced that it shares a public address associated with the client device 100. Further, a sandbox reachable service 114 may announce itself to a pairing server 200 prior to the establishment of a communication session between a sandboxed application 112 and the sandbox reachable service 114.

The GUID 208, the alphanumeric name 210, the private address pair 212, the public address pair 220, and the hardware address 222 each exist within the identification data 216 of FIG. 2. According to one embodiment, a GUID 208 may be a 128-bit reference number used by software programs to uniquely identify the location of a data object. For example, FIG. 2 may be applicable to a GUID 208 of a sandbox reachable service 114 and/or a networked device 102 where it is described a global unique ID 208. It may be preferable to have a one-to-one mapping between a GUID 208 and a networked device 102. However, in the case when a sandbox reachable service 114 may be constrained to a security sandbox 104, the sandbox reachable service 114 may have no way of determining its own IP address and/or whether it resides on a same device with other services. In this case, every sandbox reachable service 114 on the same device may have its own GUID 208.

According to one embodiment, an alphanumeric name 210 may be a "Vizio® 36" TV," a "living room TV," a "bedroom printer," and/or any other human-friendly reference name of a networked device 102. According to one embodiment, a private address pair 212 may be a private Internet Protocol (IP) address and a port number associated with an application that sends and/or receives packets. According to one embodiment, a public address pair 220 may be a public IP address and a port number 604 associated with an application that sends and/or receives packets. According to one embodiment, a hardware address 222 may be a Media Access Control (MAC) address, a physical address, Ethernet hardware address (EHA), and/or any other unique identifier assigned to network interfaces for communications on the physical network segment.

A client device 100 may process an identification data 216 associated with a sandbox reachable service 114 sharing a public address with the client device 100 and determine a private address pair 212 of the sandbox reachable service 114 based on the identification data 216. A networked device 102 may also communicate a global unique identifier 208 and/or an alphanumeric name 210 to a pairing server 200 along with a hardware address 222 associated with the networked device 102, a public address pair 220 associated with a sandbox reachable service 114 of the networked device 102, and/or a private address pair 212 associated with the sandbox reachable service 114 of the networked device 102.

Figure 3:
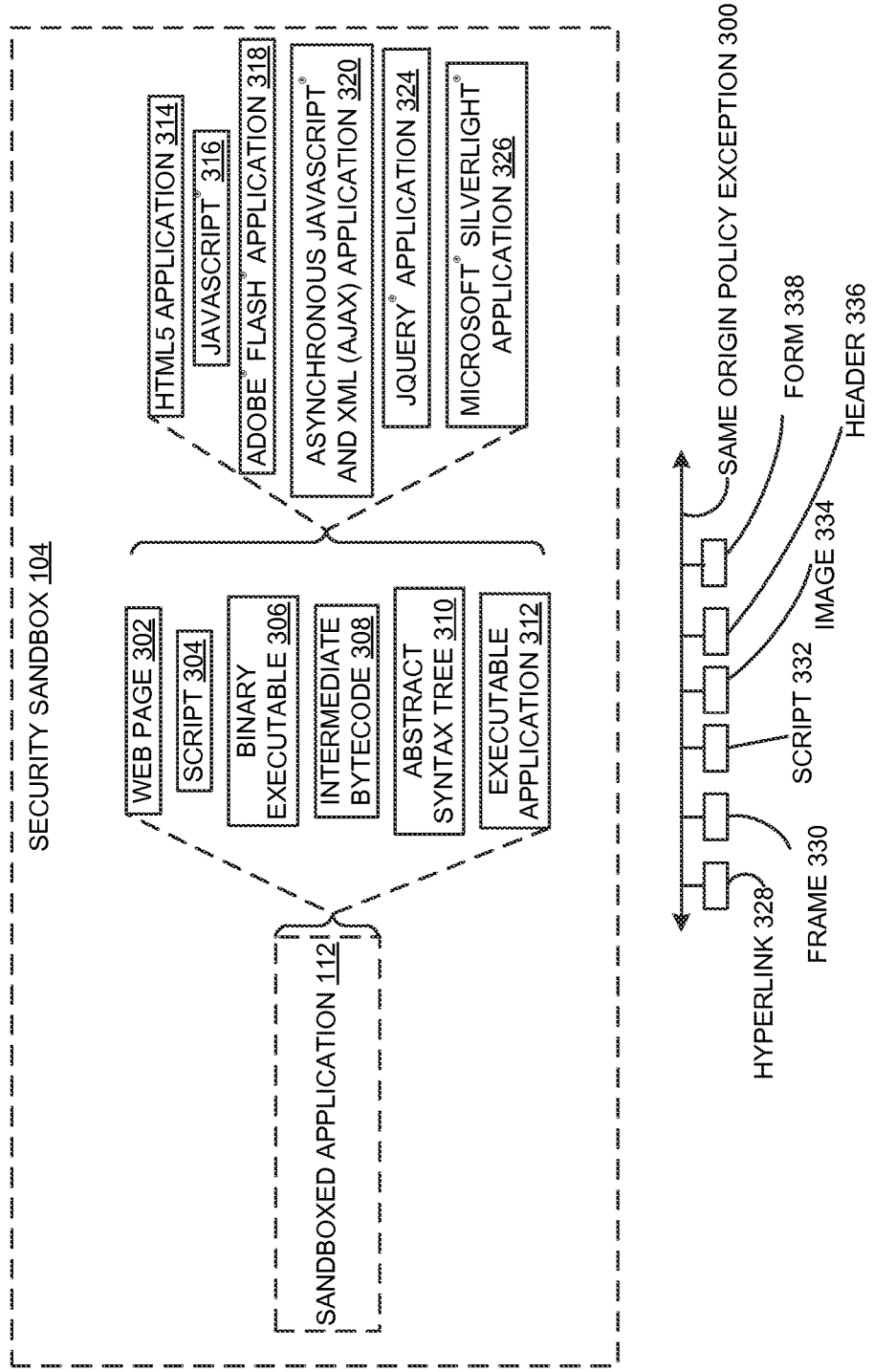
FIG. 3 is an exploded view of the security sandbox 104, according to one embodiment.

FIG. 3 is an exploded view of the security sandbox 104, according to one embodiment. FIG. 3 shows a security sandbox 104, a sandboxed application 112, a same origin policy exception 300, a web page 302, a script 304, a binary executable 306, an intermediate bytecode 308, an abstract syntax tree 310, an executable application 312, a HyperText Markup Language 5 (HTML5) application 314, a Javascript® application 316, an Adobe® Flash® application 318, an Asynchronous Javascript® and XML (AJAX) application 320, a JQuery® application 324, a Microsoft® Silverlight® application 326, a hyperlink 328, a frame 330, a script 332, an image 334, a header 336, and a form 338.

The sandboxed application 112 exists within the security sandbox 104 of FIG. 3. The web page 302, the script 304, the binary executable 306, the intermediate bytecode 308, the abstract syntax tree 310, and the executable application 312 are listed as general examples of the sandboxed application 112 of FIG. 3. According to one embodiment, a web page 302 may be a document and/or an information resource that is suitable for the World Wide Web and can be accessed through a web browser and displayed on a monitor and/or a mobile device. According to one embodiment, a script 304 may be a program written for a software environment that automates the execution of tasks which could alternatively be executed one-by-one by a human operator.

According to one embodiment, a binary executable 306 may be a binary file that may include a program in machine language which is ready to be run. According to one embodiment, an intermediate bytecode 308 may be a programming language implementation of instruction set designed for efficient execution by a software interpreter. According to one embodiment, an abstract syntax tree 310 may be a tree representation of the abstract syntactic structure of source code written in a programming language. According to one embodiment, an executable application 312 may be a file that causes a computer to perform indicated tasks according to encoded instructions.

The HTML5 application 314, the Javascript® application 316, the Adobe® Flash® application 318, the Microsoft® Silverlight® application 326, the JQuery® application 324, and the AJAX application 320 are listed as specific examples of the general examples of FIG. 3. According to one embodiment, a HTML5 application 314 may be a program written in the fifth revision of the hypertext markup language standard for structuring and presenting content for the World Wide Web. According to one embodiment, a Javascript® application 316 may be a program written in a scripting language commonly implemented as part of a web browser in order to create enhanced user interfaces and dynamic websites. According to one embodiment, an Adobe® Flash® application 318 may be a program written for a multimedia and software platform used for authoring of vector graphics, animation, games and Rich Internet Applications (RIAs) which can be viewed, played, and executed in Adobe® Flash® Player.

According to one embodiment, an AJAX application 320 may be a program using a XMLHttpRequest method, a program using a Msxml2.XMLHTTP method, a program using a Microsoft.XMLHTTP method, and/or any other web program that can send data to and retrieve data from a server in the background without interfering with the display and behavior of the existing page. According to one embodiment, a JQuery® application 324 may be a program written using a multi-browser collection of pre-written Javascript® designed to simply the client-side scripting of HTML. According to one embodiment, a Microsoft® Silverlight® application 326 may be a program written in a framework for writing and running RIAs with features and purposes similar to those of Adobe® Flash®.

The same origin policy exception 300 extends horizontally below the security sandbox 104 of FIG. 3. According to one embodiment, a same origin policy exception 300 may be a cross-domain scripting technique, a cross-site scripting technique, a document.domain property, a Cross-Origin Resource Sharing (CORS), a cross-document messaging, a technique for relaxing a policy preventing access to methods and properties across pages on different sites, and/or an access control algorithm governing a policy through which a secondary authentication is required when establishing a communication between the sandboxed application 112 and the networked device 102.

A client device 100 may establish a communication session between a sandboxed application 112 and a sandbox reachable service 114 using a cross-site scripting technique of a security sandbox 104. A client device 100 may also append a header 336 of a hypertext transfer protocol to permit a networked device 102 to communicate with a sandboxed application 112 as a permitted origin domain through a Cross-origin resource sharing (CORS) algorithm. Further, a client device 100 may utilize a same origin policy exception 300 through a use of a hyperlink 328, a form 338, a script 332, a frame 330, a header 336, and/or an image 334 when establishing the connection between a sandboxed application 112 and a sandbox reachable service 114.

For example, FIG. 3 may encompass a HTML5 cross-domain scripting using postMessage where it is described HTML5 application 314. With postMessage, a calling window may call any other window in a hierarchy including those in other domains. A receiving window may set up a message listener to receive said message and can return results by posting a result message back to a calling frame. Assuming a web page residing at http://example.com/index.html:

```
<iframe src="http://bar.com" id="iframe"></iframe>
<form id="form">
    <input type="text" id="msg" value="Message to send"/>
    <input type="submit"/>
</form>
<script>
window.onload = function( ){
    var win = document.getElementById("iframe").contentWindow;
    document.getElementById("form").onsubmit = function(e){
        win.postMessage( document.getElementById("msg").value);
        e.preventDefault( );
    };
};
</script>
```
An iframe may load the following HTML from bar.com:
```
<b>This iframe is located on bar.com</b>
<div id="test">Send me a message!</div>
<script>
document.addEventListener("message", function(e){
    document.getElementById("test").textContent =
        e.domain + " said: " + e.data;
}, false);
</script>
```

When a user 820 (e.g., a human agent who uses a service) clicks on the submit button, a message may be posted to the frame read from bar.com which changes "Send me a message!" to http://bar.com said: Message to send.

The hyperlink 328, the frame 330, the script 332, the image 334, the header 336, and the form 338 comprise aspects of the same origin policy exception 300 of FIG. 3. According to one embodiment, a hyperlink 328 may be a reference to data that a reader can directly follow and/or that is followed automatically. FIG. 3 may also be applicable to a hyperlink send message interface (e.g., a mechanism by which a sandboxed application 112 sends a message to a pairing server 200) where it is described a hyperlink 328 using an <A> tag to send a message to a pairing server 200 comprised of a discovery service and a relay service. The <A> tag may link to pages that are not in a same domain as a web page being viewed in a browser. As such a link may point to the pairing server 200 and arguments to be passed in a message may be encoded as key-value pairs in a uniform resource identifier (URI) query string. For example, <A HREF=http://pairing_server.com/f?a=10&b=bar>call f</A>

A sandboxed application 112 may announce to the pairing server 200. At a later time, a user 820 may visit example.com and view index.html. When the user 820 clicks on a "call f" hyperlink, a HTTP request may be sent to the pairing server 200. "f" may refer to a path to some arbitrary function and key-value pairs a=10 and/or b=bar may be arguments to that function. The pairing server 200 may receive an HTTP GET like this request generated using Google Chrome™:

GET /f?a=10&b=bar HTTP/1.1
    Host: pairing_server.com
    Connection: keep-alive
    Referer: http://example.dom/index.html
    Accept: application/xml,application/xhtml+xml,text/html;q=0.9,text/plain;q=0.8,image/pn g,*/*;q=0.5
    User-Agent: Mozilla/5.0 (Macintosh; U; Intel Mac OS X 10_6_4; en-US) AppleWebKit/534.3 (KHTML, like Gecko) Chrome/6.0.472.63 Safari/534.3
    Accept-Encoding: gzip,deflate,sdch
    Accept-Language: en-US,en;q=0.8
    Accept-Charset: ISO-8859-1,utf-8;q=0.7,*;q=0.3

The URI may not indicate to which service a message is intended. This may be interpreted by the pairing server 200 as a private broadcast meaning that a message passed via a message query interface (e.g., a mechanism to communicate a message from a pairing server 200 to a sandbox reachable service 114) is passed to all sandbox reachable services in a shared network 202. In this case, a response HTML may simply be a new web page that may include a confirmation dialog and/or a notification that a message has been sent.

According to one embodiment, a frame 330 may be a frameset, an inline frame, and/or any display of web pages and/or media elements within the same browser window. According to one embodiment, a script 332 may be a HTML tag used to define a program that may accompany an HTML document and/or be directly embedded in it. FIG. 3 may encompass a SCRIPT tag where it is described a script 332 used to contact the pairing server 200. For example, a server may deliver an http://example.com/index.html that may include a cross-site <script> tag as follows:

```
<html>...<head>
<script type="text/Javascript">
function lookup_cb(d) {
var services = d["services"];
var slen = services.length;
var s, len;
s= "<ul>";
for ( var i = 0; i < slen; ++i )
    s = s + "<li>" + services[i].name + "</li>";
s = s + "</ul>";
document.getElementById("services").innerHTML=s;
}
```

-continued

```
</script></head><body>
...
<div id="services"></div>
...
<script id="external_script" type="text/Javascript"></script>
<script>
document.getElementById("external_script").src =
    "http://pairing_server.com/fling/lookup?callback=lookup_cb";
</script></body></html>
```

In the example above, Javascript® may replace a source of a <script> with id "external_script" with a script downloaded from the pairing server 200. A call being made to a sandbox reachable service 114 may be embedded in a call to "lookup" with a single argument "callback=lookup_cb." The pairing server 200 may return a script that may include a result, e.g.,

```
lookup_cb({
    "services": [...],
    "yourip": "69.106.59.218",
    "version": "1.0",
    "interval": 900
})
```

The result above may include a list of "services" discovered in a user's (e.g., the user of the client device 100) shared network 202. The result may be encapsulated inside a call to lookup_cb which was a callback passed in a SRC URI to an external_script <script> tag. A returned script may be automatically executed, causing lookup_cb to be called. lookup_cb may iterate over services in a result and may output them into the HTML of the web page http://example.com/index.html.

According to one embodiment, an image 334 may be a HTML tag that incorporates in-line graphics into an HTML document. FIG. 3 may also encompass an <A> tag encapsulating an <IMG> tag where it is described an image 334, thereby allowing a link to take on the appearance of a button, according to one embodiment. With Javascript® a behavior of the image may be scripted to make the button change appearance when a mouse passes over the button or when a user clicks on the button, thereby making the image behave more like a button. For example,

```
<A HREF="http://pairing_server.com/f?a=10&b=bar"><IMG
    SRC="f.jpg">call f</IMG></A>
```

FIG. 3 may also be applicable to an IMG tag where it is described an image 334 used to communicate a call, according to one embodiment. For example, <IMG SRC="http://pairing_server.com/f?a=10&b=bar">calling f . . . </IMG>

This example may correspond to a call f with arguments a=10 and/or b=bar. The pairing server 200 sees GET /f?a=10&b=bar HTTP/1.1
    Host: ec2-204-236-247-87.compute-1.amazonaws.com:7878
    Connection: keep-alive
    Referer: http://dave.flingo.org/browser_behavior_tests/img_link.html
    Cache-Control: max-age=0
    Accept: */*
    User-Agent: Mozilla/5.0 (Macintosh; U; Intel Mac OS X 10_6_4; en-US)

AppleWebKit/534.3 (KHTML, like Gecko) Chrome/6.0.472.63 Safari/534.3
Accept-Encoding: gzip,deflate
Accept-Language: en-US,en;q=0.8
Accept-Charset: ISO-8859-1,utf-8;q=0.7,*;q=0.3

A browser may expect an image to be returned by this request. As a result, an IMG send message interface may not threaten a calling web page with script injection attacks. However, it may limit what can be returned with an IMG tag. The pairing server 200 may return a valid transparent IMG with width and height set to communicate a pair. Since an IMG body has been loaded into the calling web page, the height and width of the image are immediately available to the calling page using Javascript®, e.g.,

```
<HTML>
<HEAD> ...
<script type="text/Javascript">
function loaded( ) {
    var im = document.getElementById("image")
    alert( "image height=" + im.height + " width=" + im.width );
}
</script>
</HEAD><BODY>...
<IMG ID="image" SRC="http://pairing_server.com/f?a=10&b=bar" onload="loaded( );"></IMG>
</BODY>
</HTML>
```

According to one embodiment, a header 336 may be an origin header, a referrer header, and/or any other supplemental data placed at the beginning of a block of data being stored and/or transmitted. FIG. 3 may be applicable to a passing of a URI of a web page that may include a hyperlink along with a GET request in a "referer [sic]" URI header where it is described a header 336 when a user 820 clicks on a hyperlink rendered from an <A> tag. A pairing server 200 can interpret a referer URI as an URI of a web page to be relayed to a sandbox reachable service 114 that can render web pages. For example, the following hyperlink appears in the web page http://example.com/foo.html <A HREF=http://pairing_server.com/fling> fling this web page </A>

When a user 820 clicks on "fling this page," the pairing server 200 may read the referer URI (e.g., associated with a client device 100) to determine that the page http://example.com/foo.html should be relayed to the receiving sandbox-reachable services.

FIG. 3 may also encompass interpreting a referer URI dependent on page content where it is described a header 336, according to one embodiment. For example, a web page 302 that may include a video may cause a reference to the video to be passed to a networked device 102. Similarly, a web page 302 that may include an audio may cause a reference to the audio to be passed to a networked device 102.

According to one embodiment, a form 338 may be a HTML tag that allows a web user to enter data that is sent to a server for processing. For example, FIG. 3 may encompass a sandboxed application 112 sending messages to a sandbox reachable service 114 via HTML FORMs where it is described a form 338. The action of a form may direct the messages via the pairing server 200. Assume a web page may reside at http://example.com/index.html and assume a relay infrastructure may run on a server with example domain "pairing_server.com." The video to be relayed may be titled "Waxing Love."

```
<form name="input" action="http://pairing_server.com/fling" method="post">
<INPUT TYPE="HIDDEN" id="title" name="title" value="Waxing Love" />
<INPUT TYPE="HIDDEN" id="description" name="description" value="An example video." />
<INPUT TYPE="HIDDEN" id="uri" name="uri" value="http://example.com/wax.mp4" />
<INPUT TYPE="SUBMIT" NAME="submit" VALUE="fling" />
</form>
```

A hidden type may populate an HTTP POST. In this example, an URI of a resource may be passed to a pairing server 200. The pairing server 200 may treat the POST as a message to be forwarded to services. In this example, the server may see something like:

POST /fling HTTP/1.1
Host: pairing_server.com
Origin: http://example.com/index.html
User-Agent: Mozilla/5.0 (Macintosh; U; Intel Mac OS X 10_6_4; en-us)
AppleWebKit/533.16 (KHTML, like Gecko) Version/5.0 Safari/533.16
Content-Type: application/x-www-form-urlencoded
Accept: application/xml,application/xhtml+xml,text/html;q=0.9,text/plain;
q=0.8,image/png,*/*;q=0.5
Referer: http://example.com/index.html
Accept-Language: en-us
Accept-Encoding: gzip, deflate
Content-Length: 95
Connection: keep-alive
title=Waxing+Love&description=An+example+video.&uri=http%3A%2F%2Fexample.com%2Fwax.mp4&submit=fling The intended message may be encoded in key-value pairs of a message body. In this case a title, description, and URI and an operation "fling."

Figure 4:
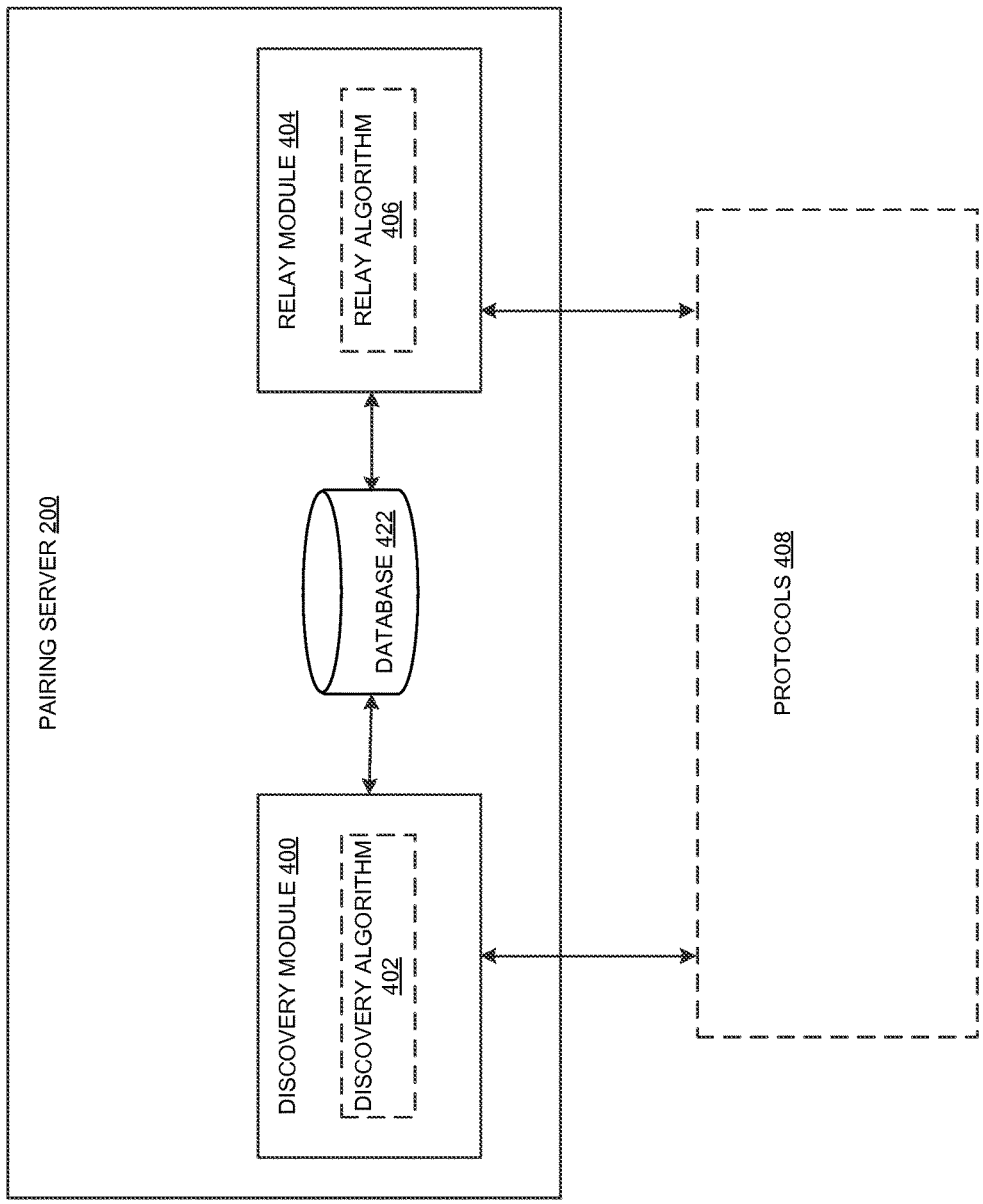
FIG. 4 is an exploded view of the pairing server 200, according to one embodiment.

FIG. 4 is an exploded view of the pairing server 200, according to one embodiment. FIG. 4 shows a pairing server 200, a discovery module 400, a discovery algorithm 402, a relay module 404, a relay algorithm 406, a protocols 408, and a database 422.

The discovery module 400 and the relay module 404 communicate with the database 422, and they all exist within the pairing server 200 of FIG. 4. According to one embodiment, a discovery module 400 may be a self-contained component of a pairing server 200 that detects devices and services on a network. According to one embodiment, a relay module 404 may be a self-contained component of a pairing server 200 that transmits data to an intermediate node located between a source and destination that are separated by a distance that prevents direct communications. According to one embodiment, a database 422 may be a structured collection of information.

A networked device 102 may announce a sandbox reachable service 114 to a discovery module 400. When a shared network 202 is determined to be commonly associated with a client device 100 and a networked device 102, a pairing server 200 may receive, store using a processor 108 and a memory 110, and communicate to a client device 100 a global unique identifier 208 and/or an alphanumeric name 210 in an announcement from a networked device 102 along with a hardware address 222 associated with the networked device 102, a public address pair 220 associated with a sandbox reachable service 114 of the networked device 102, and/or a private address pair 212 associated with the sandbox reachable service 114 of the networked device 102. A shared network 202 is determined to be commonly associated with a client device 100 and a networked device 102 when it is presently shared and/or was previously shared by the networked device 102 and the client device 100.

The discovery algorithm 402 exists within the discovery module 400 of FIG. 4. According to one embodiment, a discovery algorithm 402 may be a procedure for detecting devices and services on a network. A service agent module of a networked device 102 may coordinate communications with a discovery module 400 of a security sandbox 104 and/or a pairing server 200. For example, the service agent sits outside a browser or browser-like security sandbox thereby allowing it to listen on a socket. Thus, it can act as a means for services on the same device to discover one another. The service agent may also announce on behalf of service(s) local to that device.

The relay algorithm 406 exists within the relay module 404 of FIG. 4. According to one embodiment, a relay algorithm 406 may be a procedure for transmitting data to an intermediate node located between a source and destination that are separated by a distance that prevents direct communications. A service agent module of a networked device 102 may coordinate communications with a discovery module 400 of a security sandbox 104 and/or a pairing server 200. For example, the service agent sits outside a browser or browser-like security sandbox thereby allowing it to listen on a socket. Thus, it can act as a relay for messages arriving from a shared network 202.

When a client device 100 and a networked device 102 reside on networks that are incommunicable with each other comprising a firewall separation, a different network separation, a physical separation, and/or an unreachable connection separation, a sandboxed application 112 of a security sandbox 104 of the client device 100 and a sandbox reachable service 114 of the networked device 102 may communicate with each other through a relay service employed by a pairing server 200 having a discovery module 400 and a relay module 404 to facilitate a trusted communication (e.g., by guarding a GUID 208, a private IP address 808, and/or a hardware address 222 of a networked device 102 and/or a sandbox reachable service 114 from a sandboxed application 112) between the sandboxed application 112 and the sandbox reachable service 114.

The discovery module 400 and the relay module 404 can also communicate using the protocols 408 of FIG. 4. According to one embodiment, a protocols 408 may be a system of digital message formats and rules for exchanging those messages in and/or between devices sharing a network.

Figure 5:
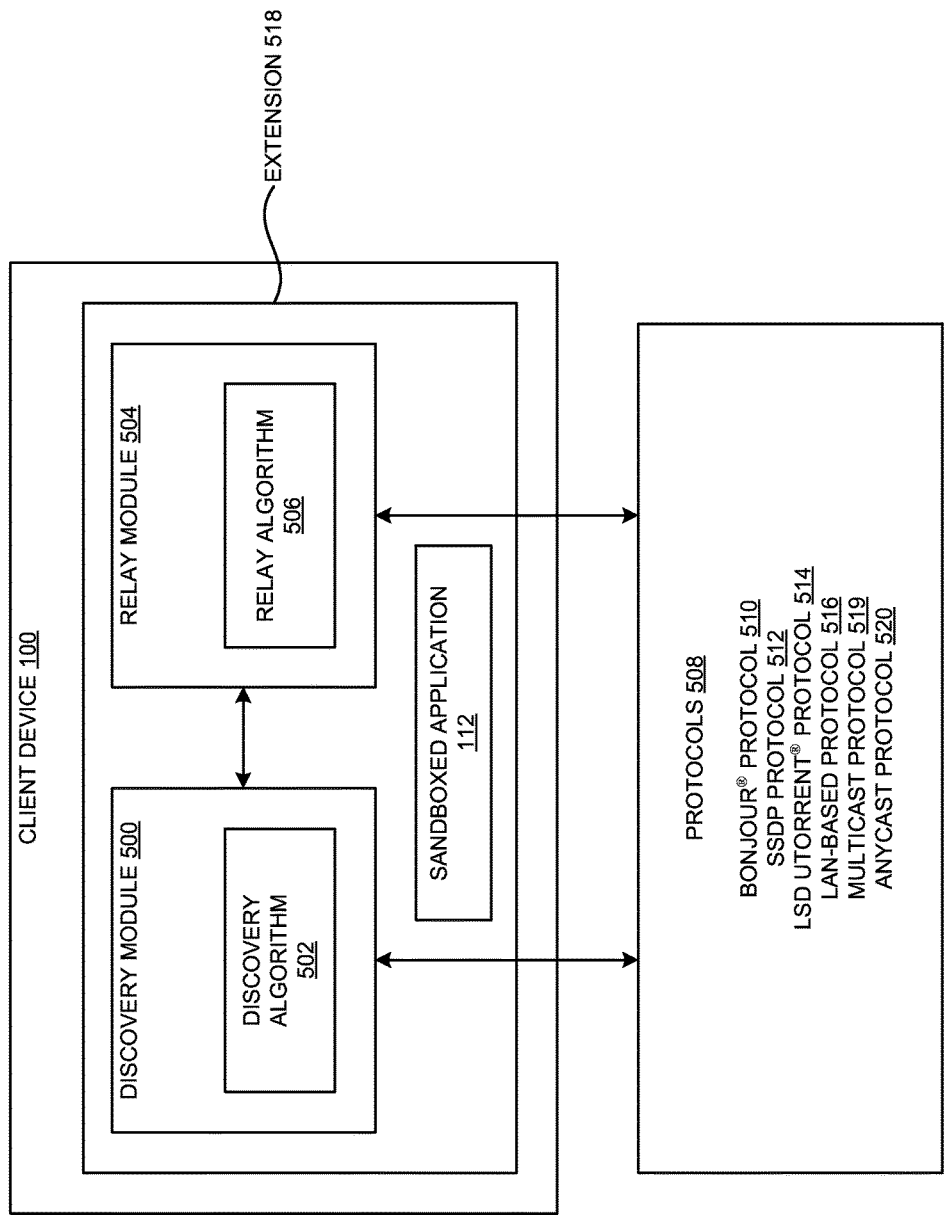
FIG. 5 is an exploded view of the client device 100, according to one embodiment.

FIG. 5 is an exploded view of the client device 100, according to one embodiment. FIG. 5 shows a client device 100, a discovery module 500, a relay module 504, a discovery algorithm 502, a relay algorithm 506, an extension 518, a sandboxed application 112, a protocols 508, a Bonjour® protocol 510, a Simple Service Discovery Protocol (SSDP) protocol 512, a local service discovery (LSD) uTorrent® protocol 514, a local area network (LAN) based protocol 516, a multicast protocol 519, and an anycast protocol 520.

The extension 518 exists within the client device 100 of FIG. 5. According to one embodiment, an extension 518 may be a program adding the capabilities of a discovery module 500 and/or a relay module 504 to a browser. A client device 100 may extend a security sandbox 104 with a discovery algorithm 502 and a relay algorithm 506 through a discovery module 500 and a relay module 504 added to the security sandbox 104. A client device 100 may also bypass a pairing server 200 having a discovery algorithm 402 and a relay algorithm 406 when establishing a connection between a sandboxed application 112 and a sandbox reachable service 114 when the security is extended with the discovery algorithm 502 and the relay algorithm 506 through the discovery module 500 and the relay module 504 added to a security sandbox 104.

The discovery module 500, the relay module 504, and the sandboxed application 112 exist within the extension 518 of FIG. 5. The discovery module 500 communicates with the relay module 504 of FIG. 5. According to one embodiment, a discovery module 500 may be a self-contained component of a client device 100 that detects devices and services on a network. According to one embodiment, a relay module 504 may be a self-contained component of a client device 100 that transmits data to an intermediate node located between a source and destination that are separated by a distance that prevents direct communications. A networked device 102 may announce a sandbox reachable service 114 to a discovery module 500. A networked device 102 may also automatically instantiate a communication between a sandbox reachable service 114 of the networked device 102 and a client device 100 when a relay module 504 sends a request from a sandboxed application 112 of the client device 100 to the sandbox reachable service 114.

The discovery algorithm 502 exists within the discovery module 500 of FIG. 5. A client device 100 may apply a discovery algorithm 502 of a security sandbox 104 to determine that a networked device 102 having a sandbox reachable service 114 communicates in a shared network 202 common to the client device 100 and the networked device 102.

The relay algorithm 506 exists within the relay module 504 of FIG. 5. A client device 100 may apply a relay algorithm 506 of a security sandbox 104 to establish a connection between a sandboxed application 112 and a sandbox reachable service 114 of a networked device 102. A client device 100 may utilize a WebSocket (e.g., a web technology providing full-duplex communications channels over a single Transmission Control Protocol connection) and/or a long polling service message query interface to reduce a latency of message delivery during a trusted communication between a sandboxed application 112 and a sandbox reachable service 114. A client device 100 may also optimize a polling period between polling such that it is less than a timeout period of a session through the relay service. A client device 100 may initiate a relay service through a series of web pages where information is communicated using a hyperlink 328 that points at a pairing server 200, and/or a form 338 having a confirmation dialog that is submitted back to the pairing server 200. A global unique identifier 208 (e.g., of a sandbox reachable service 114) may be masked through a pairing server 200 when a confirmation dialog is served from the pairing server 200.

The discovery algorithm 502 and the relay algorithm 506 can communicate using the protocols 508 of FIG. 5. The Bonjour® protocol 510, the SSDP protocol 512, the LSD uTorrent® protocol 514, the LAN-based protocol 516, the multicast protocol 519, and the anycast protocol 520 exist within the protocols 508 of FIG. 5. According to one embodiment, a Bonjour® protocol 510 may be a system of technologies including service discovery, address assignment, and hostname resolution developed by Apple®. According to one embodiment, a SSDP protocol 512 may be a network protocol based on the Internet Protocol Suite for advertisement and discovery of network services and presence information that is accomplished without assistance of server-based configuration mechanisms and without special static configuration of a network host. According to one embodiment, a LSD uTorrent® protocol 514 may be an extension to the BitTorrent® file distribution system that is designed to support the discovery of local BitTorrent® peers, aiming to minimize traffic through an Internet service provider's (ISP) channel and minimize use of higher-bandwidth LAN while implemented in a client with a small memory footprint. According to one embodiment, a LAN-based protocol 516 may be a system of broadcast-based local area network discovery. According to one embodiment, a multicast protocol 519 may be a system of delivering information simultaneously to a group of destination devices in a single transmission from a source. According to one embodiment, an anycast protocol 520 may be a system of routing datagrams from a single sender to the topologically nearest node in a group of potential receivers, though it may be sent to several nodes, all identified by the same destination address.

A discovery algorithm 502 may utilize a protocols 508 comprising a Bonjour® protocol 510, a SSDP protocol 512, a LSD uTorrent® protocol 514, a multicast protocol 519, an anycast protocol 520, and/or another LAN-based protocol 516 that discovers services in a LAN based on a broadcast from any one of an operating system service, a security sandbox 104, a client device 100, a sandbox reachable service 114, and a networked device 102.

FIG. 6 is a table of example network information stored in a database 422 of a pairing server 200, according to one embodiment. FIG. 6 shows a GUID 208, an alphanumeric name 210, a network 600, a service 601, a Network Address Translator (NAT) 602, a port number 604, an IP address 606, and a table 650. The GUID 208, the alphanumeric name 210, the network 600, the service 601, the NAT 602, the port number 604, and the IP address 606 are headings for each column of a table 650 of FIG. 6.

According to one embodiment, a network 600 may be a collection of hardware interconnected by communication channels that allow sharing of resources and information. According to one embodiment, a service 601 may be a description and/or a name of a service provided by a device. According to one embodiment, a NAT 602 may be an indication of whether or not a NAT device is present on a network 600. According to one embodiment, a port number 604 may be a 16-bit reference number for a process-specific software construct serving as a communications endpoint in a computer's host operating system. According to one embodiment, an IP address 606 may be a numerical label assigned to each device participating in a computer network that uses the Internet Protocol for communication. According to one embodiment, a table 650 may be a set of data elements that is organized using a model of vertical columns which are identified by names and horizontal rows. A sandbox reachable service 114 may communicate a GUID 208 and/or an alphanumeric name 210 to a pairing server 200 along with an IP address 606 and/or a port number 604 of the sandbox reachable service 114.

Figure 7:
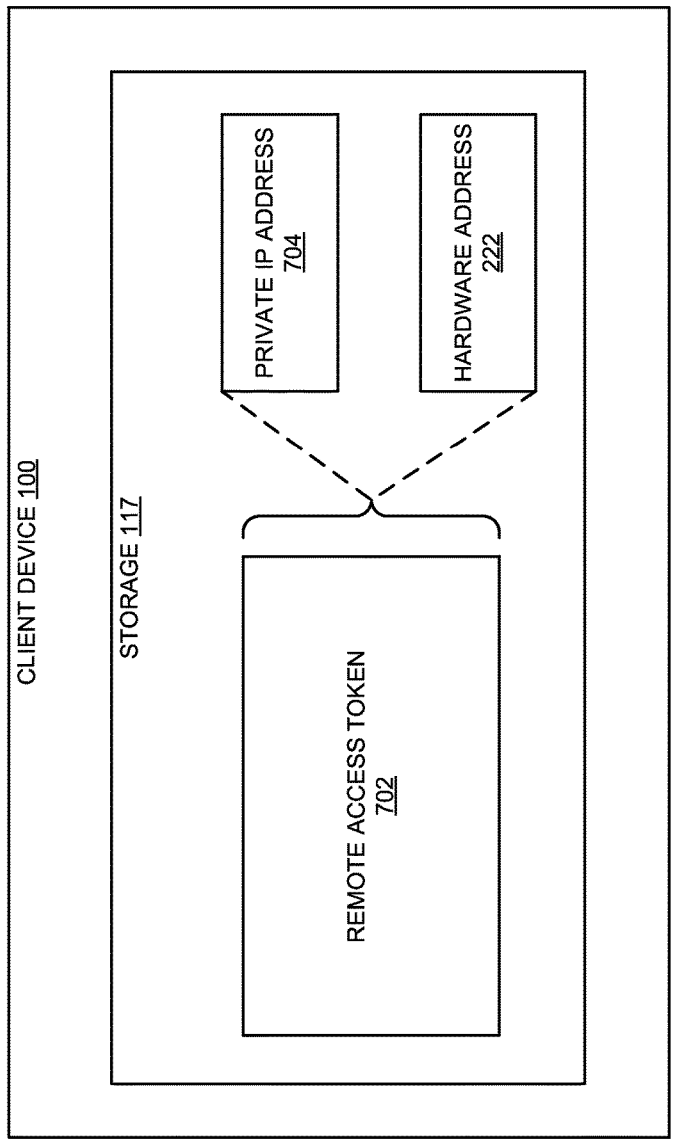
FIG. 7 is a block diagram of a method by which a security sandbox 104 can communicate with a sandbox reachable service 114 that previously operated on a shared network 202, according to one embodiment.

FIG. 7 is a block diagram of a method by which a security sandbox 104 can communicate with a sandbox reachable service 114 that previously operated on a shared network 202, according to one embodiment. FIG. 7 shows a client device 100, a storage 117, a remote access token 702, a private IP address 704, and a hardware address 222. The storage 117 exists within the client device 100 of FIG. 7. The remote access token 702 exists within the storage 117 of FIG. 7. According to one embodiment, a remote access token 702 may be an object encapsulating a security descriptor of a process so that a client device 100 and a networked device 102 that previously established a communication session automatically recognize each other. A cookie associated with a security sandbox 104 may be used to store a remote access token 702 on a storage 117 (e.g., Web storage, HTML5 storage) of a client device 100. A client device 100 can communicate with a sandbox reachable service 114 that previously operated on a common shared network 202 through a remote access token 702.

The private IP address 704 and the hardware address 222 comprise aspects of the remote access token 702 of FIG. 7. According to one embodiment, a private IP address 704 may be an IP address of a node on a private network that may not be used to route packets on the public Internet. A remote access token 702 may identify a set of communicable private Internet Protocol (IP) address (e.g., the private ip address 704) and/or hardware addresses (e.g., the hardware address 222) associated with a sandbox reachable service 114 that previously operated on a common shared network 202 with a client device 100. For example, FIG. 7 may encompass a preference for associating a device with a hardware address 222 where it is described a hardware address 222. A private IP address 704 may change as devices move between networks. However, a hardware address 222 may be a stable, long-term pseudonym for a device and thus may serve a good value from which to derive a remote access token 702.

Figure 8:
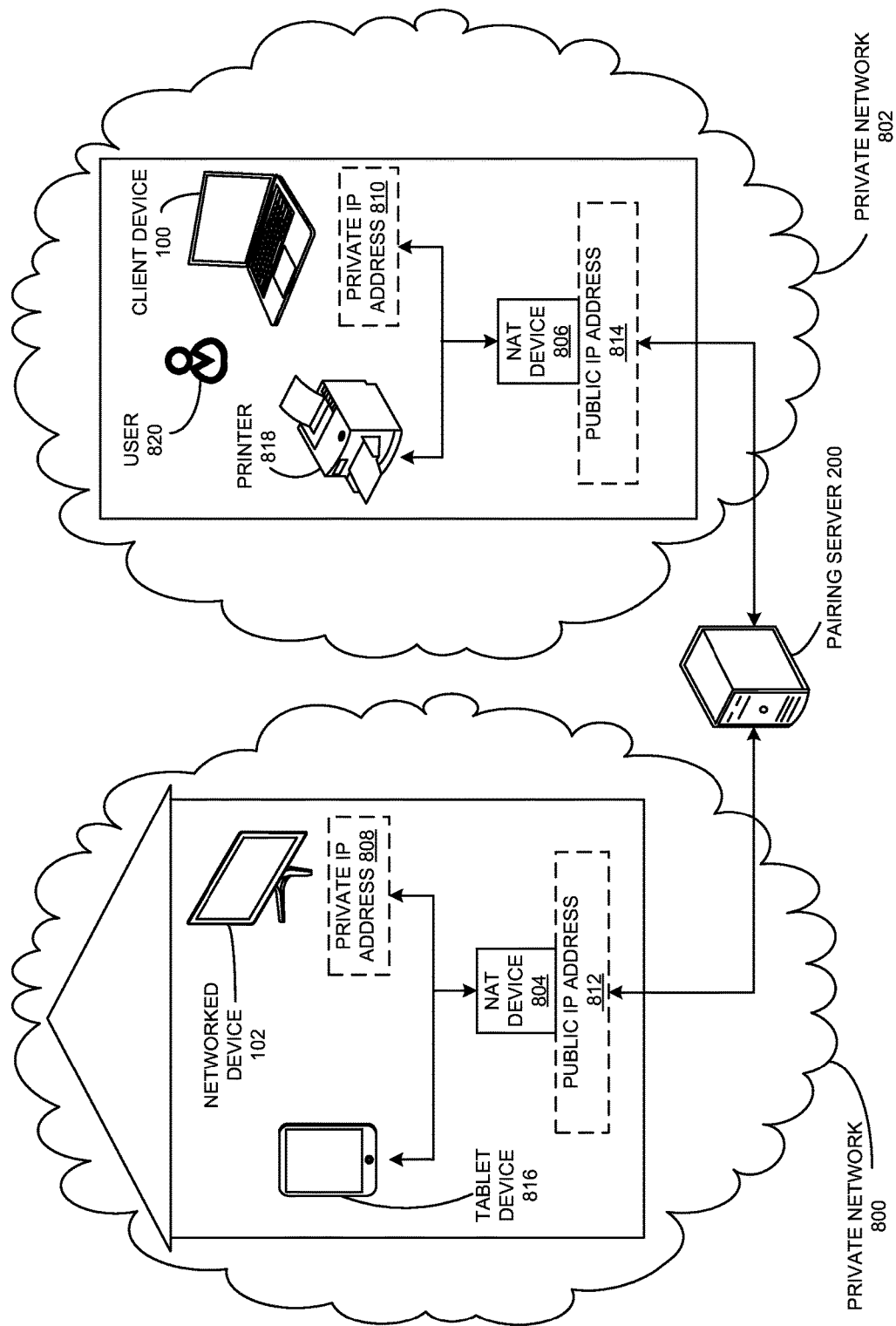
FIG. 8 is a schematic diagram of a private network 800 and a private network 802 communicating over the public Internet via a NAT device 804 and a NAT device 806, according to one embodiment.

FIG. 8 is a schematic diagram of a private network 800 and a private network 802 communicating over the public Internet via a NAT device 804 and a NAT device 806, according to one embodiment. FIG. 8 shows a client device 100, a networked device 102, a pairing server 200, a private network 800, a private network 802, a NAT device 804, a NAT device 806, a private IP address 808, a private IP address 810, a public IP address 812, a public IP address 814, a tablet device 816, a printer 818, and a user 820.

The private network 800 and the private network 802 communicate bidirectionally through the pairing server 200 of FIG. 8. According to one embodiment, a private network 800 may be a home network and/or any other network with private IP space that may be behind a NAT device 804. According to one embodiment, a private network 802 may be an office network and/or any other network with private IP space that may be behind a NAT device 806. A client device 100 (e.g., laptop) and a networked device 102 (e.g., television) may reside on networks that are incommunicable with each other comprising a firewall separation, a different network separation, a physical separation, and/or an unreachable connection separation. A sandboxed application 112 of a security sandbox 104 of the client device 100 and a sandbox reachable service 114 of the networked device 102 may communicate with each other through a relay service employed by a pairing server 200 having the discovery module and the relay module to facilitate a trusted communication between the sandboxed application 112 and the sandbox reachable service 114.

The NAT device 804, the networked device 102, and the tablet device 816 are all interconnected and exist within the private network 800 of FIG. 8. According to one embodiment, a NAT device 804 may be a device for modifying IP address information in IP packet headers while in transit across a traffic routing device. According to one embodiment, a tablet device 816 may be a one-piece mobile computer, primarily operated by touchscreen and/or an onscreen virtual keyboard. A NAT device 804 may be coupled with a network on which a networked device 102 operates.

The NAT device 806, the client device 100, and the printer 818 are all interconnected and exist within the private network 802 of FIG. 8. According to one embodiment, a NAT device 806 may be a device for modifying IP address information in IP packet headers while in transit across a traffic routing device. According to one embodiment, a printer 818 may be a peripheral device which produces a representation of an electronic document on physical media. A NAT device 806 may be coupled with a network on which a client device 100 operates.

The NAT device 804 connects to the pairing server 200 through the public IP address 812 of FIG. 8. The NAT device 804 connects to the networked device 102 through the private IP address 808 of the networked device 102 of FIG. 8. According to one embodiment, a public IP address 812 may be an IP address of a private network 800 that may be used to route packets on the public Internet. According to one embodiment, a private IP address 808 may be an IP address of a networked device 102 on a private network 800. A trusted communication may be facilitated in a manner such that a sandboxed application 112 never learns a private IP address 808 and/or a hardware address 222 of a networked device 102 when a NAT device 804 may translate a private IP address 808 of a networked device 102 to a public IP address 812 visible to a sandboxed application 112.

The NAT device 806 connects to the pairing server 200 through the public IP address 814 of FIG. 8. The NAT device 806 connects to the client device 100 through the private IP address 810 of the client device 100 of FIG. 8. According to one embodiment, a public IP address 814 may be an IP address of a private network 802 that may be used to route packets on the public Internet. According to one embodiment, a private IP address 810 may be an IP address of a networked device 102 on a private network 802. A trusted communication may be facilitated in a manner such that a sandboxed application 112 never learns a private IP address 808 and/or a hardware address 222 of a networked device 102 when a NAT device 806 may receive communications from a public IP address 812 of a private network 800 on which a sandbox reachable service 114 operates.

For example, FIG. 8 may encompass a sandboxed application 112 being constrained to know nothing but a description and/or name of a service (e.g., no private IP address 808, no hardware address 222, no GUID 208) where it is described a private IP address 808.

FIG. 8 may also be applicable to a sandboxed application 112 being constrained to know nothing at all about who receives a communication (e.g., no private IP address 808, no hardware address 222, no GUID 208, no description and/or name of a service) where it is described a private IP address 808, according to one embodiment. For example, a sandboxed application 112 may include a hyperlink 328 to a pairing server 200 in which the hyperlink 328 may specify a message but no recipient http://flingo.tv/fling/a?url=url_of_media_to_be_played. A pairing server 200 may disambiguate an intended recipient (e.g., by returning a form 338 to a user 820 in which the user 820 may select a sandbox reachable service 114). A returned form 338 may execute in a security sandbox 104 associated with a domain of a pairing server 200 which may be different from a security sandbox 104 of a sandboxed application 112.

The user 820 exists within the private network 802 of FIG. 8. According to one embodiment, a user 820 may be a human and/or software agent who uses a computer and/or network service.

Figure 9:
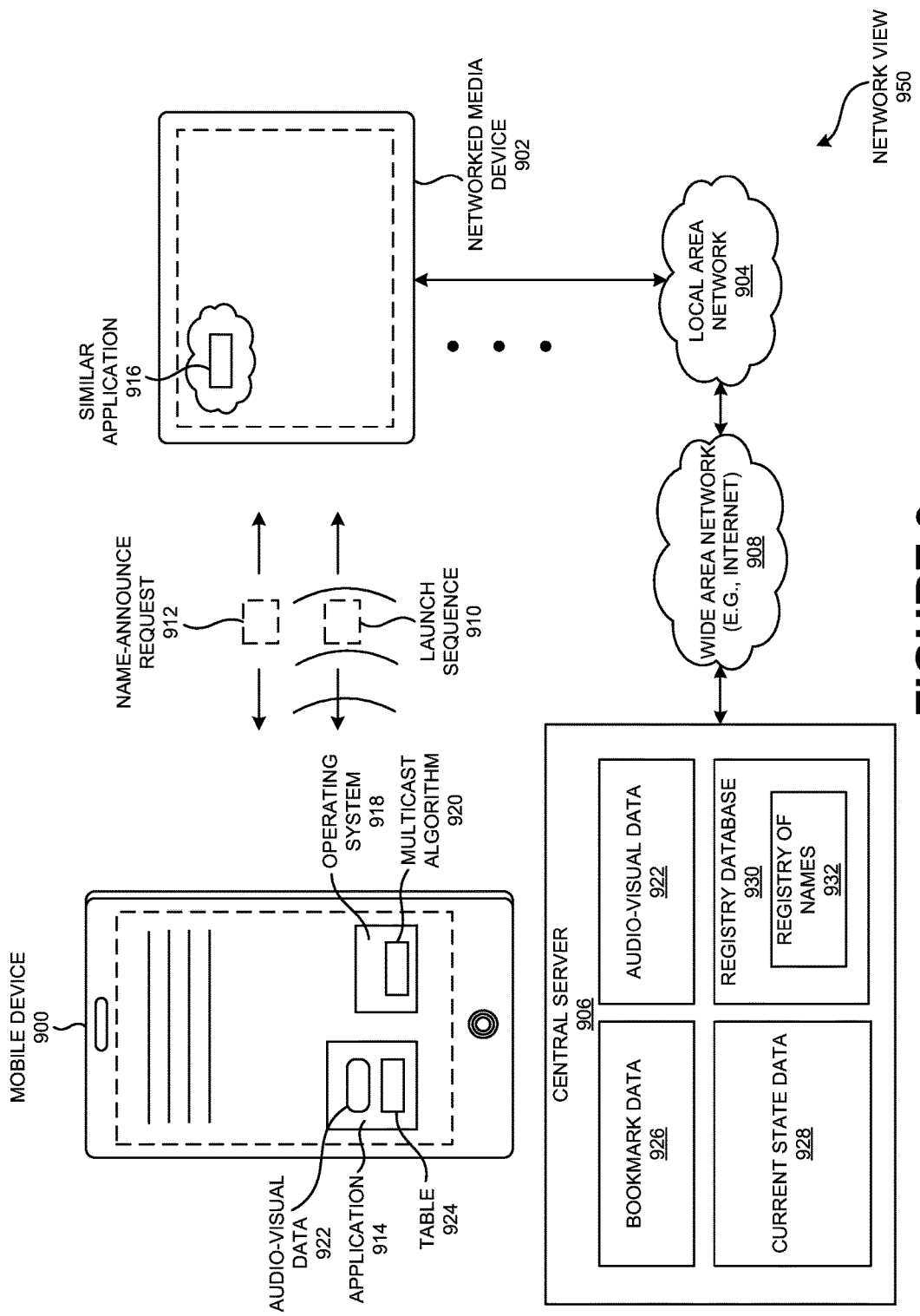
FIG. 9 illustrates a network view of a method, apparatus and system related to automatic detection of a similar application stored on a networked media device through a multicast capability of an operating system accessed through an application of a mobile device, according to one embodiment.

FIG. 9 illustrates a network view 950 of a method, apparatus and system related to automatic detection of a similar application 916 stored on a networked media device 902 through a multicast capability (e.g., using the multicast algorithm 920) of an operating system 918 accessed through an application 914 of a mobile device 900, according to one embodiment.

In FIG. 9, a method of a mobile device 900 includes accessing a multicast capability (e.g., using the multicast algorithm 920) of an operating system 918 through an application 914 of the mobile device 900, determining if there is a similar application 916 locally stored on a networked media device 902 to the application 914 on the mobile device 900 when a multicast message (e.g., using the operating system 918) is broadcast to the networked media device 902 communicatively coupled to the mobile device 900 through a local area network 904, and automatically launching the similar application 916 on the networked media device 902 based on a communication of the multicast message (e.g., using the operating system 918) from the mobile device 900 to the networked media device 902.

The multicast message (e.g., using the operating system 918) may be delivered through a multicast algorithm 920 of the operating system 918 that communicates a name-announce request 912 to any networked media device 902 communicatively coupled to the mobile device 900 through the local area network 904, according to the embodiment described in FIG. 9. The multicast message (e.g., using the operating system 918) may be communicated wirelessly through the local area network 904, according to the embodiment described in FIG. 9. The multicast message (e.g., using the operating system 918) may be communicated as a broadcast to all available ones of the networked media device 902 communicatively coupled to the mobile device 900 through the local area network 904, according to the embodiment described in FIG. 9.

It may be determined which network media devices (e.g., the networked media device 902) in the local area network 904 may be listening for the multicast message (e.g., using the operating system 918), according to the embodiment described in FIG. 9. It may be determined if the similar application 916 meets a criteria, according to the embodiment described in FIG. 9. A name of the similar application 916 received in response to the name-announce request 912 may be processed, according to the embodiment described in FIG. 9. A table 924 of the application 914 that lists the name and/or other names of other similar applications associated with ones of the networked media device 902 in the local area network 904 may be processed, according to the embodiment described in FIG. 9. The name of the application 914 may be presented to a user, according to the embodiment described in FIG. 9. A launch sequence 910 may be communicated to the similar application 916 responsive to a selection of the name by the user, according to the embodiment described in FIG. 9. It may be determined that the similar application 916 has launched based on the launch sequence 910, according to the embodiment described in FIG. 9. A communication session between the application 914 and/or the similar application 916 may be established, according to the embodiment described in FIG. 9.

A current state data 928 and/or a bookmark data 926 of an audio-visual data 922 executing on the application 914 on the mobile device 900 may be communicated to the similar application 916 on the networked media device 902 through the mobile device 900 and/or a central server 906 through which the audio-visual data 922 is streamed to the mobile device 900, according to the embodiment described in FIG. 9. The audio-visual data 922 may be streamed from the central server 906 to the similar application 916 on the networked media device 902 based on the current state data 928 and/or the bookmark data 926, according to the embodiment described in FIG. 9. The mobile device 900 may be unaware of how many ones of the networked media device 902 are presently communicatively coupled with the mobile device 900 through the local area network 904, according to the embodiment described in FIG. 9.

The nodes of the local area network 904 may replicate packets associated with the multicast message (e.g., using the operating system 918) having the name-announce request 912 to reach multiple ones of the ones of the networked media device 902 when necessary, according to the embodiment described in FIG. 9. The launch sequence 910 may be communicated in a form of a Uniform Resource Locator (URL) code to the similar application, so that the networked media device 902 is instructed to launch the similar application 916 based on data communicated through a destination internet protocol (IP) address associated with the URL, according to the embodiment described in FIG. 9. The name of the similar application 916 may be compared with a registry of names 932 in a registry database 930 of any one of the central server 906 and/or the mobile device 900 to determine whether the similar application 916 of the networked media device 902 is associatable with the application 914 of the mobile device 900, according to the embodiment described in FIG. 9.

Figure 10:
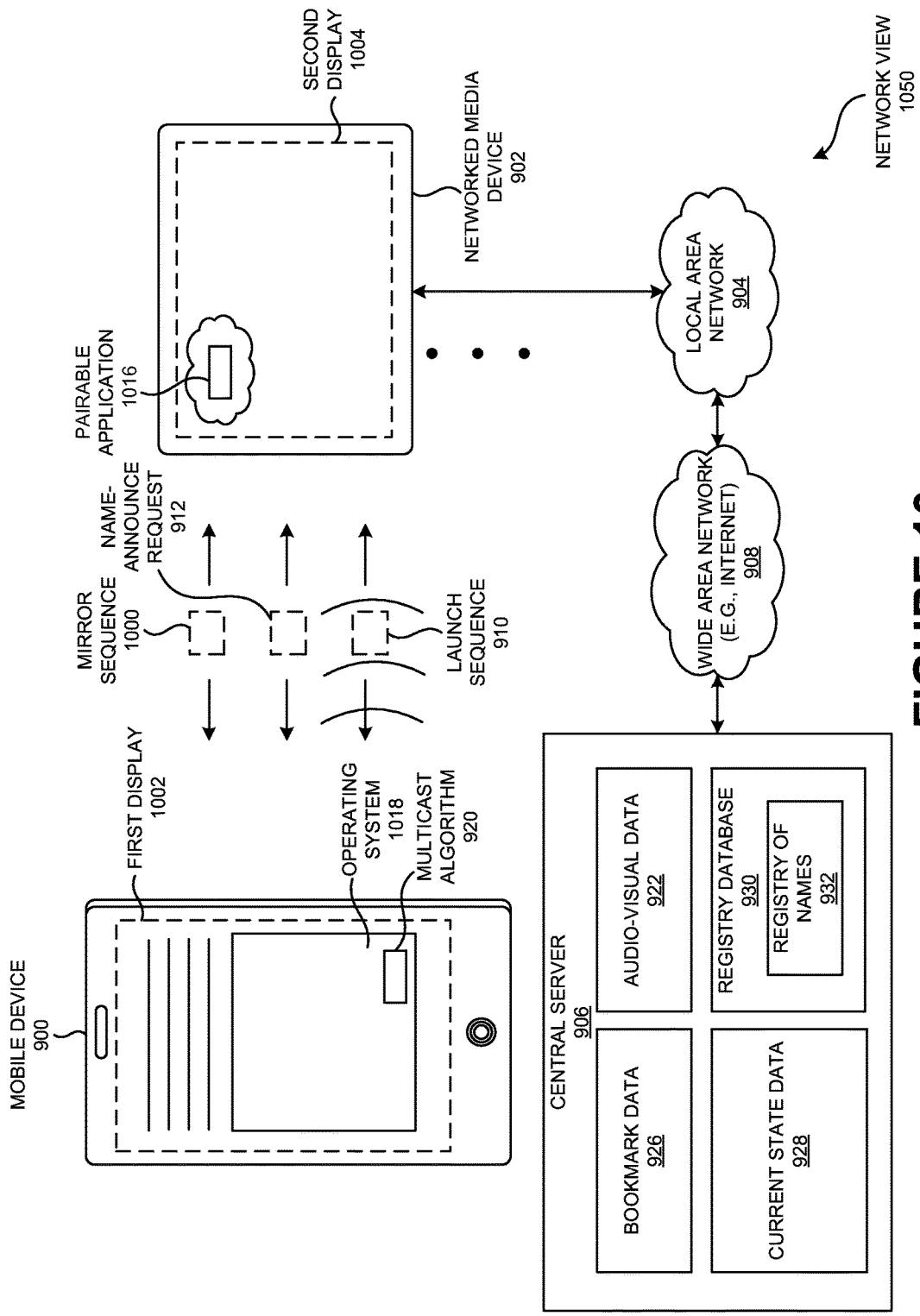
FIG. 10 illustrates a method, apparatus and system related to automated discovery and switch of a primary output display from a first display of a mobile device to a second display of a networked media device through an operating system of the mobile device, according to one embodiment.

FIG. 10 illustrates a method, apparatus and system related to automated discovery and switch of a primary output display (e.g., a display in which a user of the mobile device 900 primarily interacts with when operating the mobile device 900) from a first display 1002 of a mobile device 900 to a second display 1004 of a networked media device 902 through an operating system 918 of the mobile device 900, according to one embodiment.

In FIG. 10, illustrates a network view 1050 of a method of a mobile device 900 that includes accessing a multicast capability (e.g., using the multicast algorithm 920) of an operating system 1018 responsive to a user interacting with an indicator 1202 on a menu bar 1200 of an operating system 1018 of the mobile device 900, determining if there is a pairable application 1016 locally stored on a networked media device 902 that is compatible with the operating system 1018 on the mobile device 900 when a multicast message (e.g., using the operating system 1018) is broadcast from the operating system 1018 to the networked media device 902 communicatively coupled to the mobile device 900 through a local area network 904, communicating a mirror sequence 1000 from the operating system 1018 to the pairable application 1016 responsive to a selection of a name by a user (e.g., in a table 1124) of the operating system 1018, determining that the pairable application 1016 has launched based on the mirror sequence 1000, and establishing a communication session between the operating system 1018 and/or the pairable application 1016.

A primary output display (e.g., a display in which a user of the mobile device 900 primarily interacts with when operating the mobile device 900) of the mobile device 900 may be automatically switched from a first display 1002 physically coupled with the mobile device 900 to a second display 1004 physically coupled to the networked media device 902 based on the mirror sequence 1000, according to the embodiment described in FIG. 10. The multicast message (e.g., using the operating system 1018) may be delivered through a multicast algorithm 920 of the operating system 1018 that communicates a name-announce request 912 to any networked media device 902 communicatively coupled to the mobile device 900 through the local area network 904, according to the embodiment described in FIG. 10. The multicast message (e.g., using the operating system 1018) may be communicated wirelessly through the local area network 904, according to the embodiment described in FIG. 10. The multicast message (e.g., using the operating system 1018) may be communicated as a broadcast to all available ones of the networked media device 902 communicatively coupled to the mobile device 900 through the local area network 904, according to the embodiment described in FIG. 10.

It may be determined which network media devices (e.g., the networked media device 902) in the local area network 904 are listening for the multicast message (e.g., using the operating system 1018) through the operating system 1018, according to the embodiment described in FIG. 10. In addition, it may be determined whether the pairable application 1016 meets a criteria, according to the embodiment described in FIG. 10. A name of the pairable application 1016 received in response to the name-announce request 912 of the operating system 1018 may be processed, according to the embodiment described in FIG. 10. A table 1124 of the operating system 1018 that lists the name and/or other names of other pairable application 1016s associated with ones of the networked media device 902 in the local area network 904 may be processed, according to the embodiment described in FIG. 10. The name may be presented to a user of the operating system 1018, according to the embodiment described in FIG. 10.

The mobile device 900 may be unaware of how many ones of the networked media device 902 are presently communicatively coupled with the mobile device 900 through the local area network 904, according to the embodiment described in FIG. 10. Nodes of the local area network 904 may replicate packets associated with the multicast message (e.g., using the operating system 1018) having the name-announce request 912 to reach multiple ones of the ones of the networked media device 902 when necessary, according to the embodiment described in FIG. 10. The mirror sequence 1000 may be communicated in a form of a Uniform Resource Locator (URL) code to the pairable application 1016, so that the networked media device 902 is instructed to launch the pairable application 1016 based on data communicated through a destination internet protocol (IP) address associated with the URL, according to the embodiment described in FIG. 10.

The name of the pairable application 1016 may be compared with a registry of names 932 in a registry database 930 of any one of the central server 906 and/or the operating system 1018 to determine whether pairable application 1016 of the networked media device 902 is associatable with the operating system 1018 of the mobile device 900, according to the embodiment described in FIG. 10.

Figure 11:
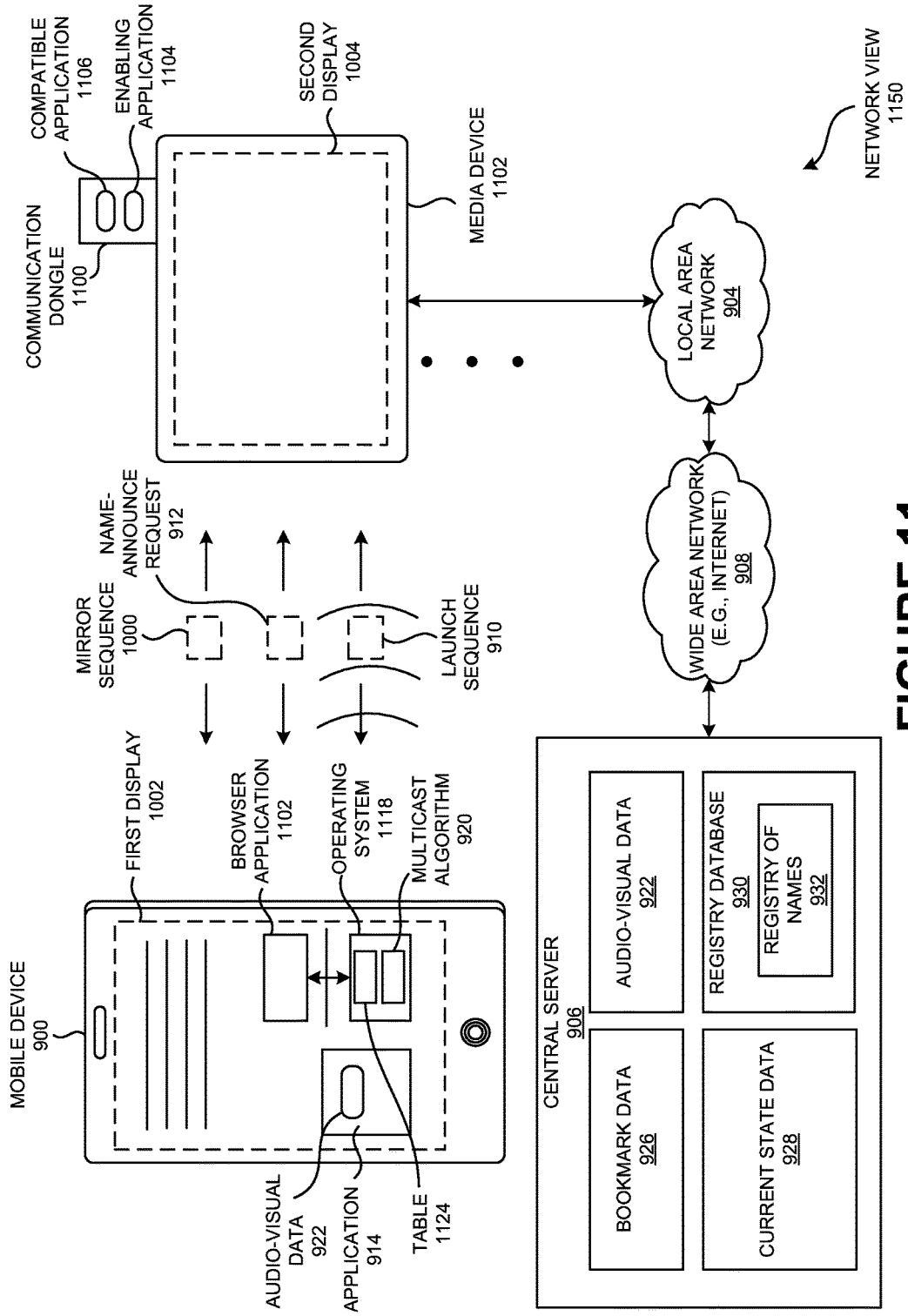
FIG. 11 illustrates a system, apparatus and method related to a communication dongle physically coupled with a media device to automatically discover and launch an application on the media device and to enable switching of a primary output display from a first display of a mobile device to a second display of the media device through an operating system of the mobile device sharing a local area network with the communication dongle, according to one embodiment.

FIG. 11 illustrates a system, apparatus and method related to a communication dongle 1100 physically coupled with a media device 1102 to automatically discover and launch an application 914 on the media device 1102 and to enable switching of a primary output display (e.g., a display in which a user of the mobile device 900 primarily interacts with when operating the mobile device 900) from a first display 1002 of a mobile device 900 to a second display 1004 of the media device 1102 through an operating system 1118 of the mobile device 900 sharing a local area network 904 with the communication dongle 1100, according to one embodiment.

In FIG. 11 is a network view 1150 of a system that includes a mobile device 900 to access a multicast capability (e.g., using the multicast algorithm 920) of an operating system 1118 responsive to a user interacting with an selector 1206 on a header bar 1204 of a browser application 1103 of the mobile device 900 and/or an indicator 1202 on a menu bar 1200 of the operating system 1118 of the mobile device 900, a media device 1102 (e.g., the media device 1102 may/may not have internal networking capability), and a communication dongle 1100 that communicatively couples the mobile device 900 with the media device 1102 (e.g., the media device 1102 may/may not have internal networking capability) through a local area network 904 that is commonly shared between the mobile device 900 and/or the communication dongle 1100.

Figure 12:
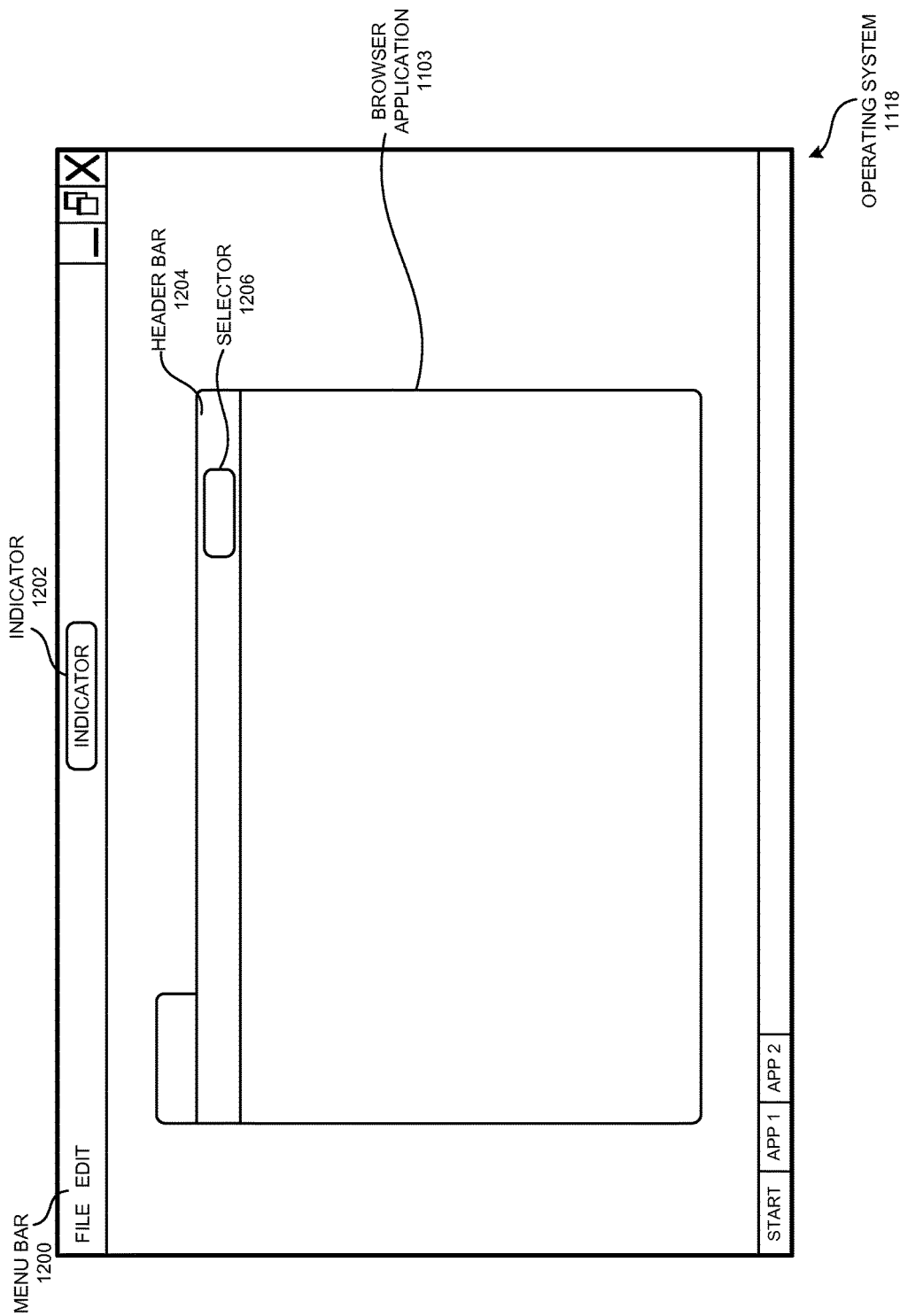
FIG. 12 is a user interface view of an operating system and a browser application executing through the operating system, according to one embodiment.

FIG. 12 is a user interface view of an operating system 1118 having a menu bar 1200 and the indicator 1202 (e.g., to initiate a launch and/or mirroring to a television from a mobile device 900), and a browser application 1103 executing through the operating system 1118. The operating system 1118 of FIG. 12 is illustrated as including a browser application 1103 having a header bar 1204 and a selector 1206. The header may be an upper portion of a window providing a set of controls for the browser application 1103. The selector 1206 may enable the browser application (e.g., Google Chrome) to launch a compatible application on the television from the mobile device 900 and/or mirror the browser application 1103 and/or the operating system 1118 on the mobile device 900. The mobile device 900 determines if there is an enabling application 1104 resident on the communication dongle 1100 physically coupled on a port of the media device 1102 (e.g., the media device 1102 may/may not have internal networking capability) that is compatible with the browser application 1103 of the mobile device 900 and/or the operating system 1118 on the mobile device 900 when a multicast message (e.g., using the operating system 1118) is broadcast from the operating system 1118 to the communication dongle 1100 communicatively coupled to the mobile device 900 through the local area network 904, according to the embodiment described in FIG. 11.

The operating system 1118 of the mobile device 900 and/or the browser application 1103 of the mobile device 900 communicates a launch sequence 910 and/or a mirror sequence 1000 from the operating system 1118 of the mobile device 900 and the browser application 1103 of the mobile device 900 to the communication dongle 1100 after establishing a session between the mobile device 900 and/or the communication dongle 1100, according to the embodiment described in FIG. 11. A compatible application 1106 automatically launches on the communication dongle 1100 on a second display 1004 of the media device 1102 (e.g., the media device 1102 may/may not have internal networking capability) based on the launch sequence 910, according to the embodiment described in FIG. 11.

A primary output display (e.g., a display in which a user of the mobile device 900 primarily interacts with when operating the mobile device 900) of the mobile device 900 is automatically switched from a first display 1002 physically coupled with the mobile device 900 to a second display 1004 physically coupled with the media device 1102 (e.g., the media device 1102 may/may not have internal networking capability) based on the mirror sequence 1000, in this embodiment. The multicast message (e.g., using the operating system 1118) may be delivered through a multicast algorithm 920 of the operating system 1118 that communicates a name-announce request 912 to any media device 1102 (e.g., the media device 1102 may/may not have internal networking capability) communicatively coupled to the mobile device 900 through the local area network 904, according to the embodiment described in FIG. 11.

A characteristic of the second display 1004 may be superior to that of the first display 1002 in that the second display 1004 has an enhanced video resolution, a larger display area, a superior audio quality, and/or a superior color saturation when compared with the first display 1002, according to the embodiment described in FIG. 11. The multicast message (e.g., using the operating system 1118) may be wirelessly communicated through the local area network 904, according to the embodiment described in FIG. 11.

The multicast message (e.g., using the operating system 1118) may be broadcast to all available media device 1102 (e.g., the media device 1102 may/may not have internal networking capability)s communicatively coupled to the mobile device 900 through the local area network 904, according to the embodiment described in FIG. 11. It may be determined which media device 1102 (e.g., the media device 1102 may/may not have internal networking capability)s (e.g., the media device 1102 (e.g., the media device 1102 may/may not have internal networking capability) 902) in the local area network 904 are listening for the multicast message (e.g., using the operating system 1118) through the operating system 1118, according to the embodiment described in FIG. 11.

It may be determined whether the compatible application 1106 and/or the enabling application 1104 meets a criteria, according to the embodiment described in FIG. 11. A name of the compatible application 1106 and/or the enabling application 1104 received in response to the name-announce request 912 of the operating system 1118 may be processed, according to the embodiment described in FIG. 11. A table 1124 of the operating system 1118 that lists the name and/or other names of other enabling application 1104s and/or other compatible application 1106s associated with media device 1102 (e.g., the media device 1102 may/may not have internal networking capability)s in the local area network 904 may be processed, according to the embodiment described in FIG. 11. The name may be presented to a user of the operating system 1118, according to the embodiment described in FIG. 11.

The mobile device 900 may be unaware of how many ones of the media device 1102 (e.g., the media device 1102 may/may not have internal networking capability) 902 and/or communication dongle 1100s are presently communicatively coupled with the mobile device 900 through the local area network 904, according to the embodiment described in FIG. 11. Nodes of the local area network 904 may replicate packets associated with the multicast message (e.g., using the operating system 1118) having the name-announce request 912 to reach multiple ones of the media device 1102 (e.g., the media device 1102 may/may not have internal networking capability)s and/or dongles when necessary, according to the embodiment described in FIG. 11. The mirror sequence 1000 may be communicated in a form of a Uniform Resource Locator (URL) code to the enabling application 1104, so that the media device 1102 (e.g., the media device 1102 may/may not have internal networking capability) is instructed to launch the compatible application 1106 based on data communicated through a destination internet protocol (IP) address associated with the URL, according to the embodiment described in FIG. 11.

The name of the enabling application 1104 may be compared with a registry of names 932 in a registry database 930 of any one of the central server 906 and/or the operating system 1118 to determine whether enabling application 1104 of the media device 1102 (e.g., the media device 1102 may/may not have internal networking capability) is associatable with the operating system 1118 of the mobile device 900 and/or the browser of the mobile device 900, according to the embodiment described in FIG. 11. A current state data 928 and/or a bookmark data 926 of an audio-visual data 922 executing on the browser application 1103 on the mobile device 900 may be communicated to the compatible application 1106 on the communication dongle 1100 through the mobile device 900 and/or a central server 906 through which the audio-visual data 922 is streamed to the mobile device 900, according to the embodiment described in FIG. 11. The audio-visual data 922 may be streamed from the central server 906 to the media device 1102 (e.g., the media device 1102 may/may not have internal networking capability) through the compatible application 1106 on the communication dongle 1100 based on the current state data 928 and/or the bookmark data 926, according to the embodiment described in FIG. 11.

In another embodiment of FIG. 11, a method of a mobile device 900 includes accessing a multicast capability (e.g., using the multicast algorithm 920) of an operating system 1118 responsive to a user interacting with an selector 1206 on a header bar 1204 of a browser application 1103 of the mobile device 900 and/or an indicator 1202 on a menu bar 1200 of the operating system 1118 of the mobile device 900, determining if there is an enabling application 1104 resident on a communication dongle 1100 physically coupled on a port of a media device 1102 (e.g., the media device 1102 may/may not have internal networking capability) that is compatible with the browser application 1103 of the mobile device 900 and the operating system 1118 on the mobile device 900 when a multicast message (e.g., using the operating system 1118) is broadcast from the operating system 1118 to the communication dongle 1100 communicatively coupled to the mobile device 900 through a local area network 904.

A launch sequence 910 and/or a mirror sequence 1000 may be communicated from the operating system 1118 of the mobile device 900 and/or the browser application 1103 of the mobile device 900 to the communication dongle 1100 after establishing a session between the mobile device 900 and/or the communication dongle 1100, according to the embodiment described in FIG. 11. A compatible application 1106 on the communication dongle 1100 may be automatically launched on a second display 1004 of the media device 1102 (e.g., the media device 1102 may/may not have internal networking capability) based on the launch sequence 910, according to the embodiment described in FIG. 11. A primary output display (e.g., a display in which a user of the mobile device 900 primarily interacts with when operating the mobile device 900) of the mobile device 900 may be automatically switched from a first display 1002 physically coupled with the mobile device 900 to a second display 1004 physically coupled with the media device 1102 (e.g., the media device 1102 may/may not have internal networking capability) based on the mirror sequence 1000, according to the embodiment described in FIG. 11.

The multicast message (e.g., using the operating system 1118) may be delivered through a multicast algorithm 920 of the operating system 1118 that communicates a name-announce request 912 to any media device 1102 (e.g., the media device 1102 may/may not have internal networking capability) communicatively coupled to the mobile device 900 through the local area network 904, according to the embodiment described in FIG. 11. A characteristic of the second display 1004 may be superior to that of the first display 1002 in that the second display 1004 has an enhanced video resolution, a larger display area, a superior audio quality, and/or a superior color saturation when compared with the first display 1002, according to the embodiment described in FIG. 11. The multicast message (e.g., using the operating system 1118) may be communicated wirelessly through the local area network 904, according to the embodiment described in FIG. 11. The multicast message (e.g., using the operating system 1118) may be communicated as a broadcast to all available media device 1102 (e.g., the media device 1102 may/may not have internal networking capability)s communicatively coupled to the mobile device 900 through the local area network 904, according to the embodiment described in FIG. 11.

It may be determined which media device 1102 in the local area network 904 are listening for the multicast message (e.g., using the operating system 1118) through the operating system 1118, according to the embodiment described in FIG. 11. It may be determined whether the compatible application 1106 and/or the enabling application 1104 meets a criteria, according to the embodiment described in FIG. 11. A name of the compatible application 1106 and/or the enabling application 1104 received in response to the name-announce request 912 of the operating system 1118 may be processed, according to the embodiment described in FIG. 11. A table 1124 of the operating system 1118 that lists the name and/or other names of other enabling application 1104s and/or other compatible application 1106s associated with media device 1102 (e.g., the media device 1102 may/may not have internal networking capability)s in the local area network 904 may be populated, according to the embodiment described in FIG. 11. The name may be presented to a user of the operating system 1118, according to the embodiment described in FIG. 11.

The mobile device 900 may be unaware of how many ones of the media device 1102 (e.g., the media device 1102 may/may not have internal networking capability) 902 and/or communication dongle 1100s are presently communicatively coupled with the mobile device 900 through the local area network 904, according to the embodiment described in FIG. 11. Nodes of the local area network 904 may replicate packets associated with the multicast message (e.g., using the operating system 1118) having the name-announce request 912 to reach multiple ones of the media device 1102 (e.g., the media device 1102 may/may not have internal networking capability)s and/or dongles when necessary, according to the embodiment described in FIG. 11. The mirror sequence 1000 may be communicated in a form of a Uniform Resource Locator (URL) code to the enabling application 1104, so that the media device 1102 (e.g., the media device 1102 may/may not have internal networking capability) is instructed to launch the compatible application 1106 based on data communicated through a destination internet protocol (IP) address associated with the URL, according to the embodiment described in FIG. 11.

The name of the enabling application 1104 may be compared with a registry of names 932 in a registry database 930 of any one of the central server 906 and/or the operating system 1118 to determine whether enabling application 1104 of the media device 1102 (e.g., the media device 1102 may/may not have internal networking capability) is associatable with the operating system 1118 of the mobile device 900 and/or the browser of the mobile device 900, according to the embodiment described in FIG. 11. A current state data 928 and/or a bookmark data 926 of an audio-visual data 922 executing on the browser application 1103 on the mobile device 900 may be communicated to the compatible application 1106 on the communication dongle 1100 through the mobile device 900 and/or a central server 906 through which the audio-visual data 922 is streamed to the mobile device 900, according to the embodiment described in FIG. 11. The audio-visual data 922 may be streamed from the central server 906 to the media device 1102 (e.g., the media device 1102 may/may not have internal networking capability) through the compatible application 1106 on the communication dongle 1100 based on the current state data 928 and/or the bookmark data 926, according to the embodiment described in FIG. 11.

It will be easily understood by those with skilled in the art that the various embodiments described in FIGS. 1-12 in the present case are supported throughout the 61/118,286 filed Nov. 26, 2008 priority application and its progeny on which this application depends.

For example, the similar application 916, the pairable application 1016, the compatible application 1106, and enabling application 1104 interacting with the mobile device 900 have been described in great detail in the 61/118,286 filed Nov. 26, 2008 priority application and its progeny, according to various embodiments. For example, the similar application 916, the pairable application 1016, the compatible application 1106, and enabling application 1104 are discoverable services 201 (as well as other described) of the '286 application in one embodiment. Similarly, the central server 906 is the discovery service 207 (as well as others described) of the 61/118,286 filed Nov. 26, 2008 priority application and its progeny, according to various embodiments. The Script 304 (and others such as 2102) of the '286 application is the application 914, in one or more embodiments.

The various methods of utilizing the multicast algorithm and the various sequences (mirror, name-announce, and launch) are described in great detail and through examples in the '286 application in FIGS. 1-21 as the various mapping techniques described in great detail. The communication dongle 1100 is a type of the network devices inside of a local area network shared with the mobile device (e.g., for example 507, 513, 2101 and others of the '286 application) according to one or more embodiments. Therefore, this case duly claims its priority on the entirety of the disclosure of the '286 application and its progeny.

In another embodiment, a method of a client device includes constraining an executable environment in a security sandbox. The method also includes executing a sandboxed application in the executable environment using a processor and a memory. Further, the method includes automatically instantiating a connection between the sandboxed application and a sandbox reachable service of a networked media device.

The method may include processing an identification data associated with the sandbox reachable service sharing a public address with the client device. The method may also include determining a private address pair of the sandbox reachable service based on the identification data. Additionally, the method may include establishing a communication session between the sandboxed application and the sandbox reachable service using a cross-site scripting technique of the security sandbox. Further, the method may include appending a header of a hypertext transfer protocol to permit the networked media device to communicate with the sandboxed application as a permitted origin domain through a Cross-origin resource sharing (CORS) algorithm. The header may be either one of a origin header when the CORS algorithm is applied and a referrer header in an alternate algorithm.

The method may further include accessing a pairing server when processing the identification data associated with the sandbox reachable service sharing the public address with the client device. The pairing server may perform a discovery lookup of any device that has announced that it shares the public address associated with the client device. The sandbox reachable service may announce itself to the pairing server prior to the establishment of the communication session between the sandboxed application and the sandbox reachable service. The sandbox reachable service may also announce its availability across a range of public addresses such that the sandboxed application communicates with the sandbox reachable service in any one of the range of the public addresses. However, the range of public addresses may be known by the pairing server so that the announcement of the availability of the sandbox reachable service across the range of public addresses is unnecessary. The sandbox reachable service may communicate a global unique identifier and/or an alphanumeric name to the pairing server along with the private address pair of the sandbox reachable service. The private address pair may include a private IP address and a port number associated with the sandbox reachable service.

The method may further include eliminating a communication through a centralized infrastructure when the sandboxed application and the sandbox reachable service communicate in a shared network common to the client device and the networked media device when the connection is established. The shared network may be a local area network, a multicast network, an anycast network, and/or a multilan network. The method may also include minimizing a latency in the communication session when the sandboxed application and the sandbox reachable service communicate in the shared network common to the client device and the networked media device when the connection is established. Further, the method may include improving privacy in the communication session when the sandboxed application and the sandbox reachable service communicate in the shared network common to the client device and the networked media device when the connection is established.

The sandboxed application may be a web page, a script, a binary executable, an intermediate bytecode, an abstract syntax tree, and/or an executable application in the security sandbox. The sandboxed application may comprise a markup language application such as a HyperText Markup Language 5 (HTML5) application, a Javascript® application, an Adobe® Flash® application, a Microsoft® Silverlight® application, a JQuery® application, and/or an Asynchronous Javascript® and a XML (AJAX) application. An access control algorithm may govern a policy through which a secondary authentication is required when establishing a communication between the sandboxed application and the networked media device. The method may include utilizing an exception to a same origin policy through a use of a hyperlink, a form, the script, a frame, a header, and an image when establishing the connection between the sandboxed application and the sandbox reachable service.

The method may include extending the security sandbox with a discovery algorithm and a relay algorithm through a discovery module and a relay module added to the security sandbox. The method may also include bypassing a pairing server having the discovery algorithm and the relay algorithm when establishing the connection between the sandboxed application and the sandbox reachable service when the security sandbox is extended with the discovery algorithm and the relay algorithm through the discovery module and the relay module added to the security sandbox.

The method may further include applying the discovery algorithm of the security sandbox to determine that the networked media device having the sandbox reachable service communicates in a shared network common to the client device and the networked media device. The method may also include applying the relay algorithm of the security sandbox to establish the connection between the sandboxed application and the sandbox reachable service of the networked media device. The discovery algorithm may utilize a protocol comprising a Bonjour® protocol, a SSDP protocol, a LSD uTorrent® protocol, a multicast protocol, an anycast protocol, and/or another Local Area Network (LAN) based protocol that discovers services in a LAN based on a broadcast from any one of an operating system service, the security sandbox, the client device, the sandbox reachable service, and the networked media device.

A cookie associated with the security sandbox may be used to store a remote access token on a storage of the client device. The remote access token may identify a set of communicable private Internet Protocol (IP) addresses and/or hardware addresses associated with sandbox reachable services that previously operated on a common shared network with the client device. The client device may communicate with the sandbox reachable services that previously operated on the common shared network through the remote access token.

The client device and the networked media device may reside on networks that are incommunicable with each other comprising a firewall separation, a different network separation, a physical separation, and/or an unreachable connection separation. The sandboxed application of the security sandbox of the client device and the sandbox reachable service of the networked media device may communicate with each other through a relay service employed by a pairing server having a discovery module and a relay module to facilitate a trusted communication between the sandboxed application and the sandbox reachable service.

The trusted communication may be facilitated in a manner such that the sandboxed application never learns a private IP address and/or a hardware address of the networked media device. This may occur when a first Network Address Translator (NAT) device receives communications from a public IP address of a different network on which the sandbox reachable service operates, and a second NAT device translates the private IP address of the networked media device to the public IP address visible to the sandboxed application. The first NAT device may be coupled with a network on which the client device operates. The second NAT device may be coupled with the different network on which the networked media device operates.

The networked media device may comprise a number of sandbox reachable applications including the sandbox reachable application. A service agent module of the networked media device may coordinate communications with the discovery module of the security sandbox and/or the pairing server. The security sandbox may be an operating system on which the sandboxed application is hosted and/or a browser application of the operating system. The networked media device may be a television, a projection screen, a multimedia display, a touchscreen display, an audio device, and/or a multidimensional visual presentation device.

The method may include utilizing a WebSocket and/or a long polling service message query interface to reduce a latency of message delivery during the trusted communication between the sandboxed application and the sandbox reachable service. The method may also include optimizing a polling period between polling such that it is less than a timeout period of a session through the relay service. The method may further include initiating the relay service through a series of web pages where information is communicated using hyperlinks that point at the pairing server, and/or a form having a confirmation dialog that is submitted back to the pairing server. A global unique identifier may be masked through the pairing server when the confirmation dialog is served from the pairing server.

In one embodiment, a method of a networked device includes announcing a sandbox reachable service of the networked device to a discovery module using a processor and memory. The method also includes automatically instantiating a communication between the sandbox reachable service of the networked device and a client device when a relay module sends a request from a sandboxed application of the client device to the sandbox reachable service.

In yet another embodiment, a system includes a networked device to announce a sandbox reachable service of the networked device to a discovery module using a processor and memory. The system also includes a client device to constrain an executable environment in a security sandbox, to execute a sandboxed application in the security sandbox, and to automatically instantiate a connection between the sandboxed application and the sandbox reachable service of the networked device.

In still another embodiment, a method of a pairing server includes receiving, storing using a processor and a memory, and communicating to a client device a global unique identifier and/or an alphanumeric name in an announcement from a networked device along with a hardware address associated with the networked device, a public address pair associated with a sandbox reachable service of the networked device, and/or a private address pair associated with the sandbox reachable service of the networked device when a shared network is determined to be commonly associated with the client device and the networked device. The shared network is a local area network, a multicast network, an anycast network, and/or a multilan network.

In one embodiment, a method of a mobile device 900 includes accessing a multicast capability of an operating system 1018 responsive to a user interacting with an indicator 1202 on a menu bar 1200 of an operating system 1018 of the mobile device 900, determining if there is a pairable application 1016 locally stored on a networked media device 902 that is compatible with the operating system 1018 on the mobile device 900 when a multicast message (e.g., using the multicast algorithm 920) is broadcast from the operating system 1018 to the networked media device 902 communicatively coupled to the mobile device 900 through a local area network 904 using a processor 108 and a memory 110, communicating a mirror sequence 1000 from the operating system 1018 to the pairable application 1016 responsive to a selection of a name by a user of the operating system 1018, determining that the pairable application 1016 has launched based on the mirror sequence 1000, and establishing a communication session between the operating system 1018 and/or the pairable application 1016.

In another embodiment, a method of a mobile device 900 includes accessing a multicast capability of an operating system 1018 responsive to a user interacting with an indicator 1202 on a menu bar 1200 of an operating system 1018 of the mobile device 900, determining if there is a pairable application 1016 locally stored on a networked media device 902 that is compatible with the operating system 1018 on the mobile device 900 when a multicast message (e.g., using the multicast algorithm 920) is broadcast from the operating system 1018 to the networked media device 902 communicatively coupled to the mobile device 900 through a local area network 904 using a processor 108 and a memory 110, and communicating a mirror sequence 1000 from the operating system 1018 to the pairable application 1016 responsive to a selection of a name by a user of the operating system 1018.

In yet another embodiment, a system includes a mobile device 900 to access a multicast capability of an operating system 1018 responsive to a user interacting with an indicator 1202 on a menu bar 1200 of an operating system 1018 of the mobile device 900, a local area network 904, and a networked media device 902 communicatively coupled with the mobile device 900 through the local area network 904. The operating system 1018 of the mobile device 900 determines if there is a pairable application 1016 locally stored on the networked media device 902 that is compatible with the operating system 1018 on the mobile device 900 when a multicast message (e.g., using the multicast algorithm 920) is broadcast from the operating system 1018 to the networked media device 902 communicatively coupled to the mobile device 900 through the local area network 904. The operating system 1018 communicates a mirror sequence 1000 from the operating system 1018 to the pairable application 1016.

In one embodiment, a system includes a mobile device 900 to access a multicast capability of an operating system 1118 responsive to a user interacting with an selector 1206 on a header bar 1204 of a browser application 1103 of the mobile device 900 and/or an indicator 1202 on a menu bar 1200 of the operating system 1118 of the mobile device 900, a media device 1102, and a communication dongle 1100 that communicatively couples the mobile device 900 with the media device 1102 through a local area network 904 that is commonly shared between the mobile device 900 and/or the communication dongle 1100. The mobile device 900 determines if there is an enabling application 1104 resident on the communication dongle 1100 physically coupled on a port of the media device 1102 that is compatible with the browser application 1103 of the mobile device 900 and/or the operating system 1118 on the mobile device 900 when a multicast message is broadcast from the operating system 1118 to the communication dongle 1100 communicatively coupled to the mobile device 900 through the local area network 904, in this embodiment.

The operating system 1118 of the mobile device 900 and/or the browser application 1103 of the mobile device 900 communicates a launch sequence and/or a mirror sequence from the operating system 1118 of the mobile device 900 and the browser application 1103 of the mobile device 900 to the communication dongle 1100 after establishing a session between the mobile device 900 and/or the communication dongle 1100, in this embodiment. A compatible application 1106 automatically launches on the communication dongle 1100 on a second display of the media device 1102 based on the launch sequence, in this embodiment. A primary output display of the mobile device 900 is automatically switched from a first display physically coupled with the mobile device 900 to a second display physically coupled with the media device 1102 based on the mirror sequence, in this embodiment. The multicast message may be delivered through a multicast algorithm of the operating system 1118 that communicates a name-announce request to any media device 1102 communicatively coupled to the mobile device 900 through the local area network 904. A characteristic of the second display may be superior to that of the first display in that the second display has an enhanced video resolution, a larger display area, a superior audio quality, and/or a superior color saturation when compared with the first display. The multicast message may be wirelessly communicated through the local area network 904. The multicast message may be broadcast to all available media device 1102s communicatively coupled to the mobile device 900 through the local area network 904. It may be determined which media device 1102s in the local area network 904 are listening for the multicast message through the operating system 1118.

It may be determined whether the compatible application 1106 and/or the enabling application 1104 meets a criteria. A name of the compatible application 1106 and/or the enabling application 1104 received in response to the name-announce request of the operating system 1118 may be processed. A table of the operating system 1118 that lists the name and/or other names of other enabling application 1104s and/or other compatible application 1106s associated with media device 1102s in the local area network 904 may be processed. The name may be presented to a user of the operating system 1118.

The mobile device 900 may be unaware of how many media device 1102s and/or communication dongle 1100s are presently communicatively coupled with the mobile device 900 through the local area network 904. Nodes of the local area network 904 may replicate packets associated with the multicast message having the name-announce request to reach multiple ones of the media device 1102s and/or dongles when necessary. The mirror sequence may be communicated in a form of a Uniform Resource Locator (URL) code to the enabling application 1104, so that the media device 1102 is instructed to launch the compatible application 1106 based on data communicated through a destination internet protocol (IP) address associated with the URL.

The name of the enabling application 1104 may be compared with a registry of names in a registry database of any one of the central server and/or the operating system 1118 to determine whether enabling application 1104 of the media device 1102 is associatable with the operating system 1118 of the mobile device 900 and/or the browser of the mobile device 900. A current state data and/or a bookmark data of an audio-visual data executing on the browser application 1103 on the mobile device 900 may be communicated to the compatible application 1106 on the communication dongle 1100 through the mobile device 900 and/or a central server through which the audio-visual data is streamed to the mobile device 900. The audio-visual data may be streamed from the central server to the media device 1102 through the compatible application 1106 on the communication dongle 1100 based on the current state data and/or the bookmark data.

In another embodiment, a method of a mobile device 900 includes accessing a multicast capability of an operating system 1118 responsive to a user interacting with an selector 1206 on a header bar 1204 of a browser application 1103 of the mobile device 900 and/or an indicator 1202 on a menu bar 1200 of the operating system 1118 of the mobile device 900, determining if there is an enabling application 1104 resident on a communication dongle 1100 physically coupled on a port of a media device 1102 that is compatible with the browser application 1103 of the mobile device 900 and the operating system 1118 on the mobile device 900 when a multicast message is broadcast from the operating system 1118 to the communication dongle 1100 communicatively coupled to the mobile device 900 through a local area network 904.

A launch sequence and/or a mirror sequence may be communicated from the operating system 1118 of the mobile device 900 and/or the browser application 1103 of the mobile device 900 to the communication dongle 1100 after establishing a session between the mobile device 900 and/or the communication dongle 1100. A compatible application 1106 on the communication dongle 1100 may be automatically launched on a second display of the media device 1102 based on the launch sequence. A primary output display of the mobile device 900 may be automatically switched from a first display physically coupled with the mobile device 900 to a second display physically coupled with the media device 1102 based on the mirror sequence.

The multicast message may be delivered through a multicast algorithm of the operating system 1118 that communicates a name-announce request to any media device 1102 communicatively coupled to the mobile device 900 through the local area network 904. A characteristic of the second display may be superior to that of the first display in that the second display has an enhanced video resolution, a larger display area, a superior audio quality, and/or a superior color saturation when compared with the first display. The multicast message may be communicated wirelessly through the local area network 904. The multicast message may be communicated as a broadcast to all available media device 1102s communicatively coupled to the mobile device 900 through the local area network 904.

It may be determined which media device 1102s in the local area network 904 are listening for the multicast message through the operating system 1118. It may be determined whether the compatible application 1106 and/or the enabling application 1104 meets a criteria. A name of the compatible application 1106 and/or the enabling application 1104 received in response to the name-announce request of the operating system 1118 may be processed. A table of the operating system 1118 that lists the name and/or other names of other enabling application 1104s and/or other compatible application 1106s associated with media device 1102s in the local area network 904 may be populated. The name may be presented to a user of the operating system 1118.

The mobile device 900 may be unaware of how many media device 1102s and/or communication dongle 1100s are presently communicatively coupled with the mobile device 900 through the local area network 904. Nodes of the local area network 904 may replicate packets associated with the multicast message having the name-announce request to reach multiple ones of the media device 1102s and/or dongles when necessary. The mirror sequence may be communicated in a form of a Uniform Resource Locator (URL) code to the enabling application 1104, so that the media device 1102 is instructed to launch the compatible application 1106 based on data communicated through a destination internet protocol (IP) address associated with the URL.

The name of the enabling application 1104 may be compared with a registry of names in a registry database of any one of the central server and/or the operating system 1118 to determine whether enabling application 1104 of the media device 1102 is associatable with the operating system 1118 of the mobile device 900 and/or the browser of the mobile device 900. A current state data and/or a bookmark data of an audio-visual data executing on the browser application 1103 on the mobile device 900 may be communicated to the compatible application 1106 on the communication dongle 1100 through the mobile device 900 and/or a central server through which the audio-visual data is streamed to the mobile device 900. The audio-visual data may be streamed from the central server to the media device 1102 through the compatible application 1106 on the communication dongle 1100 based on the current state data and/or the bookmark data.

In yet another embodiment, a system includes a mobile device 900 accesses a multicast capability of an operating system 1118 responsive to a user interacting with at least one of an selector 1206 on a header bar 1204 of a browser application 1103 of the mobile device 900 and an indicator 1202 on a menu bar 1200 of the operating system 1118 of the mobile device 900, a media device 1102, and a communication dongle 1100 that communicatively couples the mobile device 900 with the media device 1102 through a local area network 904 that is commonly shared between the mobile device 900 and the communication dongle 1100. The mobile device 900 determines if there is an enabling application 1104 resident on the communication dongle 1100 physically coupled on a port of the media device 1102 that is compatible with at least one of the browser application 1103 of the mobile device 900 and the operating system 1118 on the mobile device 900 when a multicast message is broadcast from the operating system 1118 to the communication dongle 1100 communicatively coupled to the mobile device 900 through the local area network 904.

For example, Jane may watch a movie and/or access an application (or using a browser) through her mobile device while sitting on a couch in her living room. Jane may wish to automatically display the movie and/or application on a big screen television in front of her couch (or launch a browser, and/or use the big screen television as her primary display instead of the one in her mobile device). Jane may use a gesture to transport the browser, operating system, movie and/or application to the big screen television. For example, Jane may 'fling' (or flick) the screen on her mobile device in which the operating system, browser, movie and/or application is running in an upward motion, and instantly transport the movie and/or application onto her big screen television. In an alternate embodiment, the big screen television may automatically detect that Jane is playing the movie and/or running the application on her mobile device and automatically launch the movie (in its current play state) and/or run the application on the big screen television after detection (without requiring a fling or flick haptic gesture by Jane).

In addition, Jane may access a photo editing application through her mobile device while sitting on a couch in her living room. Jane may wish to automatically display the application on a big screen television in front of her couch (e.g., use the big screen television as her primary display instead of the one in her mobile device). Jane may use a gesture to transport whatever is being displayed on her mobile device to the big screen television. For example, Jane may press an indicator on her operating system to instantly switch her primary display from the mobile device to that of the television.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and/or software (e.g., embodied in a machine readable medium). For example, the various electrical structure and methods may be embodied using transistors, logic gates, and/or electrical circuits (e.g., application specific integrated (ASIC) circuitry and/or Digital Signal Processor (DSP) circuitry).

In addition, it will be appreciated that the various operations, processes, and/or methods disclosed herein may be embodied in a machine-readable medium and/or a machine accessible medium compatible with a data processing system (e.g., a computer device). Accordingly, the specification and drawings are to be regarded in an illustrative in rather than a restrictive sense.

What is claimed is:

1. A method comprising:
accessing a multicast capability of an operating system of a client device, the client device being associated with a user;
discovering, through the client device, at least one other data processing device in an active state of reception of data from the client device through a local area network (LAN) based on the multicast capability accessed in the client device;
wirelessly transmitting, through the client device, a request to the at least one other data processing device discovered to be in the active state of reception of the data from the client device through the LAN, the at least one other data processing device being communicatively coupled to the client device through the LAN, and the request being related to identifying an application residing on the at least one other data processing device;
determining, through the client device, that the application residing on the at least one other data processing device is similar to an application residing on the client device configured to render an audio/visual data stream thereon based on a response to the request; and
at least one of populating a table of the operating system of the client device with a list of applications residing on the at least one other data processing device similar to the application residing on the client device, the applications within the list having identifiers associated therewith and presenting the identifiers to the client device to enable a user thereof select an identifier therethrough.

2. The method of claim 1, further comprising wirelessly launching, through the client device, the audio/visual data stream on the at least one other data processing device through the similar application residing thereon across the LAN based on the determination of the similarity of the application, the wireless launching enabling the same user associated with the client device view the audio/visual data stream on the at least one other data processing device.

3. The method of claim 2, comprising wirelessly launching the audio/visual data stream on the similar application residing on the at least one other data processing device based on the populated table of the operating system of the client device comprising the identifier of the similar application residing on the at least one other data processing device.

4. The method of claim 2, comprising:
bookmarking the audio/visual data stream through the application residing on the client device;
storing data related to the bookmarking in at least one of: the client device and a central server communicatively coupled to the client device through at least one of: the LAN and another computer network, the central server being configured to serve the audio/visual data stream to the client device; and
leveraging the stored data related to the bookmarking to launch the audio/visual data stream on the similar application residing on the at least one other data processing device.

5. The method of claim 2, comprising:
determining whether the audio/visual data stream is being rendered on the application residing on the client device;
storing data related to a currency of the rendering on the client device on at least one of: the client device and a central server communicatively coupled to the client device through at least one of: the LAN and another computer network, the central server being configured to host content related to the audio/visual data stream being rendered on the client device; and
leveraging the stored data related to the currency of the rendering to launch the audio/visual data stream on the similar application residing on the at least one other data processing device.

6. The method of claim 2, further comprising communicating at least one of: a Uniform Resource Locator (URL) and an interpretable content identifier to the application residing on the client device such that the wireless launching of the audio/visual data stream on the similar application of the at least one other data processing device is initiated based on data communicated through a corresponding at least one of: a destination Internet Protocol (IP) address associated with the URL and information associated with the interpretable content identifier.

7. The method of claim 1, wherein the determination of the similarity between the application residing on the client device and the application residing on the at least one other data processing device further comprises comparing the application residing on the at least one other data processing device across a registry database residing on at least one of: the client device and a server external thereto to associate the application residing on the at least one other data processing device with the application residing on the client device.

8. A system comprising:
a LAN;
a client device comprising a processor communicatively coupled to a memory, the client device being associated with a user; and
at least one other data processing device communicatively coupled to the client device through the LAN,
wherein the processor of the client device is configured to execute instructions to:
access a multicast capability of an operating system of the client device,
discover that the at least one other data processing device is in an active state of reception of data from the client device through the LAN based on the access of the multicast capability in the client device,
wirelessly transmit a request related to identifying an application residing on the at least one other data processing device discovered to be in the active state of reception of the data from the client device thereto,
determine that the application residing on the at least one other data processing device is similar to an application residing on the client device configured to render an audio/visual data stream thereon based on a response to the request, and
at least one of populate a table of the operating system of the client device with a list of applications residing on the at least one other data processing device similar to the application residing on the client device, the applications within the list having identifiers associated therewith, and present the identifiers to the client device to enable a user thereof select an identifier therethrough.

9. The system of claim 8, wherein the processor of the client device is further configured to execute instructions to wirelessly launch the audio/visual data stream on the at least one other data processing device through the similar application residing thereon across the LAN based on the determination of the similarity of the application to enable the same user associated with the client device view the audio/visual data stream on the at least one other data processing device.

10. The system of claim 9, wherein the processor of the client device is configured to execute instructions to wirelessly launch the audio/visual data stream on the similar application residing on the at least one other data processing device based on the populated table of the operating system of the client device comprising the identifier of the similar application residing on the at least one other data processing device.

11. The system of claim 9, wherein the processor of the client device is configured to execute instructions to:
bookmark the audio/visual data stream through the application residing on the client device,
store data related to the bookmarking in at least one of: the client device and a central server communicatively coupled to the client device through at least one of: the LAN and another computer network, the central server being configured to serve the audio/visual data stream to the client device, and
leverage the stored data related to the bookmarking to launch the audio/visual data stream on the similar application residing on the at least one other data processing device.

12. The system of claim 9, wherein the processor of the client device is configured to execute instructions to:
determine whether the audio/visual data stream is being rendered on the application residing on the client device,
store data related to a currency of the rendering on the client device on at least one of: the client device and a central server communicatively coupled to the client device through at least one of: the LAN and another computer network, the central server being configured to host content related to the audio/visual data stream being rendered on the client device, and
leverage the stored data related to the currency of the rendering to launch the audio/visual data stream on the similar application residing on the at least one other data processing device.

13. The system of claim 9, wherein the processor of the client device is further configured to execute instructions to communicate at least one of: a URL and an interpretable content identifier to the application residing on the client device such that the wireless launching of the audio/visual data stream on the similar application of the at least one other data processing device is initiated based on data communicated through a corresponding at least one of: a destination IP address associated with the URL and information associated with the interpretable content identifier.

14. The system of claim 8, wherein the processor of the client device is configured to execute instructions to determine the similarity between the application residing on the client device and the application residing on the at least one other data processing device based on comparing the application residing on the at least one other data processing device across a registry database residing on at least one of: the client device and a server external thereto to associate the application residing on the at least one other data processing device with the application residing on the client device.

15. A non-transitory medium, readable through a client device associated with a user and comprising instructions embodied therein that are executable through the client device, comprising:
instructions to access a multicast capability of an operating system of the client device;
instructions to discover, through the client device, at least one other data processing device in an active state of reception of data from the client device through a LAN based on the multicast capability accessed in the client device;
instructions to wirelessly transmit, through the client device, a request to the at least one other data processing device discovered to be in the active state of reception of the data from the client device through the LAN, the at least one other data processing device being communicatively coupled to the client device through the LAN, and the request being related to identifying an application residing on the at least one other data processing device;
instructions to determine, through the client device, that the application residing on the at least one other data processing device is similar to an application residing on the client device configured to render an audio/visual data stream thereon based on a response to the request; and
instructions to at least one of populate a table of the operating system of the client device with a list of applications residing on the at least one other data processing device similar to the application residing on the client device, the applications within the list having identifiers associated therewith, and present the identifiers to the client device to enable a user thereof select an identifier therethrough.

16. The non-transitory medium of claim 15, further comprising instructions to wirelessly launch, through the client device, the audio/visual data stream on the at least one other data processing device through the similar application residing thereon across the LAN based on the determination of the similarity of the application to enable the same user associated with the client device view the audio/visual data stream on the at least one other data processing device.

17. The non-transitory medium of claim 16, comprising instructions to wirelessly launch the audio/visual data stream on the similar application residing on the at least one other data processing device based on the populated table of the operating system of the client device comprising the identifier of the similar application residing on the at least one other data processing device.

18. The non-transitory medium of claim 16, comprising instructions to:
bookmark the audio/visual data stream through the application residing on the client device;
store data related to the bookmarking in at least one of: the client device and a central server communicatively coupled to the client device through at least one of: the LAN and another computer network, the central server being configured to serve the audio/visual data stream to the client device; and
leverage the stored data related to the bookmarking to launch the audio/visual data stream on the similar application residing on the at least one other data processing device.

19. The non-transitory medium of claim 16, comprising instructions to:
- determine whether the audio/visual data stream is being rendered on the application residing on the client device;
- store data related to a currency of the rendering on the client device on at least one of: the client device and a central server communicatively coupled to the client device through at least one of: the LAN and another computer network, the central server being configured to host content related to the audio/visual data stream being rendered on the client device; and
- leverage the stored data related to the currency of the rendering to launch the audio/visual data stream on the similar application residing on the at least one other data processing device.

20. The non-transitory medium of claim 16, further comprising instructions to communicate at least one of: a URL and an interpretable content identifier to the application residing on the client device such that the wireless launching of the audio/visual data stream on the similar application of the at least one other data processing device is initiated based on data communicated through a corresponding at least one of: a destination IP address associated with the URL and information associated with the interpretable content identifier.

* * * * *